United States Patent [19]
Smith

[11] Patent Number: 5,331,533
[45] Date of Patent: * Jul. 19, 1994

[54] ZERO VOLTAGE SWITCHING POWER CONVERTERS

[75] Inventor: David A. Smith, Kowloon, Hong Kong

[73] Assignee: Astec International, Ltd., Hong Kong, Hong Kong

[ * ] Notice: The portion of the term of this patent subsequent to Dec. 22, 2009 has been disclaimed.

[21] Appl. No.: 944,130

[22] Filed: Sep. 11, 1992

Related U.S. Application Data

[63] Continuation-in-part of Ser. No. 668,587, Mar. 13, 1991, Pat. No. 5,173,846.

[51] Int. Cl.$^5$ .......................................... H02M 3/335
[52] U.S. Cl. ...................................... 363/20; 363/97; 363/131
[58] Field of Search ........................ 363/20, 21, 86, 89, 363/95, 97, 131

[56] References Cited

U.S. PATENT DOCUMENTS

| | | | |
|---|---|---|---|
| 4,417,153 | 11/1983 | Onodera et al. | 363/20 |
| 4,441,146 | 4/1984 | Vinciarelli | 363/20 |
| 4,559,590 | 12/1985 | Davidson | 363/21 |
| 4,618,919 | 10/1986 | Martin | 363/21 |
| 4,809,148 | 2/1989 | Barn | 363/131 |
| 4,870,554 | 9/1989 | Smith | 363/131 |
| 4,870,555 | 9/1989 | White | 363/21 |
| 4,959,764 | 9/1990 | Bassett | 363/20 |
| 4,975,821 | 12/1990 | Lethellier | 363/97 |
| 5,173,846 | 12/1992 | Smith | 363/20 |

OTHER PUBLICATIONS

Carsten; "High Power SMPS Require Intrinsic Reliability" Mar. 1982 PCI Proceedings; pp. 456–471.

Carsten; "Design Tricks, Techniques, And Tribulations At High Converison Frequencies"; Apr. 1987 HPFC Proceedings; pp. 139–152.

Unitrode Integrated Circuits Corporation Datasheet for UC1825 Highspeed PWM Controller, Apr. 1990, pp. 4–120 to 4–126.

Primary Examiner—Jeffrey L. Sterrett
Attorney, Agent, or Firm—McCubbrey, Bartels & Ward

[57] ABSTRACT

A circuit for utilizing the magnetizing current in the transformer of a power converter to reset the transformer's core and to provide a zero voltage switching condition on the converter's primary switch is disclosed. The transformer includes a primary winding and a secondary winding, the secondary winding being coupled to an output load and a primary switch connected in series between the primary winding and a voltage source. The closing of the primary switch causes energy to be stored in the transformer and the opening of the primary switch causes the energy to be released from the transformer. A transformer flux reversal circuit is used to reverse the direction of the magnetic flux built up in the transformer when the primary switch is opened. A secondary switch is coupled in series with the secondary winding of the transformer and is operated to prevent any loading effects of the load from disrupting the creation of the zero voltage switching condition.

39 Claims, 19 Drawing Sheets

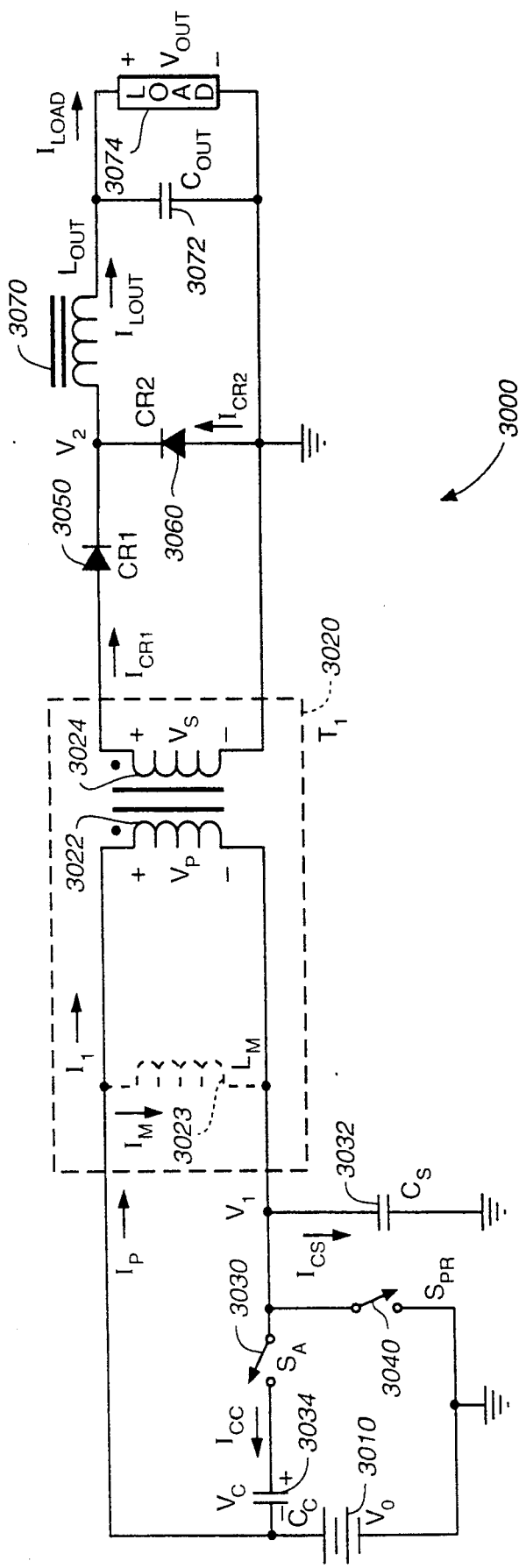
*FIG._1 (PRIOR ART)*

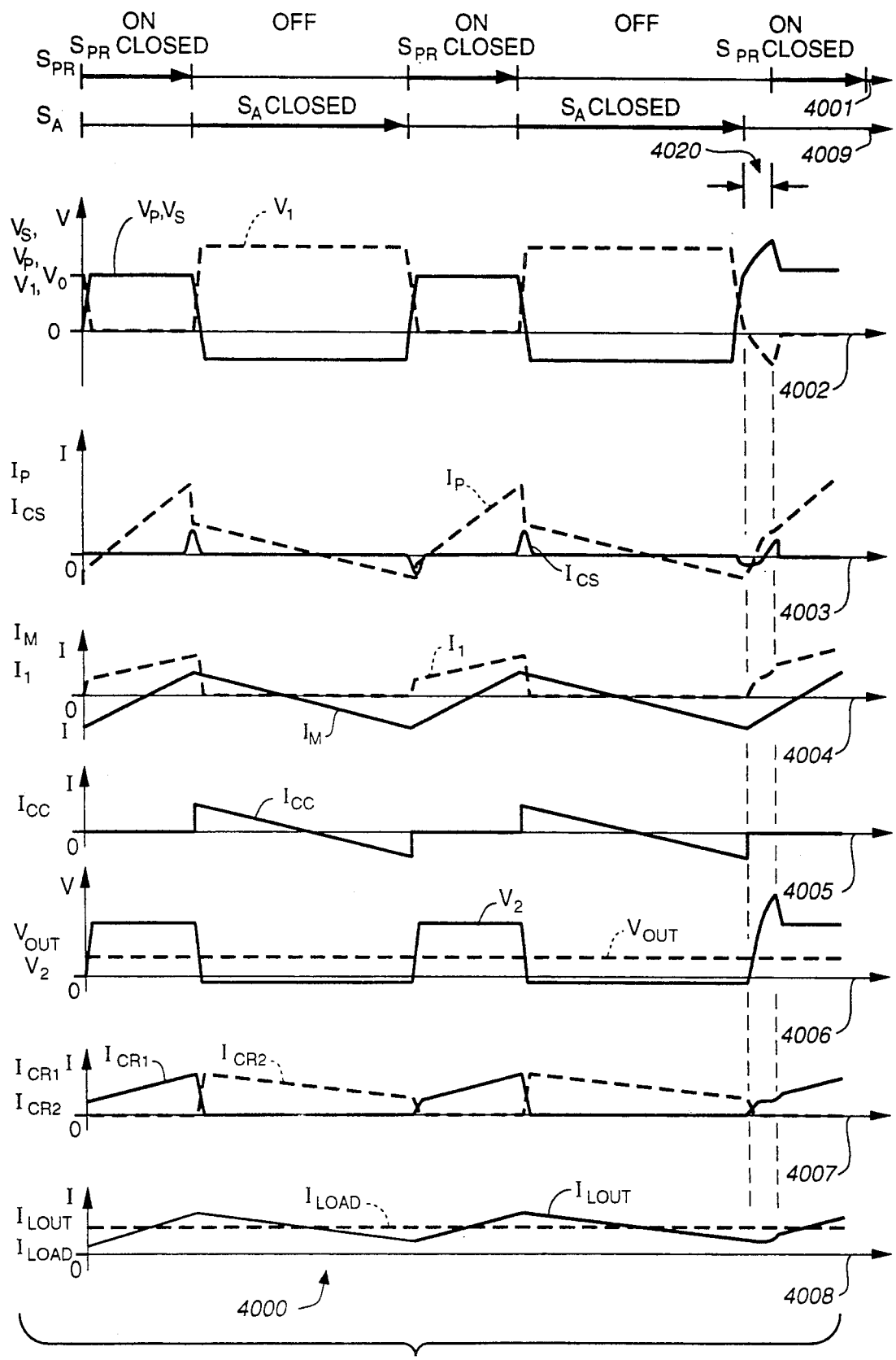
FIG._2

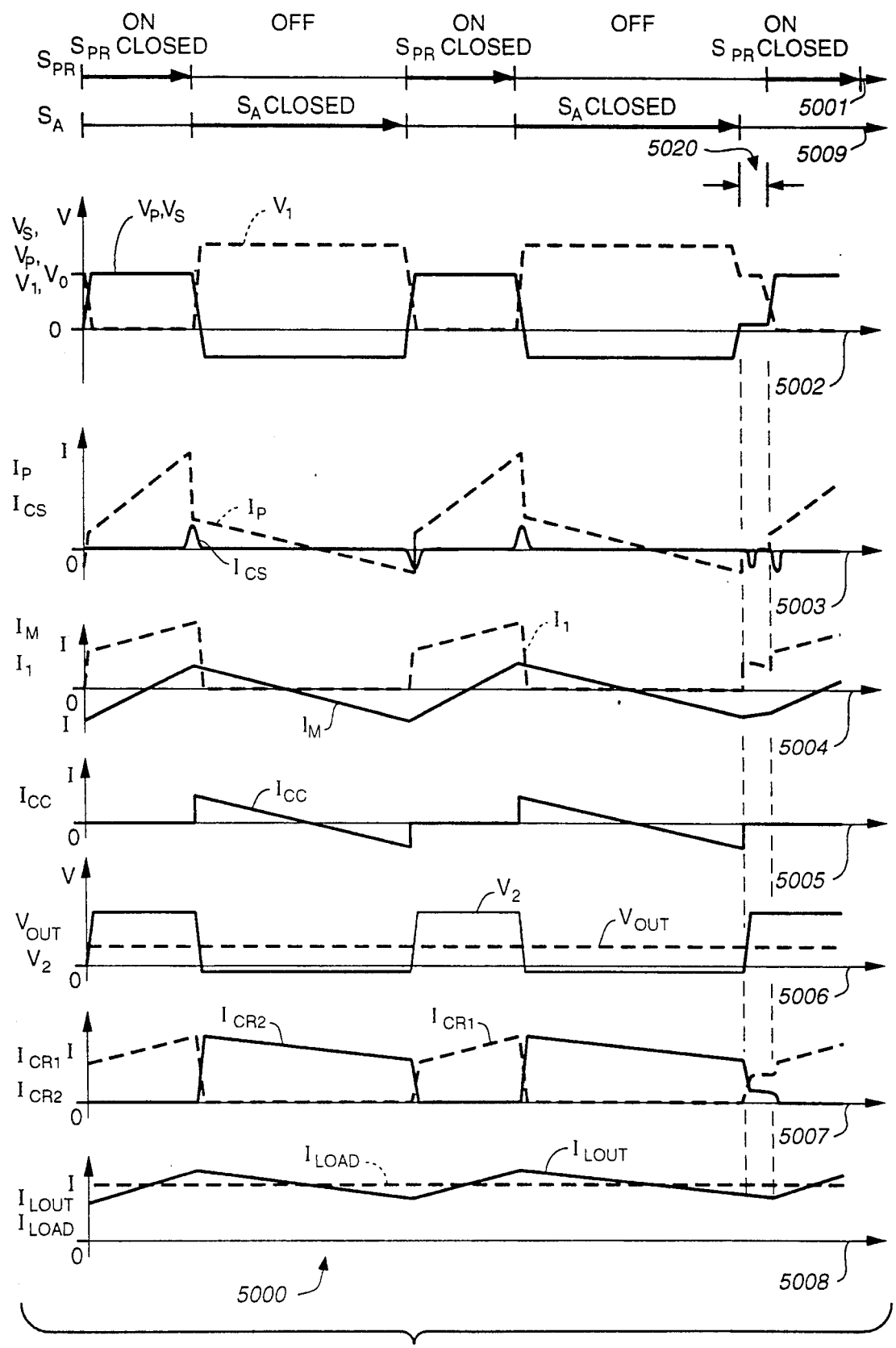
FIG._3

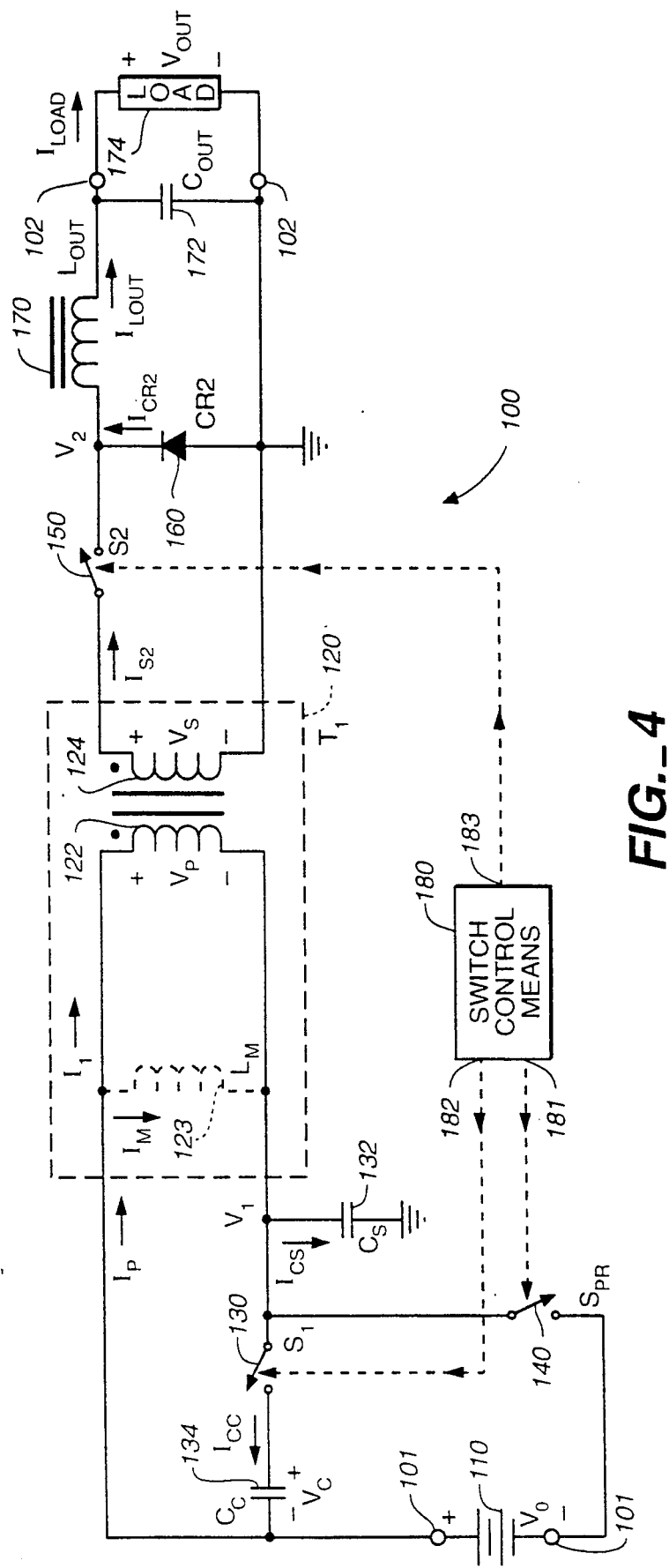
FIG._4

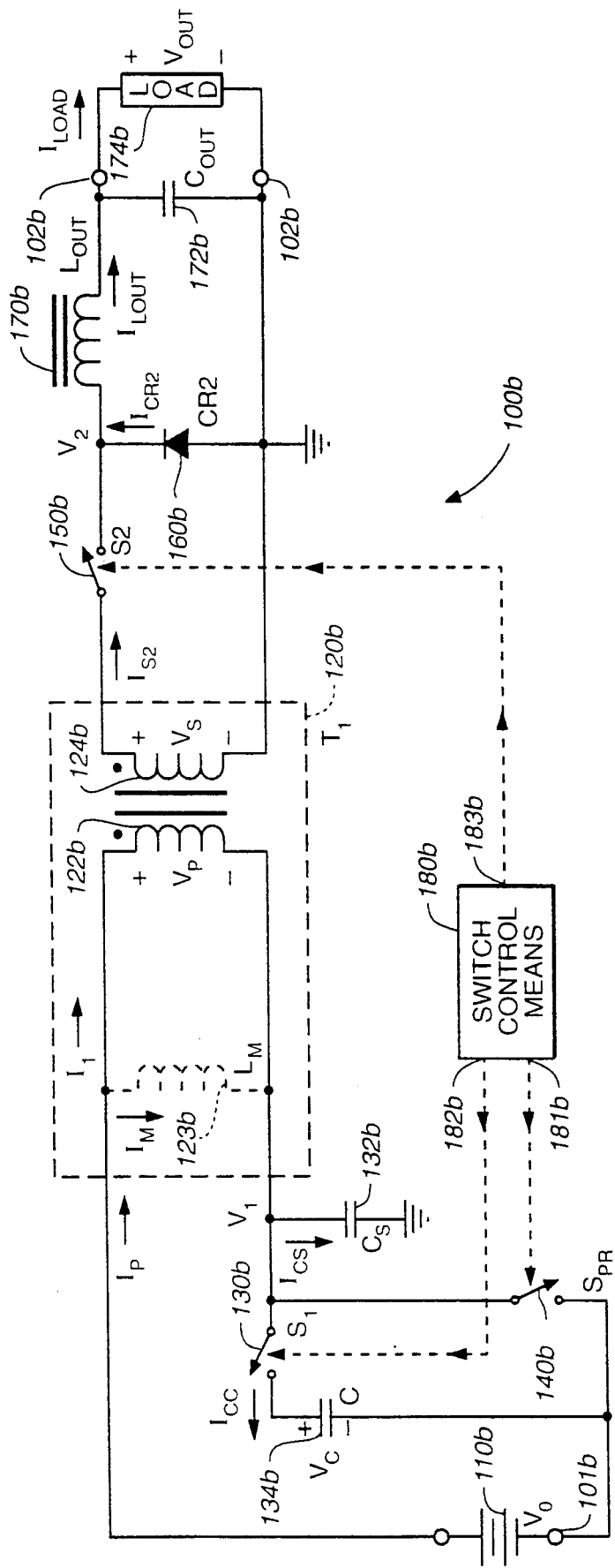
FIG._4A

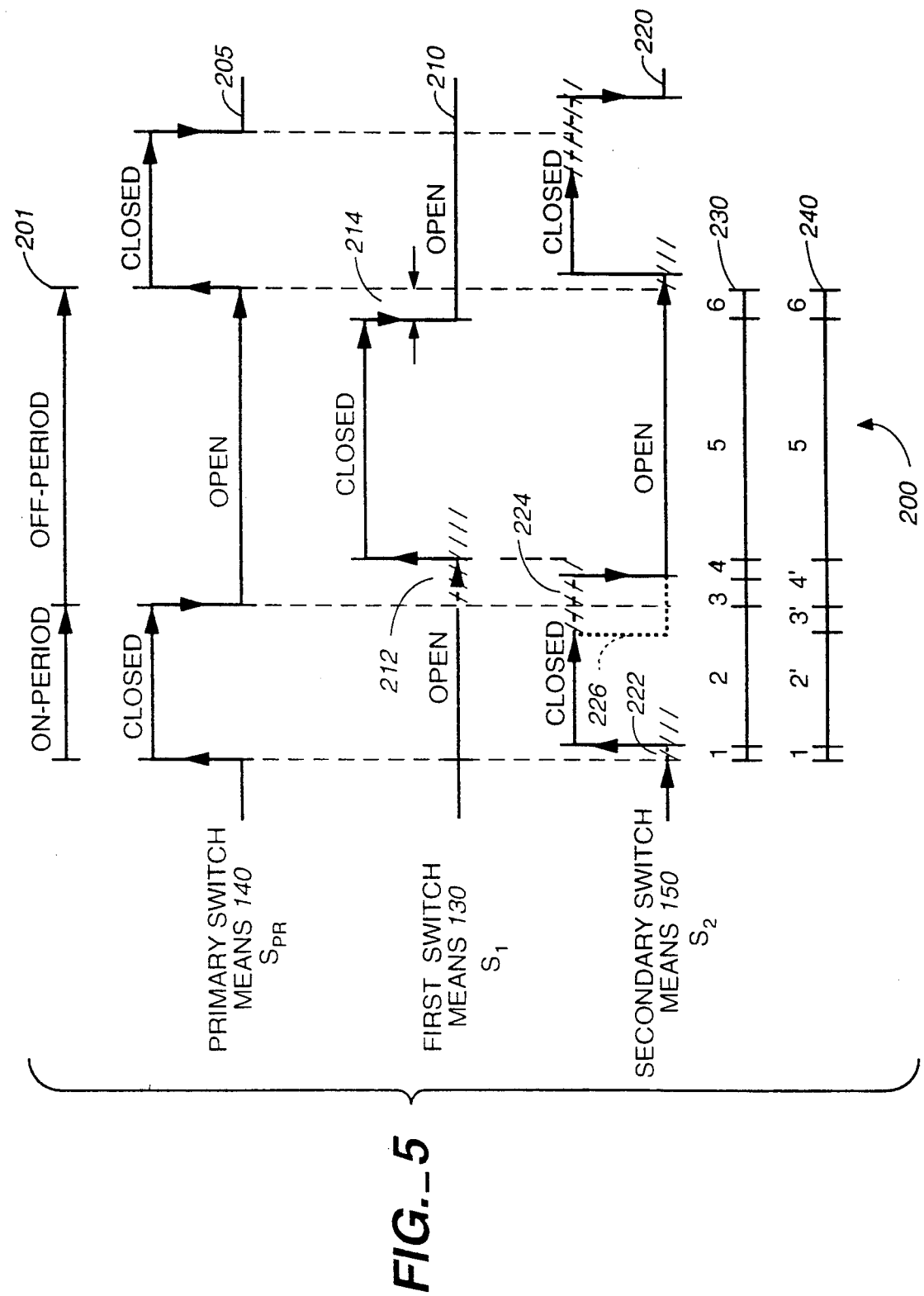
FIG._5

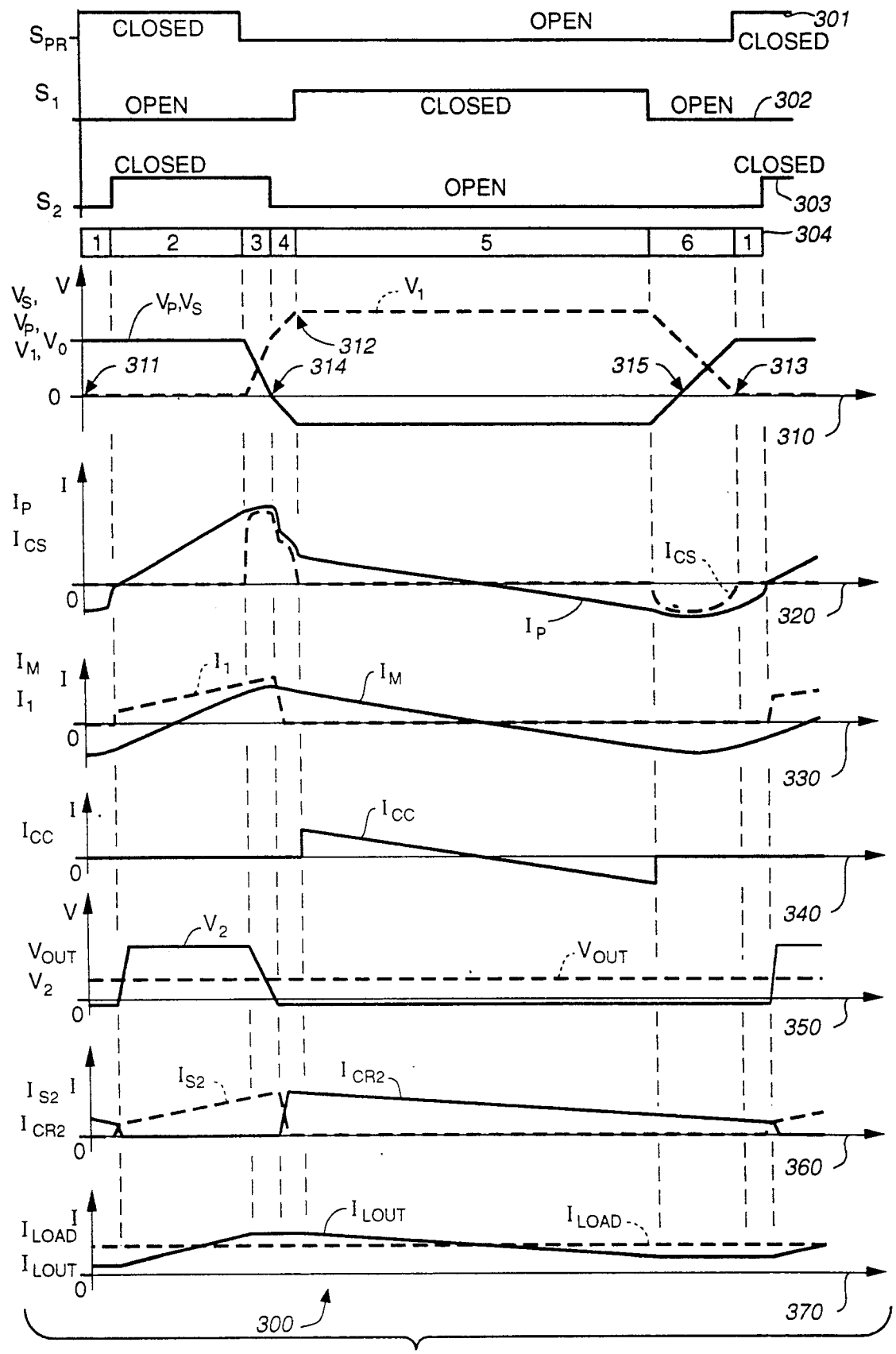
FIG._6

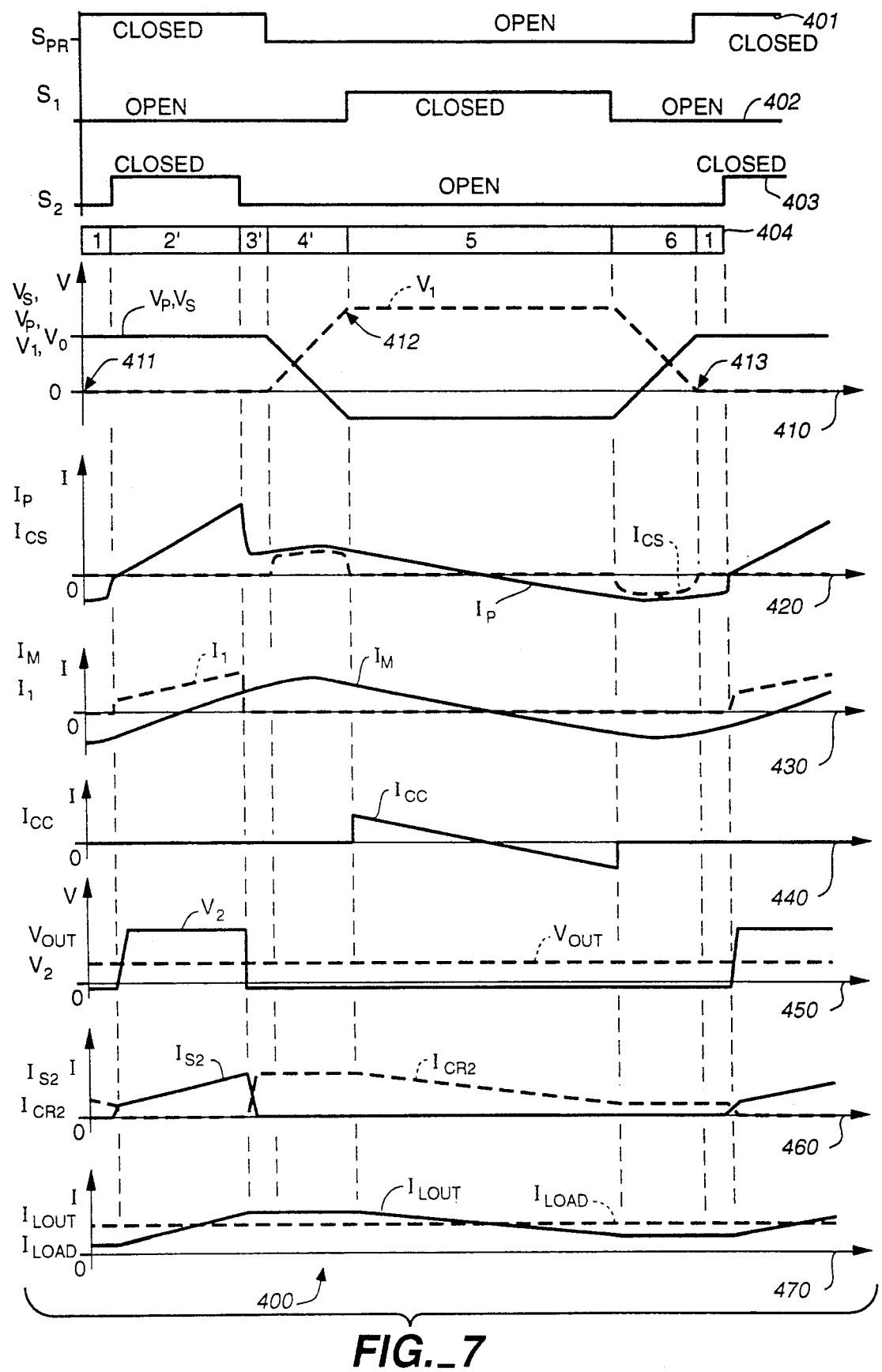
FIG._7

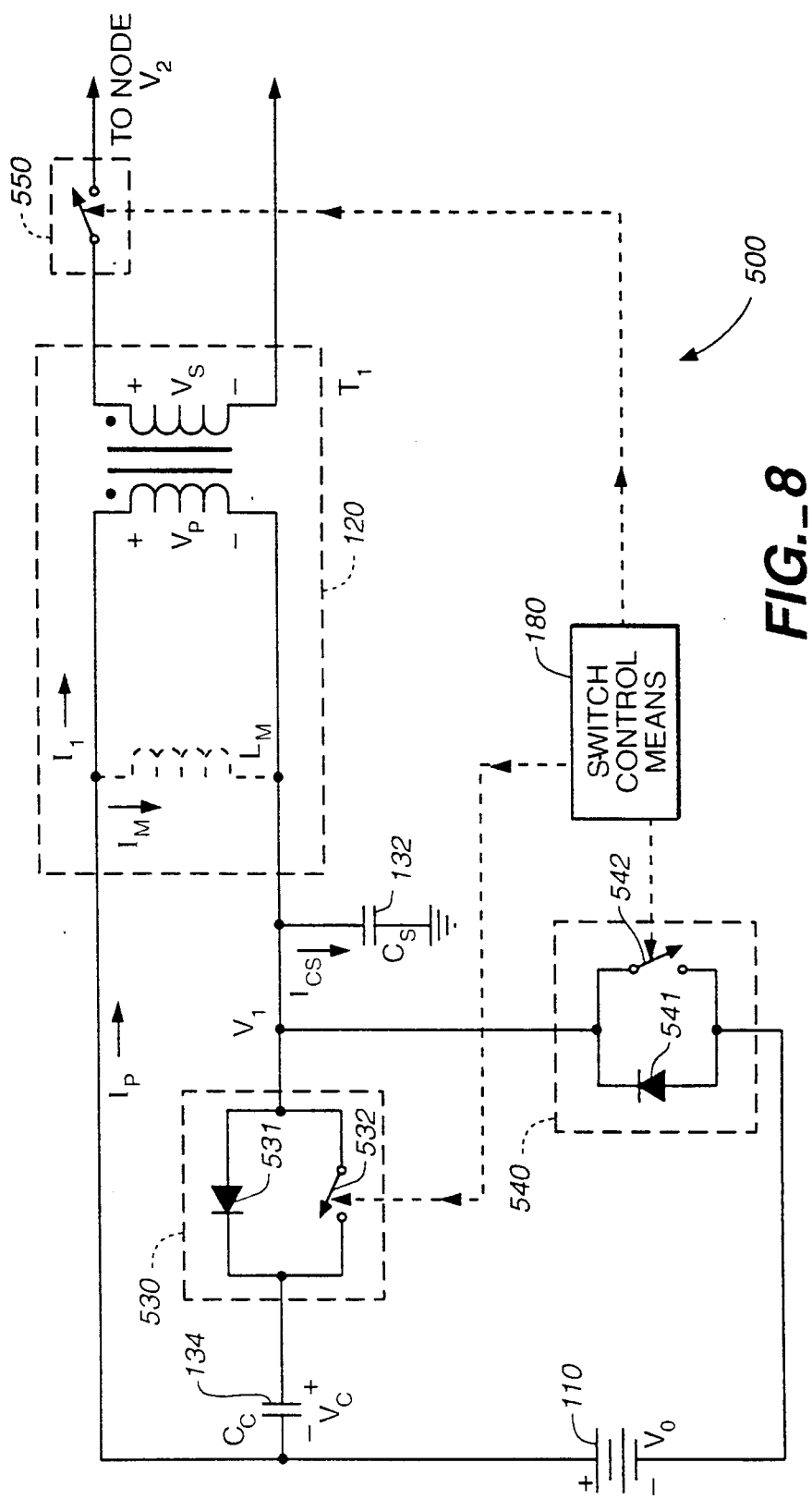
FIG._8

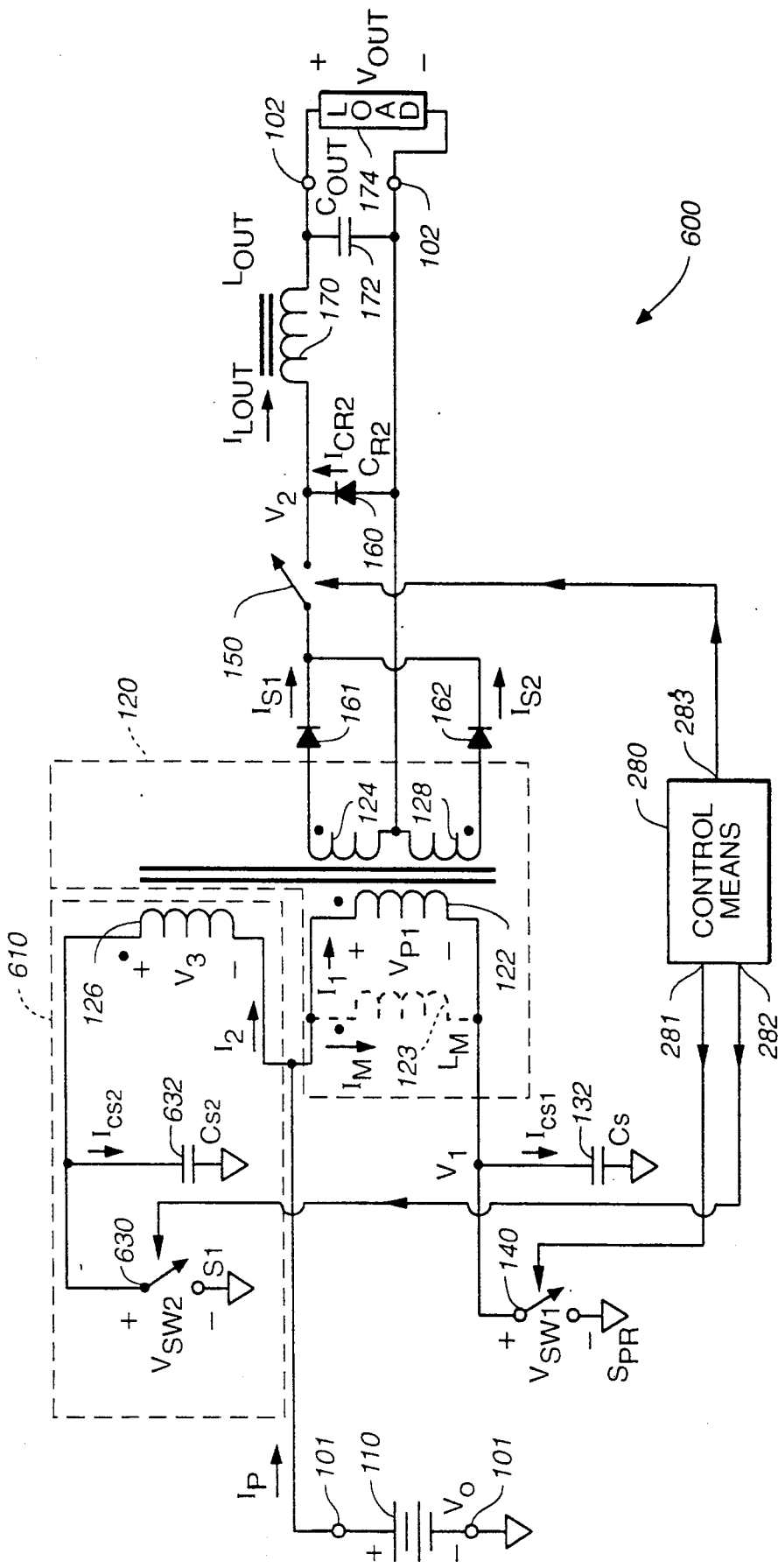
FIG._9

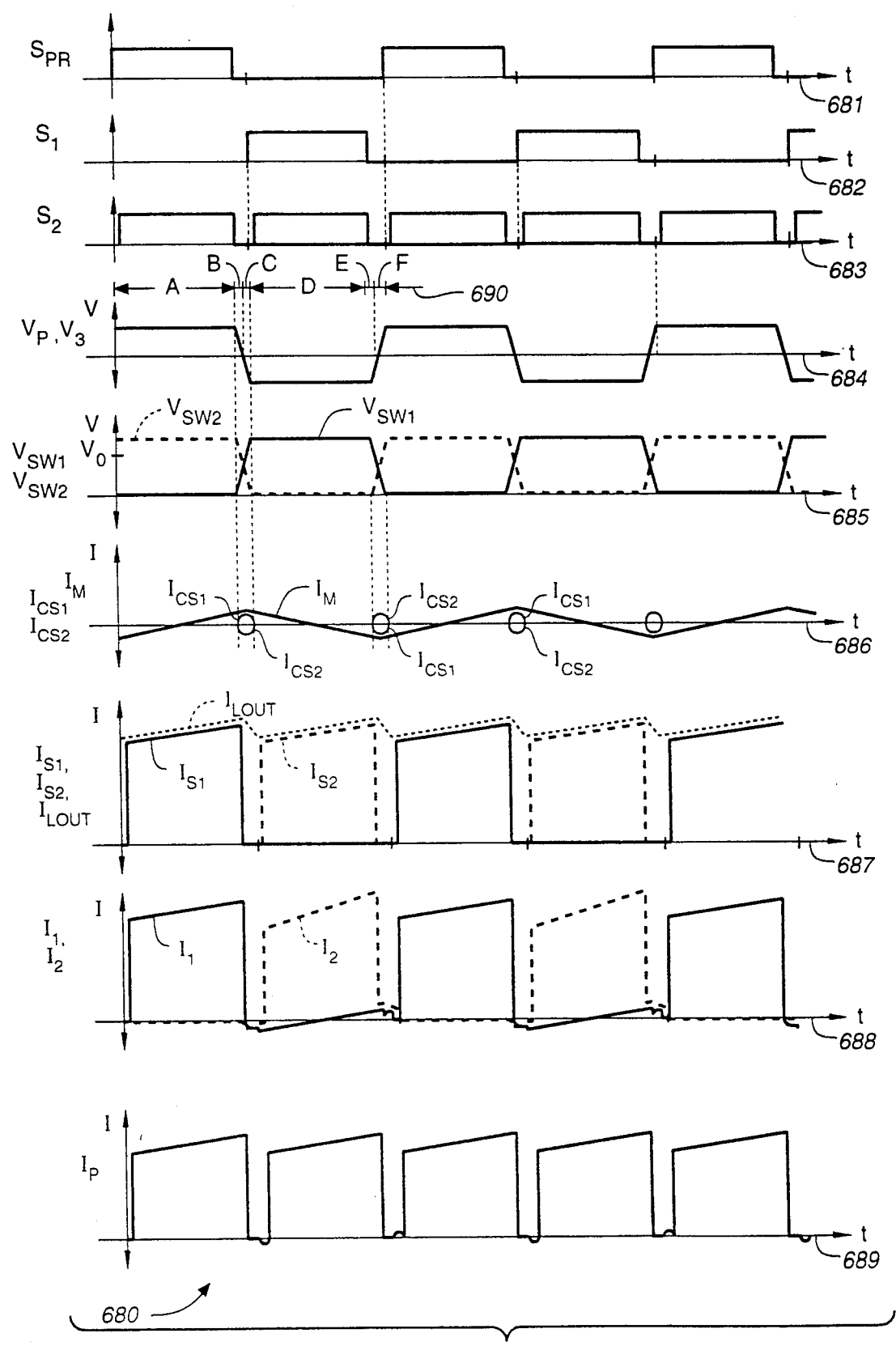
FIG._11

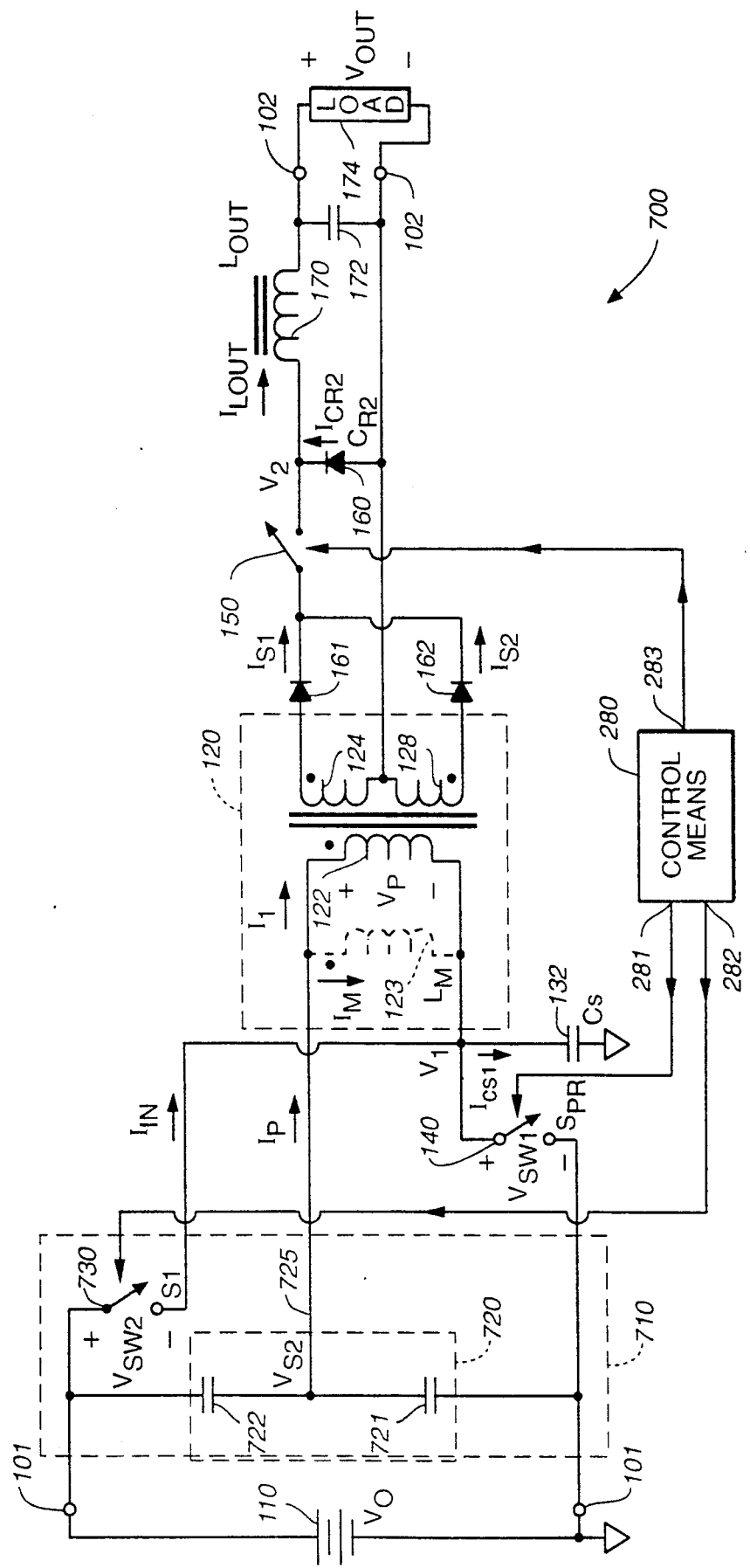
FIG._12

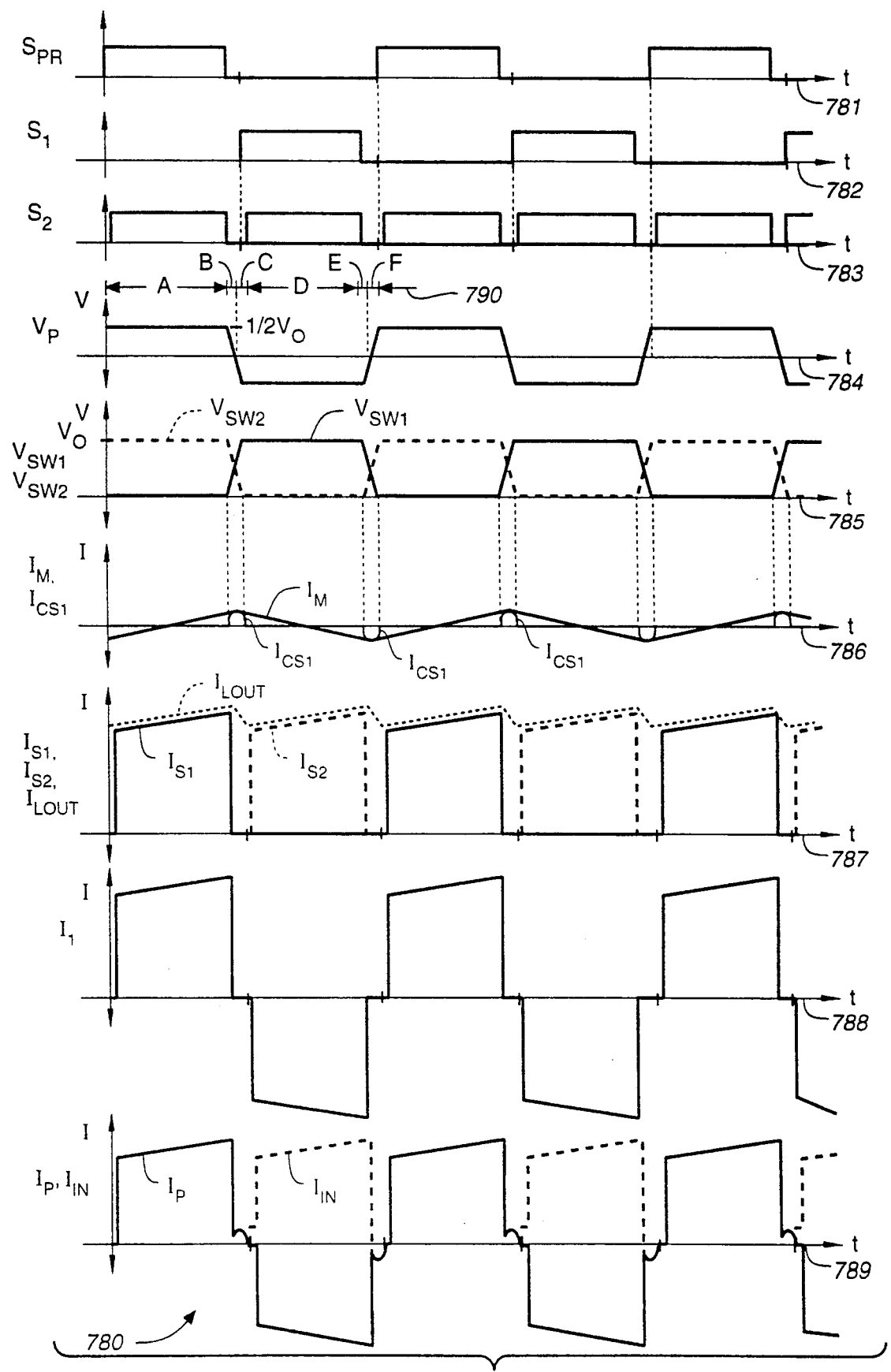
FIG._13

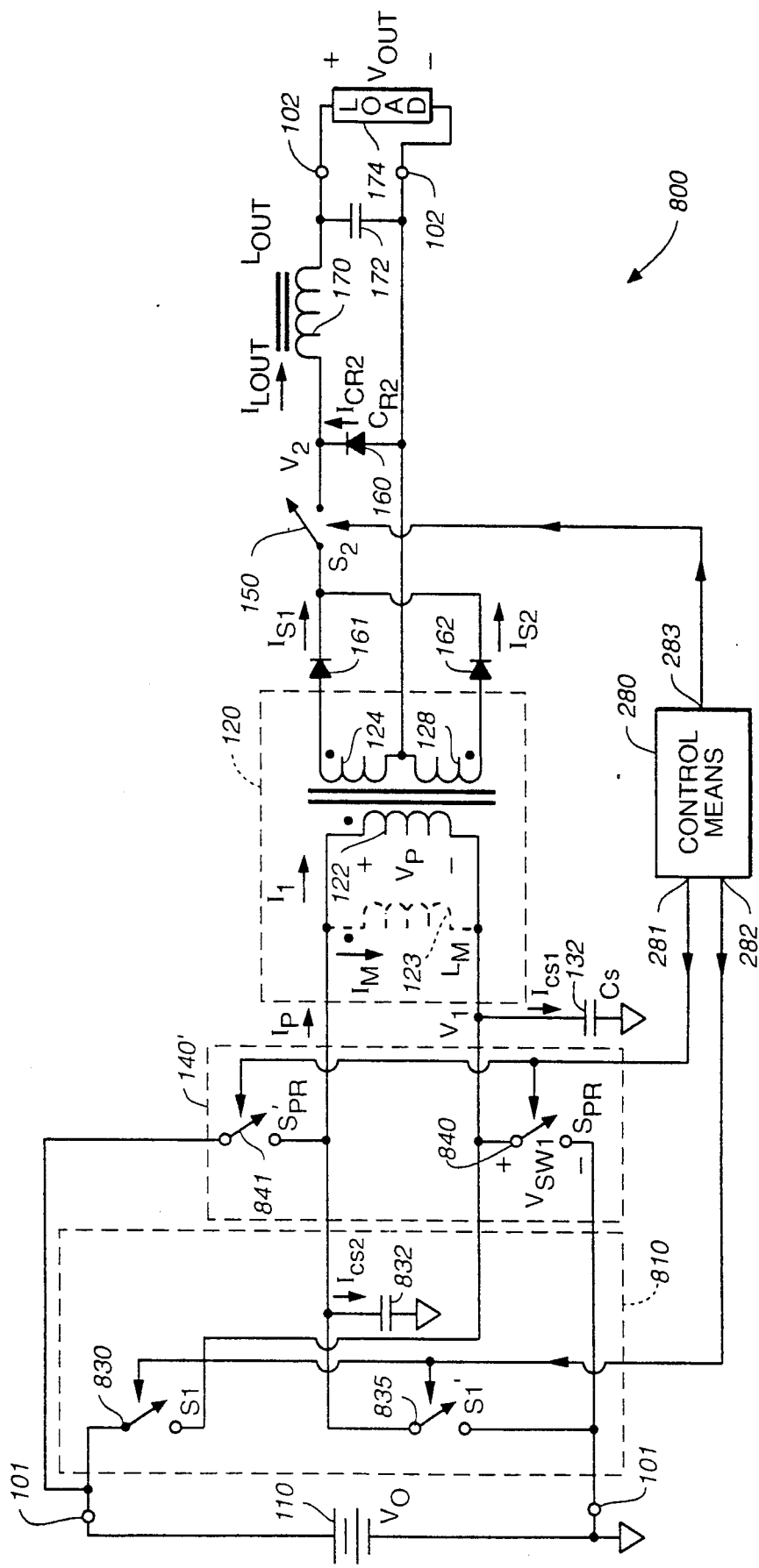
FIG._14

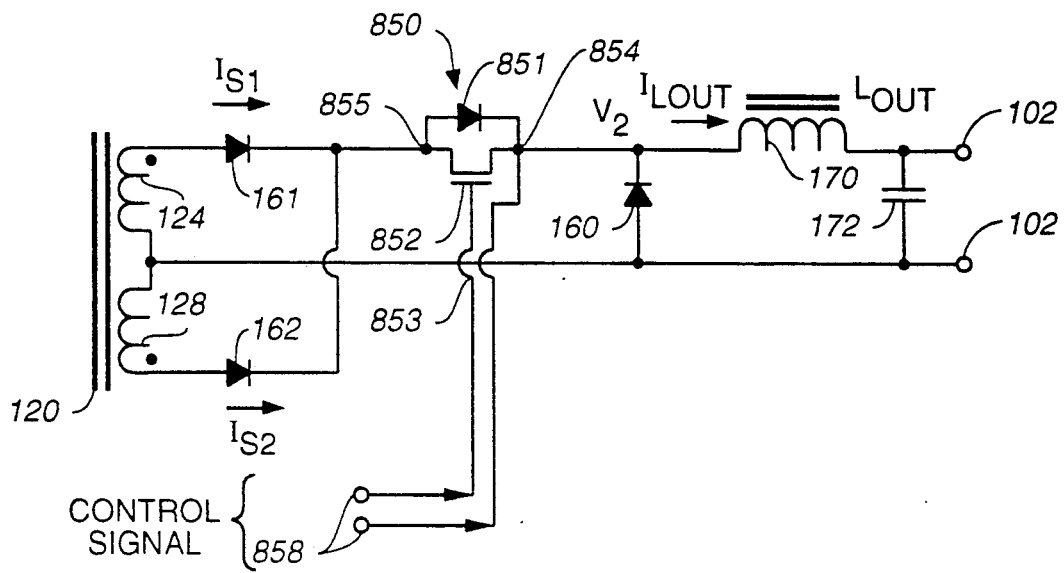
FIG._15A
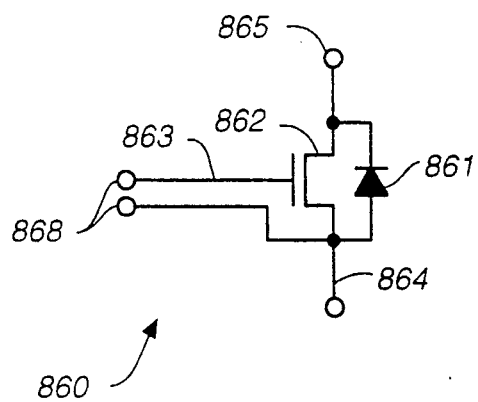
FIG._15B

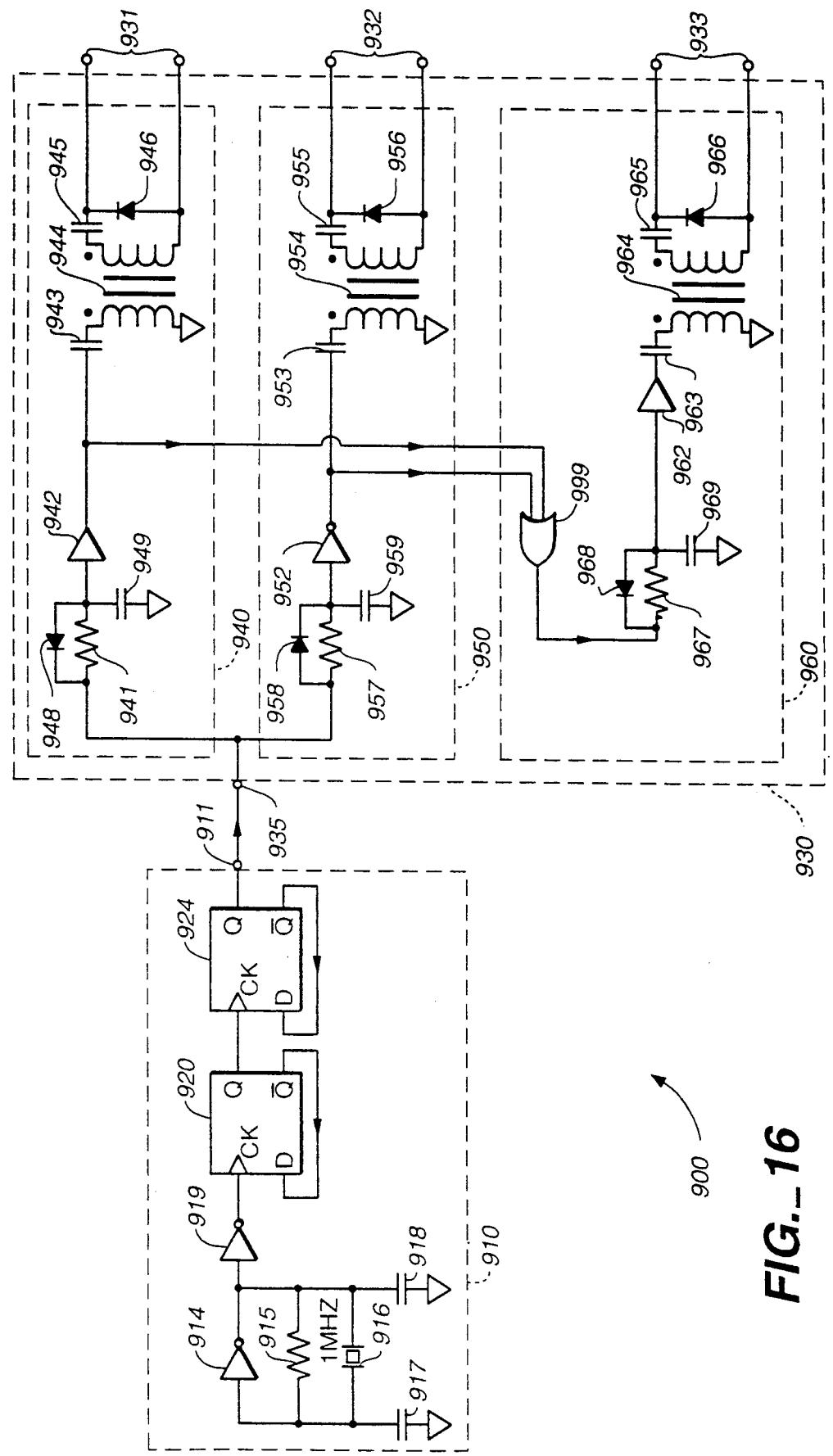
FIG._16

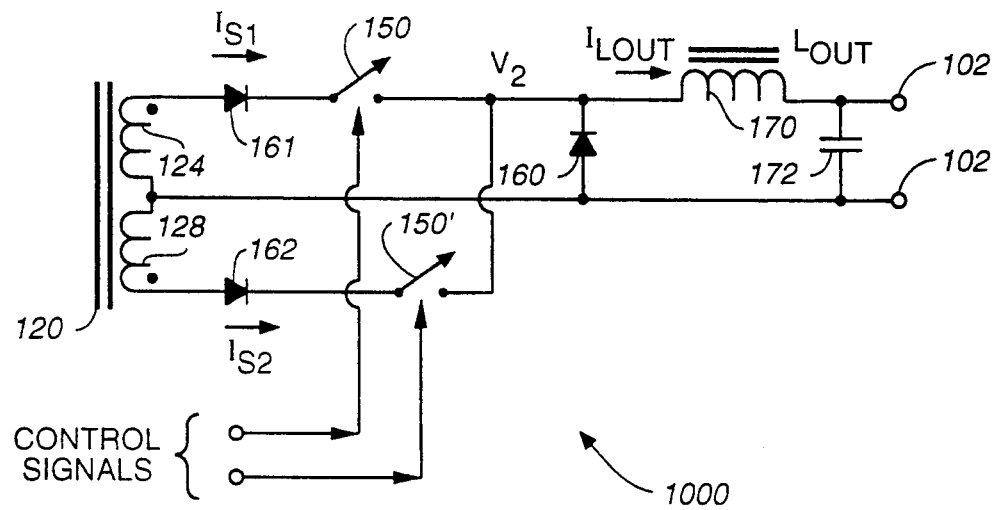
FIG._17A
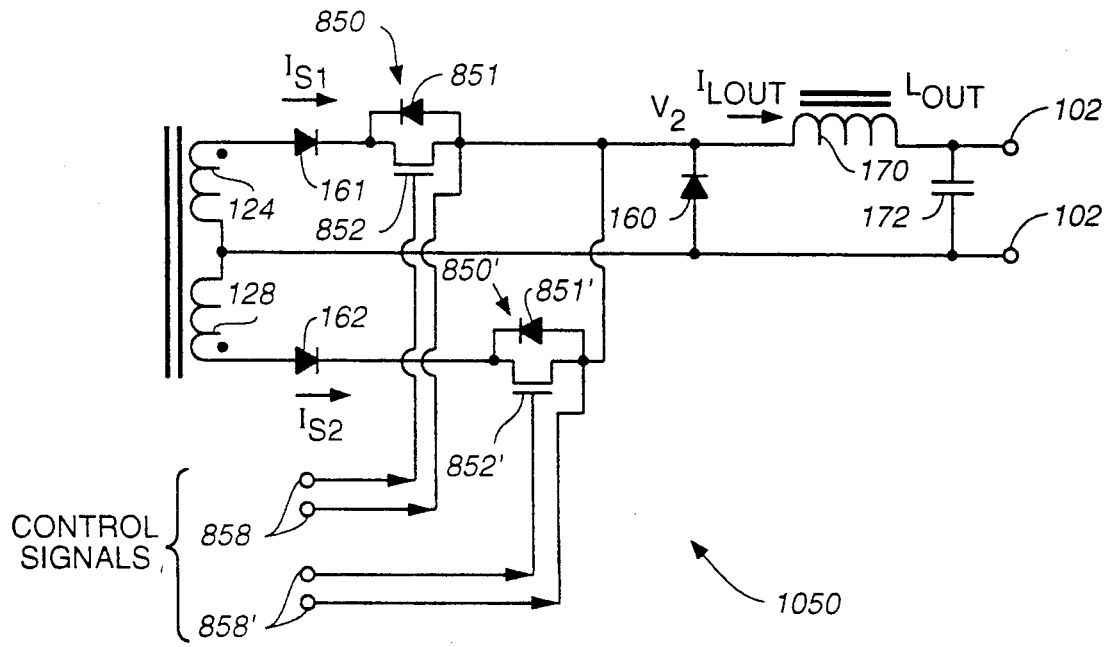
FIG._17B

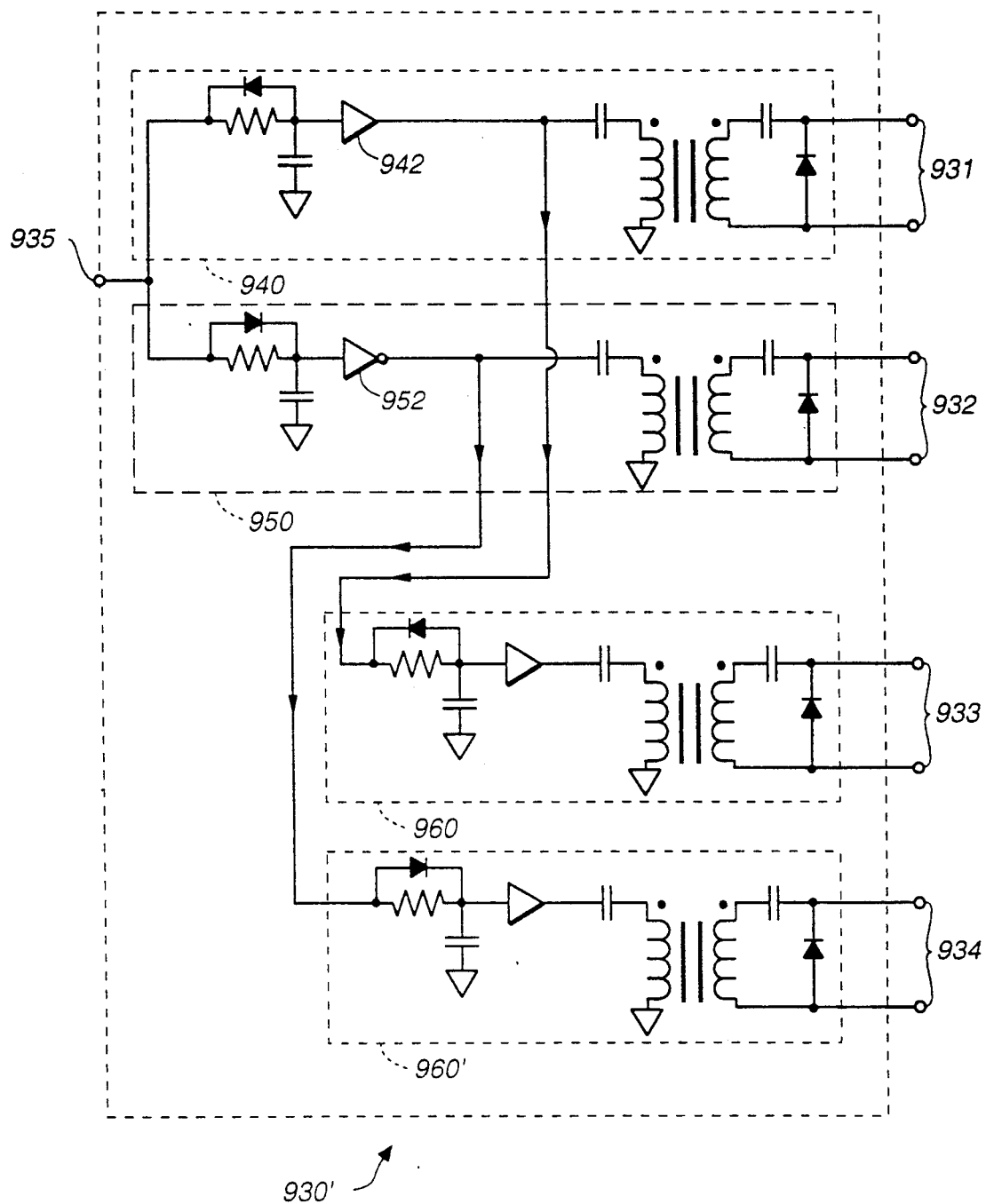
FIG._18

ZERO VOLTAGE SWITCHING POWER CONVERTERS

This application is a continuation-in-part of U.S. patent application No. 07/668,587, filed Mar. 13, 1991 now U.S. Pat. No. 5,173,846 for Zero Voltage Switching Power Converter.

FIELD OF THE INVENTION

The present invention relates to DC-to-DC switching power converters which transfer power from a source supply at a given voltage potential to a destination load at a different voltage potential. In particular, the invention relates to the control of energy in transformers of DC-to-DC forward-type converters, such as active-clamp forward converters, bridge converters, and push-pull converters.

BACKGROUND OF THE INVENTION

The forward converter is a common circuit topology used to transform electric energy from a source at a given potential to a destination load at a different potential. Typically, the forward converter requires fewer components than other converter topologies and is smaller and lighter. The standard or basic prior art forward converter comprises a transformer having a primary winding, a secondary winding, and a third winding. The primary winding is coupled to a source of power, usually DC power, via a primary switch and the secondary winding is coupled to a load via two commutating diodes. The primary switch generally comprises a semiconductor switching device such as a field-effect transistor (FET) or a bipolar-junction transistor (BJT). When the primary winding is energized by the closing of the primary switch, energy is immediately transferred to the secondary winding, hence the name forward converter. The third winding is coupled to the power source via a rectifying diode and serves to reset the ferromagnetic core of the transformer when the primary switch is opened. The transformer's third winding provides a current path for discharging the transformer's magnetizing current, which is created when the primary winding is energized.

The standard forward converter is particularly well suited for low and medium power-conversion applications. However, it is not as efficient as other topologies in converting power, particularly in low power applications. The following factors contribute to the lower efficiency of prior art forward converters.

First, the core-reset operation in the forward converter using the third winding is not as efficient as other core-reset operations in other converter topologies. The rectifier in series with the third winding causes an amount of power dissipation.

Second, the forward converter only uses the first quadrant of the transformer's core B-H characteristic, leaving the third quadrant unused. As a result, the size of the transformer must be increased to enlarge the operating range of the first quadrant at the expense of higher core losses and higher winding resistances.

Third, the power dissipation in the primary switch when it is switched on (a turn-on event) is greater than the power dissipation in comparable switches in other topologies. The power dissipation in a switch during a switching event depends upon the product of the voltage across the switch and the current through the switch. In a forward converter, the voltage difference across the primary switch changes from a value equal to the input voltage of the power source to a value near zero when the switch is closed. Additionally, the primary current begins immediately since the forward converter provides current to the secondary winding immediately upon energizing the primary winding. The high input voltage and the instantaneous current flow in the primary switch leads to a high power dissipation loss in the primary switch. The power dissipation losses during switching events become more significant as the switching frequency of the forward converter is increased, as is done to improve the conversion efficiency of the converter's transformer. The direct power dissipation losses become more significant as the switching frequency increases because the duration of each switching event comprises a larger fraction of each switching cycle duration as the switching frequency increases.

As described in greater detail below, the above first and second factors have been addressed in U.S. Pat. No. 4,441,146 issued to Vinciarelli. In U.S. Pat. No. 4,441,146, the third winding is eliminated and replaced by a series combination of a storage capacitor and an auxiliary switch coupled across either the primary or secondary winding. The auxiliary switch is operated counter to the primary switch, i.e., the auxiliary switch is open when the primary switch is closed and closed when the primary switch is open. When the primary switch is open, the storage capacitor and auxiliary switch operate to capture and store the transformer's magnetizing current, which was built up when the primary winding was energized, and then to return the magnetizing current to the transformer in a manner which resets the transformer's core. The elimination of the third winding addresses the first above efficiency factor. Additionally, the returning of the magnetizing current to the transformer creates a condition where the first and third quadrants of the transformer core's B-H characteristic are utilized, thereby addressing the second above efficiency factor. This converter is often referred to as an active clamp forward converter because the series combination of the auxiliary switch and storage capacitor act as a voltage clamp which is actively coupled to the transformer's windings.

The third efficiency factor, however, is not addressed by the prior art. In this respect, the present invention provides improvements to the basic forward-converter topology by reducing the power dissipation during switching events, thereby increasing the power-conversion efficiency of the basic forward-converter topology.

In contrast to the basic prior art forward converter, each of the bridge converter and push-pull converter topologies utilize both the first and third quadrants of the transformer core's B-H characteristic. However, like the forward converter, the bridge and push-pull converter topologies have substantial power dissipations in their respective power switching devices. The present invention is directed towards reducing the power dissipation losses for these converters as well.

SUMMARY OF THE INVENTION

The present invention recognizes that the magnetizing current in the transformer of a forward converter, bridge converter (both half and full), or a push-pull converter is a source of energy that could be used to reduce the voltage across a selected primary switch means of such a converter to a value near zero volts before this primary switch means is closed to energize the primary winding. A reduction of voltage to near zero volts in magnitude (either positive or negative in value) just prior to when the primary switch means is closed greatly reduces the power dissipation in the primary switch means and is referred to as a zero-voltage-switching condition. The present invention further recognizes that the loading on the converter's secondary winding diverts some or all of the magnetizing current away from the primary winding into the secondary winding in the portion of the converter's switching cycle prior to the closing of the primary switch, thereby preventing such a zero-voltage-switching condition for the converter's primary switch under most operating conditions.

Broadly stated, the present invention encompasses means for isolating the loading effects of the secondary winding from the converter's transformer during the portion of the converter's switching cycle prior to the closing of a selected primary switch means, and means for reducing the voltage across the selected primary switch means to a value near zero before it is closed to energize the primary winding.

More specifically, the present invention applies to a power converter having a transformer, including a primary winding and a secondary winding, and a primary switch means coupled in series with the primary winding. The primary winding is coupled to an input port for receiving a source of power and the secondary winding is coupled to an output port for providing output power to a load. The primary switch means when closed causes a first portion of energy from the input power source to be coupled through the transformer to the load by means of the secondary winding, and causes a second portion of the energy to be stored in the transformer in the form of magnetic flux having a first direction through the windings of the transformer. The energy stored in the transformer is released from the transformer when the primary switch means is thereafter opened.

The present invention encompasses circuitry for isolating the loading effects of the secondary winding from the converter's transformer in a time interval preceding the closing of the primary switch means and for utilizing the magnetizing energy stored in the transformer to reduce the voltage across the primary switch to a value near zero before the primary switch means is closed. The isolation and utilization circuitry comprises a transformer flux reversal means for reversing the direction of the magnetic flux built up in the transformer when the primary switch means is opened, a secondary switch means coupled in series with the secondary winding of the transformer and a switch control means for operating the secondary switch means in relation to the operation of the primary switch means and the flux reversal means. The switch control means opens the secondary switch means substantially when the primary switch means opens and closes the secondary switch means substantially when the primary switch means closes. The secondary switch means and the flux reversal means operate to reduce the voltage across the primary switch means, preferably to near zero volts, when the primary switch means is next caused to close. Specifically, the secondary switch means is operated such that substantially no current is conducted by the secondary winding during a predetermined time interval prior to when the primary switch means is closed. In this way, the secondary circuit is prevented from presenting a current load to the primary winding prior to when the primary switch means is next closed and ensures a zero-voltage switching condition on the primary switch means over a wide range of operating conditions when the primary switch means next is caused to close.

Accordingly, it is an object of the present invention to provide greater power conversion efficiencies for the plurality of converter circuit topologies over a greater dynamic range of load current levels:

It is another object of the present invention to provide zero-voltage-switching conditions for one or more primary switch means of a power converter.

It is another object of the present invention to provide zero-voltage-switching conditions for the primary switch means of an active-clamp forward converter.

It is another object of the present invention to provide zero-voltage-switching conditions for one or more primary switch means of a push-pull converter.

It is another object of the present invention to provide zero-voltage-switching conditions for one or more primary switch means of a half-bridge converter.

It is another object of the present invention to provide zero-voltage-switching conditions for one or more primary switch means of a half-bridge converter.

It is another object of the present invention to provide zero-voltage-switching conditions for one or more primary switch means of a full-bridge converter.

It is still another object of the present invention to provide the zero-voltage-switching condition over a large dynamic range of load current levels.

It is still another object of the present invention to reduce the voltage and power dissipation stresses on a primary switching means and, hence, allow the use of primary switching means having lower on-resistance, yielding yet lower power dissipation and higher conversion efficiencies.

These and other objects of the present invention will become apparent to those skilled in the art from the following detailed description of the invention and from the accompanying drawings.

BRIEF DESCRIPTION OF THE DRAWINGS

FIG. 1 is a circuit diagram of a modified forward converter having a series combination of a storage capacitor and auxiliary switch coupled in parallel with the primary transformer winding according to the prior art.

FIG. 2 is a first timing diagram of key voltages and currents of the modified forward converter shown in FIG. 1 under light loading conditions.

FIG. 3 is a second timing diagram of key voltages and currents of the modified forward converter shown in FIG. 1 under heavy loading conditions.

FIG. 4 is a circuit diagram of an exemplary embodiment of the forward converter according to the present invention.

FIG. 4A is a circuit diagram of an alternate embodiment of the forward converter shown in FIG. 4 according to the present invention.

FIG. 5 is a timing-requirement diagram showing the operation of the first switch means and secondary switch means of the exemplary embodiment of the forward converter shown in FIG. 4.

FIG. 6 is a first timing diagram of key voltages and currents of the exemplary embodiment of the forward converter shown in FIG. 4 under a first switching-event sequence.

FIG. 7 is a second timing diagram of key voltages and currents of the exemplary embodiment of the forward converter shown in FIG. 4 under a second switching-event sequence.

FIG. 8 is a partial block diagram of the forward converter shown in FIG. 4 showing exemplary embodiments of the primary switch means and the first switch means according to the present invention.

FIG. 9 is a circuit diagram of a second exemplary embodiment of the forward converter according to the present invention configured as a push-pull converter.

FIG. 11 is a timing diagram of key voltages and currents of the exemplary embodiment of the forward converter shown in FIG. 9 under an exemplary switching sequence.

FIG. 12 is a circuit diagram of a third exemplary embodiment of the forward converter according to the present invention configured as a half-bridge converter.

FIG. 13 is a timing diagram of key voltages and currents of the exemplary embodiment of the forward converter shown in FIG. 12 under an exemplary switching sequence.

FIG. 14 is a circuit diagram of a fourth exemplary embodiment of the forward converter according to the present invention configured as a full-bridge converter.

FIG. 15A shows an exemplary embodiment of the secondary switch means according to the present invention.

FIG. 15B shows an exemplary embodiment of the first switch means, second switch means, and third switch means according to the present invention.

FIG. 16 is a circuit diagram of an exemplary switch control means according to the present invention.

FIG. 17A is a circuit diagram of an alternate embodiment of the secondary circuit comprising two secondary switch means according to the present invention.

FIG. 17B is a circuit diagram of an implementation of the alternate secondary circuit of FIG. 17A according to the present invention where embodiments of the secondary switch means shown in FIG. 15A are employed.

FIG. 18 is a circuit diagram of a modified switch controller according to the present invention.

DETAILED DESCRIPTION OF THE PRESENT INVENTION

Figure 10:
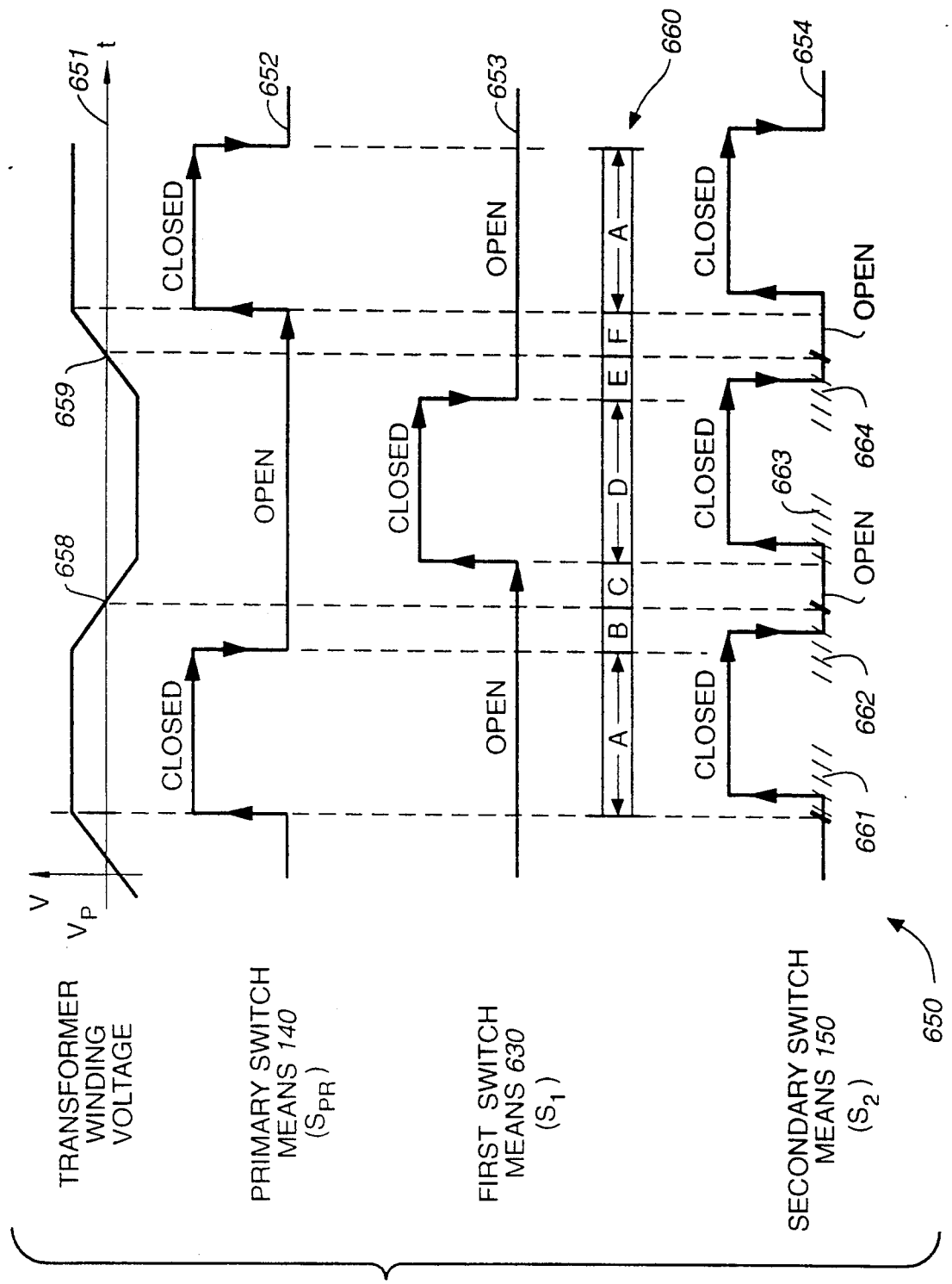
FIG. 10 is a timing-requirement diagram showing the operation of the first switch means and secondary switch means of the exemplary embodiment of the forward converter shown in FIG. 9.

The features of the present invention may be better appreciated and comprehended with a more detailed description of the topology and operating characteristics of the prior art basic forward converter. The topology of a basic prior art forward converter (not shown in the figures) comprises a power transformer having a primary winding and secondary winding, a primary switch connected in series with the primary winding, and two commutating rectifiers which direct power from the secondary winding to a load. A voltage source $V_0$ supplies power to the primary winding, and a choke inductor and a load capacitor filter the power delivered to the load. The operation of the basic forward converter is governed by the primary switch, which causes the forward converter to enter an ON-period when it is closed and to enter an OFF-period when it is open. The duration of the ON-period, with respect to the duration of the OFF-period, is varied to supply a desired amount of voltage and power to the load.

When the primary switch of this prior art forward converter is closed, magnetizing current and magnetic energy build up in the power transformer due to the voltage applied across the primary winding. The voltage across the primary winding is also applied to the secondary winding by transformer action and a current in the secondary winding is induced to flow through the commutating rectifiers towards the load. A current related to the current in the secondary winding is reflected back to the primary winding by transformer action. The power transformer in a basic forward converter further requires a third winding for resetting the core of the transformer during the OFF period of the primary switch. The third winding is coupled to the input voltage source $V_0$ by way of a rectifier and discharges, during the OFF-period, the magnetizing current (and energy) built up in the power transformer during the preceding ON-period.

There are several critical operational aspects which affect the reliability and power-conversion efficiency of the basic prior art forward converter. One aspect relates to the magnetic operation of the power transformer, which is usually constructed with a core of soft ferromagnetic material of negligible hysteresis. Due to the physical properties of the ferromagnetic material, the core can only support a maximum amount of magnetic flux density, B. Flux density is inversely proportional to the number of turns and the cross sectional area of the core. Beyond the saturation flux value, the transformer ceases to operate.

The saturation of magnetic flux limits the amount of power that the basic prior art forward converter may provide to the load during each ON-period. To reduce the flux density in the core below the saturation value, the number of turns in each winding can be increased or the cross-sectional area can be increased. Either of these actions, however, increases the parasitic resistances of the windings and thereby decreases the efficiency of the basic forward converter. As noted in U.S. Pat. No. 4,441,146 issued to Vinciarelli, the basic forward converter only uses the first quadrant of the transformer's B-H curve and, hence, only uses one half of the transformer's flux range. If both the first and third quadrant of the transformer's B-H curve are used instead of only the first quadrant, the transformer of a forward converter can be re-designed to reduce the winding resistance and thereby increase the converter's efficiency. Such an approach is taken in the above cited U.S. Pat. No. 4,441,146.

Another operational aspect of the basic prior art forward converter relates to the voltages and currents of the primary switch during switching events. The primary switch generally comprises a semiconductor device such as a field-effect transistor (FET) or a bipolar-junction transistor (BJT). When switching from the OFF-period to the ON-period, it takes a finite amount of time for the voltage across the primary switch to decrease to zero as the current through the primary switch increases, resulting in a large power dissipation in the primary switch. The dissipated power is equal to the product of both the current and voltage and is zero if either quantity is zero. The power dissipated during the switching transistions directly reduces the conversion efficiency by converting electrical energy into heat. In addition, the reliability and lifetime of the primary switch is reduced by the heating. The present invention addresses this power conversion loss by providing means for driving the voltage across the primary switch means to near zero volts before the primary switch means is closed. The condition whereby the voltage across the primary switch means is driven to near zero volts before the primary switch is closed is herein referred to as a zero-voltage-switching condition.

While switching from the ON-period to the OFF-period, it takes a finite amount of time for the current in the primary switch to decrease to zero as the voltage across the primary switch means increases, resulting in a power dissipation in the primary switch means. The power dissipation during this transition is much less than the dissipation in the transition from the OFF-period to the ON-period, typically between one and two orders of magnitude less. The difference in dissipation is related to the properties of the transistor device, either FET or BJT, and an explanation of the difference is not necessary in order to understand the present invention and enable one of ordinary skill in the art to make and use the same.

Another operational aspect of the basic prior art forward converter relates to the voltage stress on the primary switch means during the OFF-period. During the OFF-period, the voltage across the primary winding reverses and adds with voltage source $V_0$ to produce a voltage stress on the primary switch approximately equal to twice the input voltage $V_0$, taking the general case where the number of turns of the first and third windings are the same. This voltage stress on the primary switch affects the reliability of the basic forward converter directly and the conversion efficiency indirectly. The indirect effect on efficiency is explained below as follows. Due to the material properties of semiconductor devices, FET and BJT devices can only withstand a predetermined maximum voltage, known as a breakdown voltage, across their conduction terminals before the devices are destroyed. It is well known within the semiconductor device fabrication art that increasing the breakdown voltage of a BJT or FET device requires increasing the "on"-resistance between the conduction terminals of the semiconductor device. The increased "on"-resistance lowers the conversion efficiency by increasing the power dissipation in the primary switch during the ON-period.

To address the indirect power dissipation losses due to the under-utilization of the core and due to voltage stresses on the primary switch means, a modification to the basic prior art forward converter has been proposed in U.S. Pat. No. 4,441,146 issued to Vinciarelli. This modification does not, however, address the direct power dissipation losses in the primary switch means during transitions between the ON and OFF-periods. Such direct power dissipation losses become more significant as the switching frequency increases since the duration of each switching event comprises a larger fraction of each switching cycle duration as the switching frequency increases. As the present invention builds on the teachings of prior art active clamp circuits, an exemplary such circuit is discussed in greater detail below with reference to FIGS. 1 through 3.

Such a modified forward converter is shown at 3000 in FIG. 1 and is disclosed in an article by B. Carsten, entitled "High Power SMPS Require Intrinsic Reliability," PCI Proceedings, March 1982, pp. 456–471 as well as in U.S. Pat. No. 4,441,146 issued to Vinciarelli. Forward converter 3000 comprises a transformer 3020 having a primary winding 3022 and secondary winding 3024, a primary switch means 3040 ($S_{PR}$) connected in series with primary winding 3022, and rectifiers 3050 (CR1) and 3060 (CR2) which direct power from secondary winding 3024 to a load 3074. A voltage source 3010 having a value of $V_0$ supplies forward converter 3000 with power and a choke inductor 3070 ($L_{OUT}$) and a load capacitor 3072 ($C_{OUT}$) are used to filter the power delivered to load 3074. Additionally, converter 3000 comprises a capacitor 3032 ($C_S$) for representing the stray (parasitic) capacitance associated with primary winding 3022 and primary switch means 3040. Converter 3000 further comprises a series combination of a storage capacitor 3034 and an auxiliary switch means 3030 coupled in parallel with primary winding 3022. One terminal of the series combination is coupled to the switched terminal of primary winding 3022 (at node $V_1$) and the other end is coupled to a constant voltage reference, which is the positive terminal of voltage source 3010 in this case. Storage capacitor 3034 and auxiliary switch means 3030 comprise means for discharging the magnetizing current in inductor 3023 during OFF-periods when primary switch means 3040 is open. Additionally, storage capacitor 3034 and auxiliary switch means 3030 comprise means for causing converter 3000 to use the third quadrant of transformer 3020's B-H characteristic. The latter two components are used to control the reset of the transformer core during the OFF-period, as explained in greater detail below.

As discussed below, an imaginary inductor is used to model the effects of the magnetizing energy of transformer 3020. The modeling inductor is indicated in phantom as inductor 3023 in FIG. 1 and is coupled in parallel with primary winding 3022 (and hence in parallel with the series combination of auxiliary switch 3030 and capacitor 3034). As such, the magnetizing effects of transformer 3020 can be readily analyzed in the form of a magnetizing current. The use of modeling inductor 3023 in this manner is well known to the transformer art and is discussed in greater detail below. Nonetheless, it is important to recognize that inductor 3023 is not a real component of converter 3000 but rather an imaginary modeling component which aids in explaining the characteristic behavior of the magnetizing energy in real transformer 3020.

Storage capacitor 3034 and auxiliary switch means 3030 are coupled in series to one another. One terminal of the series combination is coupled to the switched terminal of primary winding 3022 (at node $V_1$) and the other end is coupled to a constant voltage reference, which is the positive terminal of voltage source 3010 in this case. Storage capacitor 3034 and auxiliary switch means 3030 comprise means for discharging the magnetizing current in inductor 3023 during OFF-periods when primary switch means 3040 is open. Additionally, storage capacitor 3034 and auxiliary switch means 3030 comprise means for causing converter 3000 to use the third quadrant of transformer 3020's B-H characteristic. These means are explained below in greater detail.

Certain voltages and currents in converter 3000 are significant and their symbolic notations are detailed below with reference to FIG. 1. The voltage across primary winding 3022 is designated as $V_P$, the voltage across secondary winding 3024 is designated as $V_S$. Each of these winding voltages is referenced such that the positive terminal coincides with the magnetic reference dot shown in FIG. 1. There are two node voltages of significance. The node coupling the negative terminal of primary winding 3022 to primary switch means 3040 is referred to as node $V_1$ and the voltage at this node with respect to ground is designated as $V_1$. The node coupling rectifiers 3050 and 3060 to choke inductor 3070 is referred to as node $V_2$ and the voltage at this node with respect to ground is designated as $V_2$.

The following currents are significant. The current flowing into primary winding 3022 at the positive terminal is designated as $I_1$, the current flowing into inductor 3023 from voltage source 3010 is designated as $I_M$, and the total primary current flowing into both inductor 3023 and winding 3022 from voltage source 3010 is designated as $I_P$. The current flowing into capacitor 3032 ($C_S$) from node $V_1$ is designated as $I_{CS}$. Rectifiers 3050 (CR1) and 3060 (CR2) have the current reference designations $I_{CR1}$ and $I_{CR2}$, respectively, where the current references flow into the anode terminals of each rectifier. The current flowing through choke inductor 3070 ($L_{OUT}$) is designated by the current reference designation $I_{LOUT}$, where the current reference flows toward load 3074. The current flowing through load 3074 is designated by the current reference designation $I_{LOAD}$, where the current reference flows from choke inductor 3070 to ground. The current flowing in capacitor 3034 ($C_C$) from switch means 3030 is designated by the current reference designation $I_{CC}$.

For the purposes of discussion, primary winding 3022 and secondary winding 3024 are taken to have the same number of turns. The dot notations for windings 3022 and 3024 indicate their polarities. As mentioned above, an imaginary inductor 3023 ($L_M$) is indicated, in phantom, in the circuit diagram for transformer 3020 to model the effects of the magnetic flux and magnetizing current of transformer 3020. As well known in the transformer art, a current must be provided to one of the windings of a real transformer to provide the magnetomotive force required to overcome the magnetic reluctance of the transformer's core. This current is known as the magnetizing current and is generally provided to the primary winding of the transformer. Since an ideal transformer does not have any magnetic reluctance, magnetizing currents are not present in an ideal transformer. In a real transformer, the magnetizing current can be electrically modeled by a phantom inductor coupled in parallel with the primary winding of an ideal transformer, as shown by inductor 3023. This is because the magnetizing current is proportional to the time integral of the voltage appearing across the primary winding of the transformer. The inductance value $L_M$ of the phantom modeling inductor 3023 is set to a value representative of the core reluctance of transformer 3020, as is well known in the transformer art.

The magnetizing current is a parasitic effect and does not exist in an ideal transformer. As such, the magnetizing current component in the primary winding circuit is not transformed into current in the secondary winding. The current flowing in secondary winding 3024 is related to the current flowing into primary winding 3022 and is not related to the current flowing in inductor 3023. For the purposes of understanding the operation of transformer 3020, primary winding 3022 and secondary winding 3024 function as an ideal transformer while inductor 3023 functions to account for the magnetizing current in transformer 3020. As such, the above mentioned current $I_P$ represents the current flowing into the primary winding of a real transformer, the above mentioned current $I_M$ represents the component of primary current $I_P$ needed to overcome the reluctance of the real transformer, and the above mentioned current $I_1$ represents the component of primary current $I_P$ which is actually transformed over to the secondary winding of the real transformer. As a point of generality, inductor 3023 can be coupled in parallel with secondary winding 3024 rather than with primary winding 3022 to represent the magnetizing current.

The magnetizing current causes energy to be stored in the transformer's core when the transformer's primary winding is energized by the closing of primary switch means 3040. This energy is stored in the form of magnetic flux in the core. The magnetic flux must be periodically discharged to prevent the flux in the core from reaching a saturation point, at which time the transformer ceases to provide transformer action. The material properties of the core limit the total amount of flux the core can store. The flux energy is discharged by discharging the magnetizing current through one of the transformer's windings. The discharging process is formally known as resetting the core.

The operation of forward converter 3000 is governed by primary switch means 3040, which causes converter 3000 to enter an ON-period when switch means 3040 is closed and to enter an OFF-period when switch means 3040 is open. Auxiliary switch means 3030 operates counter to primary switch means 3040 by opening when primary switch means 3040 closes and by closing when primary switch means 3040 opens. The operation of converter 3000 is explained in greater detail below with the assumption that the voltage at the positive terminal of capacitor 3034 with respect to ground is greater than $V_0$, which is the voltage value of voltage source 3010.

During the ON-period, when primary switch means 3040 is closed and auxiliary switch means 3030 is open, a voltage $V_0$ is applied to primary winding 3022, which is then applied to secondary winding 3024 by transformer action. A current in secondary winding 3024 is induced to flow through rectifier 3050 towards load 3074. Because windings 3022 and 3024 have the same number of turns, a current equal in magnitude to the current in secondary winding 3024 is generated in primary winding 3022 by transformer action. At the same time, a magnetizing current $I_M$ builds up in inductor 3023 at a constant rate (i.e., the waveform of the magnetizing current has a positive linear slope) due to the application of a constant voltage of $V_0$ across inductor 3023 by voltage source 3010. Magnetizing energy builds up within transformer 302 due to the magnetizing current $I_M$.

When primary switch means 3040 is opened and auxiliary switch means 3030 is closed to start the OFF-period, the voltage across primary winding 3022 and secondary winding 3024 abruptly reverses to a negative value since the voltage at the positive terminal of capacitor 3034 is greater than $V_0$. As a result, the current flow through secondary winding 3024 abruptly stops due to the reversal in the voltage across the secondary winding and the blocking action of rectifier 3050. In response to secondary winding 3024, the current flow through primary winding 3022 also abruptly stops. The magnetizing current, however, continues to flow and is diverted from primary switch means 3040 into storage capacitor 3034 via auxiliary switch means 3030. For the purposes of discussion and without loss of generality, the capacitance of storage capacitor 3034 is taken to be large enough so that the voltage across storage capacitor 3034 does not substantially change during the OFF-period. Since a constant negative voltage is being applied to inductor 3023 during the OFF-period, the magnetizing current $I_M$ decreases at a constant rate, thereby acting to reset the transformer core. If the OFF-period is sufficiently long, the decrease in $I_M$ continues to the point where current $I_M$ reverses direction and flows out of storage capacitor 3034 and into voltage source 3010.

The ratio of the duration of the ON-period to the time interval between each successive ON-period is known as the duty-cycle of the converter (i.e., duty-cycle=$T_{ON}/(T_{ON}+T_{OFF})$ *100%). The duty-cycle is adjusted to meet the power requirements of the load, with a higher duty-cycle providing more power to the load. The duration of one ON-period and the subsequent OFF-period is often referred to as the switching cycle. The OFF-period is often referred to as the "fly-back" phase due to the abrupt reversals in the voltages and changes of the currents of the transformer windings. It is also referred to as the "reset" phase since the magnetic energy and flux in the transformer core decreases to zero during this time. The voltage that develops across primary switch means 3040 during the OFF-period is greater than $V_0$ and is referred to as the "reset" voltage.

Under steady-state conditions, the output voltage $V_{OUT}$ and the duty-cycle of the forward converter are generally related as follows. When choke inductor 3070 continuously provides current to load 3074 throughout the switching cycle, the output voltage $V_{OUT}$ is equal to the input voltage $V_0$ times the duty cycle, as expressed in the form of a fraction (i.e., divided by 100%). This is because the output voltage $V_{OUT}$ adjusts to a voltage level such that the time integrated voltage applied across choke inductor 3070 during each switching cycle is equal to zero, under steady state conditions. During the ON-period duration, $T_{ON}$, the voltage applied to choke inductor 3070 is ($V_0-V_{OUT}$) volts. During the OFF-period duration, $T_{OFF}$, the voltage applied to choke inductor 3070 is ($-V_{OUT}$) volts. Setting the time-integrated voltage to zero (i.e., $T_{ON}(V_0-V_{OUT})-T_{OFF}V_{OUT}=0$) and solving for $V_{OUT}$ results in $V_{OUT}=V_0T_{ON}/(T_{ON}+T_{OFF})=V_0$*(duty-cycle/100%). In the case where choke inductor 3070 does not continuously provide current to load 3074, due to low load-current demand, the relationship between the duty-cycle and the output voltage is considerably more complex and depends upon the output current level required by load 3074. The derivation and presentation of this more complex relationship are not necessary in order to understand the present invention and enable one of ordinary skill in the art to make and use the present invention. (The derivation and presentation of the more complex relationship may be found in the forward converter switching art.) For the purposes of presenting the present invention and without loss of generality, the exemplary operating conditions presented hereinbelow assume that choke 3070 continuously provides current to load 3074 and makes use of the relationship $V_{OUT}=$(duty-cycle/100%)*$V_0$.

To prevent the core of transformer 3020 from saturating during steady-state operations, the time-integrated voltage across inductor 3023, and hence across each winding of transformer 3020, should be zero for each switching cycle, otherwise the magnetic flux in the core of transformer 3020 will saturate within a finite number of switching cycles. In the steady-state operation of converter 3000, the voltage $V_C$ across capacitor 3034 is at a value which sets the time-integrated voltage across inductor 3023 to zero during each switching cycle. This value is referred to as the required value for $V_C$ which prevents core saturation and may be determined as follows. During the ON-period duration $T_{ON}$, a voltage of $+V_0$ is applied to inductor 3023 by voltage source 3010. During the OFF-period duration $T_{OFF}$, the voltage applied to inductor 3023 is the negative of the voltage across storage capacitor 3034: $-V_C$. In this case, the time-integrated voltage during each switching cycle is determined as:

$$\text{Time Integrated Voltage} = T_{ON}V_0 - T_{OFF}V_C \qquad (1)$$

Setting the time integrated voltage to zero and solving for the required value of $V_C$, which sets the time-integrated voltage to zero, results in:

$$V_{CSS} = \frac{T_{ON}}{T_{OFF}} V_0 = \frac{(DC)}{(1-DC)} V_0 \qquad (2)$$

where the symbol $V_{CSS}$ represents the required value of $V_C$ for preventing core saturation during steady state operations and the symbol DC represents the given duty cycle.

To keep the voltage $V_C$ on storage capacitor 3034 at the required value $V_{CSS}$ under the conditions of constant input voltage, constant output voltage, and constant output load current, the flow of charge into storage capacitor 3034 during the first half of the OFF-period must be equal to the flow of charge out of storage capacitor 3034 during the second half of the OFF-period so that no net accumulation or depletion of charge occurs on storage capacitor 3034 during the OFF-period. Given that the magnetizing current $I_M$ increases at a constant rate during the ON-period, that $I_M$ decreases at a constant rate during the OFF-period and that $I_M$ is continuous, the waveform for the magnetizing current $I_M$ must be centered around a value of zero amperes in order to prevent a net charge accumulation or depletion on storage capacitor 3034 during the OFF-period. Otherwise, the voltage $V_C$ would shift away from the required $V_{CSS}$ value.

If the $I_M$ waveform is not centered around zero amperes, the voltage $V_C$ departs from the value $V_{CSS}$ in order to shift the $I_M$ waveform so that it is centered around zero amperes. For example, if the $I_M$ waveform is initially shifted upwards and centered around a positive current value, the shifted waveform will cause a net charge to flow into storage capacitor $C_C$, thereby raising the voltage $V_C$. In turn, the higher $V_C$ voltage causes the magnetizing current to decrease at a faster rate during the OFF-period, thereby shifting the $I_M$ waveform down to center the $I_M$ waveform around zero amperes within a finite number of switching cycles. Likewise, if the $I_M$ waveform is initially shifted downwards and centered around a negative current value, the shifted waveform will cause a net charge to flow out of storage capacitor $C_C$, thereby lowering the voltage $V_C$. In turn, the lower $V_C$ voltage causes the magnetizing current to decrease at a slower rate during the OFF-period, thereby shifting the $I_M$ waveform up to center the $I_M$ waveform around zero amperes within a finite number of switching cycles.

During power-up and during changing load conditions, the voltage value $V_{CSS}$ for storage capacitor 3034 is reached by the transient charging or discharging of storage capacitor 3034. If the voltage across storage capacitor 3034 is less than $V_{CSS}$. It takes a longer time duration to reverse the current-flow direction of $I_M$ and, consequently, more current flows into storage capacitor 3034 than flows out during the OFF-period. The net current flow into capacitor 3034 during each switching cycle raises the voltage across storage capacitor 3034 until the voltage $V_{CSS}$ is reached. Likewise, if the voltage on storage capacitor 3034 is greater than $V_{CSS}$, it takes a shorter time duration to reverse the current-flow direction of $I_M$ and, consequently, more current flows out of storage capacitor 3034 than flows in during the OFF-period. The net current flow out of capacitor 3034 during each switching cycle lowers the voltage across storage capacitor 3034 until the voltage $V_{CSS}$ is reached. During this transient charging condition, the waveform for the magnetizing current is not centered around a value of zero amperes.

The energy transferred out of storage capacitor 3034 during the latter part of the OFF-period is recycled to voltage source 3010. The reversal of current flow in the magnetizing current $I_M$ through inductor 3023 serves to reset the magnetic flux in the transformer's core at a point inside the third quadrant of the transformer's B-H characteristic. The utilization of the third quadrant in this manner increases the utilization of the transformer's core and, hence, the structure of transformer 3020 may be re-designed to decrease the dissipation losses in transformer 3020, as described above.

The steady-state waveforms for the key voltages and currents of forward converter 3000 are shown in timing diagram 4000 in FIG. 2. For the purposes of this discussion, each winding of transformer 3020 has the same number of turns and has no parasitic resistance and transformer 3020 is operated in the linear regime of its B-H characteristic. Additionally, each rectifier has a nominal voltage drop for forward conducting current, near zero current conduction for reverse applied voltage and has a nominal amount of reverse-recovery current. To simplify the discussion of forward converter 3000, the output voltage across load 3074 is taken to be constant at a value of $V_0/3$. Furthermore, load 3074 is taken to be resistive in nature without loss of generality.

The operation of primary switch means 3040 is shown in graph 4001 in FIG. 2 and the operation of auxiliary switch means 3030 is shown in graph 4009 in FIG. 2. Graph 4001 is in the form of a time line which indicates the ON-periods where primary switch means 3040 ($S_{PR}$) is closed and the OFF-periods where primary switch means 3040 is open. Graph 4009 is also in the form of a time line and indicates when auxiliary switch means 3030 ($S_A$) is closed and when auxiliary switch means 3030 is open. An exemplary duty-cycle of 33.3%, which is consistent with an output voltage $V_{OUT}$ of $V_0/3$, is shown for primary switch means 3040 ($S_{PR}$) in graph 4001.

The winding voltages $V_P$ and $V_S$ and the voltage $V_1$ are shown in graph 4002 in FIG. 2. For the primary circuit, the total primary current $I_P$ and the current $I_{CS}$ into capacitor $C_S$ are shown in graph 4003, the magnetizing current $I_M$ in inductor 3023 and the current $I_1$ in primary winding 3022 are shown in graph 4005 in FIG. 2. For the secondary circuit, the output voltage $V_{OUT}$ at load 3074 and the voltage $V_2$ are shown in graph 4006, the currents $I_{CR1}$ and $I_{CR2}$ in rectifiers 3050 (CR1) and 3060 (CR2) are shown in graph 4007, and the current $I_{LOUT}$ in choke inductor 3070 and the current $I_{LOAD}$ in load 3074 are shown in graph 4008 in FIG. 2. In comparing the rectifier currents in graph 4007 against the inductor current $I_{LOUT}$ in graph 4008, it may be seen that the rectifier current $I_{CR1}$ supports the inductor current $I_{LOUT}$ during the ON-periods and that the rectifier current $I_{CR2}$ supports the inductor current $I_{LOUT}$ during the OFF-periods.

During the ON-period, the voltage across primary winding 3022 and secondary winding 3024 is set by voltage source 3010 at a value of $V_0$ with the voltage $V_1$ across primary switch means 3040 at near zero volts, as shown in graph 4002. The application of $V_0$ across the secondary winding causes rectifier 3050 (CR1) to fully support the current in choke inductor 3070. Via the transformer action of transformer 3020, the rectifier current $I_{CR1}$ is replicated in the current $I_1$ of primary winding 3022, as shown in graph 4004. Also during the ON-period, the magnetizing current $I_M$ increases at a constant rate determined by the voltage applied across inductor 3023 and the magnetizing inductance of inductor 3023, as also shown in graph 4004. As discussed above, the magnetizing current during steady-state conditions is centered around a value of zero amperes, as shown in graph 4004. The total primary current $I_P$ is equal to the sum of $I_1$ and $I_M$ and is shown in graph 4003. During the ON-period, auxiliary switch means 3030 is open and, as such, the current $I_{CC}$ into capacitor 3034 is zero, as shown in graph 4005.

As switch means 3040 opens to begin the OFF-period, auxiliary switch means 3030 begins to close. During this switching transition, the magnetizing current in inductor 3023 initially flows into capacitor 3032 ($C_s$) and raises the voltage $V_1$ towards the voltage on capacitor 3034. Once auxiliary switch means 3030 closes, the magnetizing current in inductor 3023 flows into storage capacitor 3034. As mentioned above, the capacitance value of storage capacitance 3034 is sufficiently large so that the voltage across capacitor 3034 does not substantially change during the duration of the OFF-period. For an exemplary duty-cycle of 33.3%, the steady-state voltage on storage capacitor 3034 is equal to $V_0/2$, where $V_0$ is the value of voltage source 3010. This value is given by equation (2) above.

The application of $-V_0/2$ volts across primary winding 3022 and secondary winding 3024 by storage capacitor 3034 causes rectifier 3060 (CR2) to fully support the current in choke inductor 3070, as shown in graph 4007. As a result, the current in secondary winding 3024 ceases, as shown by $I_{CR1}$ in graph 4007, and the current in primary winding 3022 ceases, as shown by $I_1$ in graph 4004. Additionally, the magnetizing current $I_M$ in inductor 3023 decreases at a constant rate during the OFF-period, as shown by graph 4004. The magnetizing current $I_M$ initially flows into storage capacitor 3023. The rate of decrease in $I_M$ is equal in magnitude to half of the rate of increase in $I_M$ during the ON-period since the magnitude of applied voltage across inductor 3023 during the OFF-period is half the magnitude during the ON-period. Half way through the OFF-period, under steady-state conditions, $I_M$ reverses sign and flows out of storage capacitor 3023. The waveform of $I_M$ during the OFF-period is reflected in the waveforms for the total primary current $I_P$, as shown in graph 4003, and for the storage capacitor current $I_{CC}$, as shown in graph 4005.

Forward converter 3000 has two main advantages as compared with a basic forward converter. First, the waveform of magnetizing current $I_M$ is centered around zero amperes, indicating that the third quadrant of the transformer core's B-H characteristic is being utilized. In contrast, the magnetizing current waveform of the basic forward converter is non-negative and is not centered around zero amperes, indicating that only the first quadrant is used. The use of first and third quadrants by forward converter 3000 provides a larger range of linearity in the B-H characteristic, and hence the design of transformer 3020 can be optimized to lower the winding resistances and reduce power dissipation, as discussed above. Secondly, the voltage stress applied to the primary switch means 3040 during the OFF-period is reduced compared to that across the primary switch of a basic forward converter since the voltage applied to primary switch means 3040 during the OFF-period is equal to 3 $V_0/2$, assuming a 33.3% duty-cycle, rather than 2 $V_0$, as is the case for the primary switch of a basic forward converter. Forward converter 3000, however, does not address the power dissipation that occurs in primary switch means 3040 between the OFF and ON-periods, as discussed above. As can be seen in graphs 4002 and 4003 of FIG. 2, as converter 3000 switches from the OFF-period to the ON-period, the current $I_p$ through primary switch means 3040 is at a substantial negative value while the voltage $V_1$ across primary switch means 3040 is switching from 3 $V_0/2$ to zero volts.

To address this problem, an improvement to forward converter 3000 was proposed in 1987 by B. Carsten, "Design Tricks, Techniques and Tribulations at High Conversion Frequencies," HPFC, April 1987, p. 139. The proposed improvement uses the magnetizing current present in inductor 3023 during the end of the OFF-period to reduce the voltage at node $V_1$ by discharging stray (parasitic) capacitor 3032. Under some conditions, the voltage $V_1$ can be reduced to zero volts in this manner before primary switch means 3040 is closed, thereby significantly reducing the power dissipation in primary switch means 3040 during switching-on transitions. Under other conditions, however, the voltage $V_1$ can never be reduced to zero volts before primary switch means 3040 closes. As discussed below, the present invention identifies the causes which prevent zero voltage switching and provides means for overcoming these causes.

In this proposed improvement, a short delay period, or time duration, is introduced between the end of the OFF-period and the beginning of the ON-period where both primary switch means 3040 and auxiliary switch means 3030 remain open. This time period is shown at 4020 in FIG. 2 and is referred to as delay period 4020 for the purposes of this discussion. As can be seen in graph 4004, the magnetizing current $I_M$ through inductor 3023 is negative at the beginning of delay period 4020. Since both switch means 3040 and 3030 are open, no definite voltage is applied across inductor 3023 and primary winding 3022. Under this condition, the magnetizing current $I_M$ begins to flow through stray capacitor 3032, thereby reducing the voltage $V_1$ from 3 $V_0/2$ towards zero volts.

The magnetizing current continues to reduce the voltage $V_1$ until the voltage $V_1$ reaches a value of $V_0$. At this point, the voltages $V_P$ across primary winding 3022 and $V_S$ across secondary winding 3024 become positive and the secondary circuit begins conducting current through rectifier 3050 ($I_{CR1}$). Via transformer action, a current ($I_1$) flows in primary winding 3022 which is equal in magnitude to the current flowing in secondary winding 3024. This current flow in primary winding 3022 diverts some or all of the magnetizing current away from stray capacitor 3032. If the magnitude of the current in choke inductor 3070 is less than the magnitude of the magnetizing current $I_M$ at this point, a portion of the magnetizing current will continue to flow into stray capacitor 3032 and voltage $V_1$ will continue to be decreased. This portion of magnetizing current is equal to the magnetizing current less the current flowing in choke inductor 3070.

As the voltage $V_1$ is decreased, the applied voltage across primary winding 3022 and secondary winding 3024 increases, thereby increasing the current flow in choke inductor 3070 and secondary winding 3024. In turn, this increase in secondary current reduces the portion of magnetizing current which is flowing through stray capacitor 3032. At some point, the decrease in voltage $V_1$ ends because the current in secondary winding 3024 is increased to the point where it equals the magnetizing current in inductor 3023. Under certain load conditions and duty-cycles, it is possible to decrease the voltage $V_1$ to zero volts or less, thereby facilitating a zero-voltage-switching condition for primary switch means 3024. Such an exemplary case is shown in FIG. 2 where the voltage $V_1$ shown in graph 4002 is decreased to a negative value during delay period 4020.

However, it is also possible that the voltage $V_1$ cannot be reduced to zero volts due to the loading effects on secondary winding 3024. In some cases, the reduction of voltage $V_1$ ends at a positive voltage. More likely, however, the current through choke inductor 3070 is greater than the magnetizing current $I_M$ during the beginning of delay period 4020 and oftentimes throughout delay period 4020. In this case, the magnetizing current decreases voltage $V_1$ only to a value of $V_0$ volts, at which point all of the magnetizing current $I_M$ is diverted into secondary winding 3024, via primary winding 3022, and the voltage $V_1$ is clamped at a value of $V_0$. The remainder of the current flow in choke inductor 3070 is provided by rectifier 3060, which clamps voltage $V_2$ near zero volts. The current conduction in both rectifiers 3050 and 3060 clamps the secondary voltage $V_S$ to zero volts and, consequently, ensures that voltage $V_1$ remains at a value of $V_0$ volts. In this case, no zero-voltage switching is possible. Unfortunately, since forward converters are designed to maximize the current delivered to the load and to minimize the magnitude of magnetizing current, it is rarely possible to achieve a zero-voltage-switching condition because the load current is larger than the magnetizing current during the delay period.

The steady-state waveforms for the key voltages and currents of forward converter 3000 under the conditions where the current through choke inductor 3070 is greater than the magnetizing current during the delay period are shown in timing diagram 5000 in FIG. 3. Timing diagram 5000 comprises graphs 5001 through 5009 and a delay period 5020. Graphs 5001 through 5009 display the same information as graphs 4001 through 4009, respectively, as shown in FIG. 2. Once voltage $V_1$ is decreased to a value of $V_0$ volts at or near the beginning of delay period 5020, the current $I_{CR1}$ in secondary winding 3024 begins to flow, thereby clamping the voltage $V_S$ on secondary winding 3024 to zero volts since rectifier 3060 is still conducting. A voltage of zero volts is now applied to the windings of transformer 3020, and the magnetizing current is prevented from flowing into stray capacitor 3032. Instead, the magnetizing current, shown in graph 5004, is diverted in primary winding 3022, as shown by $I_1$ in graph 5004, which sets the current in secondary winding 3024 equal to the magnetizing current, as shown by $I_{CR1}$ in graph 5007. The remainder of the current $I_{LOUT}$ in choke inductor 3070, as shown in graph 5008, is conducted by rectifier 3060, as shown by $I_{CR2}$ in graph 5007. The voltage $V_1$ is thereby clamped at a value of $V_0$ volts and a zero-voltage-switching condition cannot be achieved.

The above described mechanism which diverts magnetizing current into secondary winding 3024 and resulting voltage clamping of the transformer windings during the delay period have thus far not been discussed nor addressed in the prior art. The present invention has recognized this diversion mechanism and clamping effect as a major hindrance to achieving a zero-voltage-switching condition for primary switch means 3040 in forward converter 3000 under all loading conditions. As discussed below, the present invention seeks to eliminate the diversion of magnetizing current and the resulting voltage clamping during the delay period, thereby permitting voltage $V_1$ to decrease to zero volts to provide a zero-voltage-switching condition for the primary switch means.

A first embodiment of the zero-voltage-switching converter according to the present invention is shown at 100 in FIG. 4. A power source 110 having a voltage of $V_0$ provides electrical power and energy to converter 100 at an input port 101. Converter 100 comprises a transformer 120 (T1) having a primary winding 122 and secondary winding 124, and a primary switch means 140 ($S_{PR}$) coupled in series with primary winding 122 and voltage source 110 for selectively coupling energy from voltage source 110 to transformer 120. Converter 100 further comprises a storage capacitor 134 ($C_C$) and a first switch means 130 ($S_1$) for selectively controlling the current flow through storage capacitor 134. First switch means 130 and storage capacitor 134 are coupled in series and the resulting series combination is coupled to either the primary winding of transformer 120 (as shown in FIG. 4) or the secondary winding of transformer 120 (not shown). In the embodiment shown in FIG. 4, the series combination is coupled in parallel with primary winding 122. As described below in greater detail, first switch means 130 and capacitor 134 collectively comprise a flux reversal means for reversing, during the OFF period of converter 100, the direction of the magnetic flux built up in transformer 120 during the preceding ON period.

Additionally, converter 100 includes a capacitor 132 ($C_S$) coupled between the switched terminal of primary winding 122 and ground for representing the combined stray (parasitic) capacitances of primary winding 122, primary switch means 140, and first switch means 130. It may be appreciated that each of primary winding 122, primary switch means 140, and first switch means 130 may include a parasitic capacitance, resulting from the non-ideal elements used in implementing each of these components. The parasitic capacitance of each of these components may, for example, be represented by a parasitic capacitor for each component terminal, each parasitic capacitor being coupled between its respective component terminal and ground. As these capacitances are parasitic in nature, their exact values are not precisely known and may, in fact, vary considerably in manufacturing. In a further embodiment of the present invention, capacitor 132 further comprises a fixed-value capacitor in addition to the parasitic capacitances so as to provide a more predictable capacitance value for capacitor 132, thereby increasing the manufacturing consistency of converter 100.

As discussed above with reference to converter 3000, an imaginary inductor is used to model the effects of the magnetizing energy of transformer 120. The modeling inductor is indicated in phantom as inductor 123 in FIG. 4 and is coupled in parallel with primary winding 122. As such, the magnetizing effects of transformer 120 can be readily analyzed in the form of a magnetizing current. The use of modeling inductor 123 in this manner is well known to the transformer art and not a real component of converter 100, but rather an imaginary modeling component which aids in explaining the characteristic behavior of the magnetizing energy in real transformer 120.

For directing and controlling the flow of power from transformer 120 to an output load 174, converter 100 further includes an output port 102 for providing power to load 174, a secondary switch means 150 coupled in series with the secondary winding for controlling the flow of current to load 174, and a rectifier 160 (CR2) coupled in parallel with the series combination of secondary switch means 150 and secondary winding 124. As described below in greater detail, secondary switch means 150 is operated such that it conducts substantially no current during a predetermined time interval prior to when primary switch means 140 is closed. This prevents the loading on secondary winding 124 from diverting the magnetizing current away from reducing the voltage across primary switch means 140. Converter 100 further includes a choke inductor 170 ($L_{OUT}$) coupled between secondary switch means 150 and load 174, and a load capacitor 172 ($C_{OUT}$) coupled in parallel with load 174. The current through load 174 is represented by the symbol $I_{LOAD}$ and, for the purposes of discussion and without loss of generality, is taken to be constant. Choke inductor 170 ($L_{OUT}$) and load capacitor 172 ($C_{OUT}$) provide means for filtering the power delivered to load 174.

Converter 100 further comprises a switch control means 180 for generating signals to control the operation of primary switch means 140, first switch means 130, and secondary switch means 150. Switch control means 180 comprises a port 181 coupled to primary switch means 140, a port 182 coupled to first switch means 130, and a port 183 coupled to secondary switch means 150. Port 181 transmits a signal which controls the operation of primary switch means 140, port 182 transmits a signal which controls the operation of first switch means 130, and port 183 transmits a signal which controls the operation of secondary switch means 150. As described in greater detail below, first switch means 130, capacitor 134, and secondary switch means 150 operate to reduce the voltage across primary switch means 140, and to preferably create a zero-voltage switching condition on switch means 140, when switch means 140 closes to begin the next ON period.

Certain voltages and currents in converter 100 are significant and their symbolic notations are detailed below with reference to FIG. 4. The voltage across primary winding 122 is designated as $V_P$, and the voltage across secondary winding 124 is designated as $V_S$. Each of these winding voltages is referenced such that the positive terminal coincides with the magnetic reference dot shown in FIG. 4. There are two node voltages of significance. At the node coupling the negative terminal of primary winding 122 to primary switch means 140, the voltage at this node with respect to the negative terminal of voltage source 110 is designated as $V_1$ and the node itself is referred to as node $V_1$. At the node coupling secondary switch means 150 and rectifier 160 to choke inductor 170, the voltage at this node with respect to the negative terminal of secondary winding 124 is designated as $V_2$ and the node itself is referred to as node $V_2$.

The following currents in converter 100 are significant. The current flowing into primary winding 122 at the positive terminal is designated as $I_1$, the current flowing into inductor 123 from voltage source 110 is designated as $I_M$, and the total primary current flowing into both inductor 123 and winding 122 from voltage source 110 is designated as $I_P$. The current flowing into stray capacitor 132 ($C_S$) from node $V_1$ is designated as $I_{CS}$ and the current flowing into storage capacitor 134 ($C_C$) from node $V_1$ is designated as $I_{CC}$. The current flowing into secondary switch means 150 from secondary winding 124 is designated as $I_{S2}$ and the current flowing out of the cathode terminal of rectifier 160 is designated as $I_{CR2}$. The current flowing through choke inductor 170 ($L_{OUT}$) is designated by the current reference designation $I_{LOUT}$, where the current reference flows toward load 174. The current flowing through load 174 is designated by the current reference designation $I_{LOAD}$, where the current reference flows from choke inductor 170 to ground.

For the purposes of discussion and without loss of generality, primary winding 122 and secondary winding 124 are taken to have the same number of turns. The dot notations for windings 122 and 124 indicate their polarities. An inductor 123 ($L_M$) is included, in phantom, in the circuit diagram for transformer 120 to model the effects of the magnetic flux and magnetizing current of transformer 120, as discussed above. As mentioned above, a magnetizing current must be provided to one of the windings of a real transformer to provide the magnetomotive force required to overcome the magnetic reluctance of the transformer's core. For a real transformer, the magnetizing current can be electrically modeled by a phantom inductor coupled in parallel with the primary winding of an ideal transformer, as shown by inductor 123. As such, the above mentioned current $I_P$ represents the current flowing into the primary winding of a real transformer, such as transformer 120, the above mentioned current $I_M$ represents the component of primary current $I_P$ needed to overcome the magnetic reluctance of the real transformer, and the above mentioned current $I_1$ represents the component of primary current $I_p$ which is actually transformed over to the secondary winding of the real transformer.

As with forward converter 3000, the operation of converter 100 is governed by primary switch means 140, which causes converter 100 to enter an ON-period when switch means 140 is closed and to enter an OFF-period when switch means 140 is open. First switch means 130 operates substantially counter to primary switch means 140 by closing substantially when primary switch means 140 opens to start an OFF-period and by opening prior to when primary switch means 140 closes to start an ON-period. Secondary switch means 150 operates substantially synchronously with primary switch means 140 by closing substantially when primary switch means 140 closes and by opening substantially when primary switch means 140 opens. The operation of converter 100 is explained in greater detail below with the assumption that the voltage at the positive terminal of capacitor 134 with respect to ground is greater than $V_0$, which is the voltage value of voltage source 110.

The operations of first switch means 130 and secondary switch means 150 are discussed in greater detail with reference to a timing diagram shown at 200 in FIG. 5, which shows the timing requirements for the operations of first switch means 130 and secondary switch means 150 with respect to primary switch means 140. A single switching cycle having an ON-period followed by an OFF-period is shown in graph 201. The opening and closing operations of primary switch means 140, which define the ON- and OFF-periods, is shown in graph 205 in FIG. 5. The high sections of graph 205 indicate the time durations where primary switch means 140 is closed and the low sections indicate the time durations where primary switch means 140 is open. The operation and timing requirements for first switch means 130 is shown in graph 210 and the operation and timing requirements for secondary switch means 150 is shown in graph 220 in FIG. 5.

Shown in graph 210 is a timing window 212 in which switch control means 180 closes first switch means 130. Timing window 212, as well as all other timing windows shown in timing diagram 200, is illustrated using a series of parallel skew lines (/). In a preferred embodiment of the present invention, timing window 212 is of a predetermined length and immediately follows the end of the ON-period. Timing window 212 does not preferably intersect with the ON-period. This is because, as discussed in greater detail below, the delay in closing first switch means 130 with respect to the opening of primary switch means 140 may be used to create a zero-voltage-switching condition for first switch means 130.

Also shown in graph 210 is a predetermined time delay 214 in which first switch means 130 is opened before primary switch means 140 is closed. As discussed below in greater detail, the time delay in closing first switch means 130 with respect to the opening of primary switch means 140 in timing window 212 may be used to provide a zero-voltage-switching condition for first switch means 130 and the time delay 214 between the opening of first switch means 130 and the closing of primary switch means 140 may be used to provide a zero-voltage-switching condition for primary switch means 140. As shown in graph 220, secondary switch means 150 is open during time delay 214 and, thereby, prevents the loading on secondary winding 124 from diverting the magnetizing current away from stray capacitor 132.

Shown in graph 220 is a timing window 222 in which switch control means 180 closes secondary switch means 150. In a preferred embodiment of the present invention, timing window 222 is of a predetermined length and immediately follows the end of the OFF-period. Timing window 222 preferably does not intersect with the OFF-period. This is because, as discussed in greater detail below, the delay in closing secondary switch means 150 with respect to the closing of primary switch means 140 may be used to allow primary switch means 140 to reach a full conduction state before primary switch means 140 has to conduct the reflected secondary current, thereby preventing an excessive secondary load current from pulling primary switch means 140 out of a zero-voltage switching condition.

Also shown in graph 220 is a timing window 224 in which switch control means 180 opens secondary switch means 150. In a preferred embodiment of the present invention, timing window 224 is of a predetermined length which starts during the ON-period and ends before the closing of first switch means 130 in timing window 212. Typically, secondary switch means 150 is opened synchronously with the opening of primary switch means 140. However, as discussed in greater detail below, the opening of secondary switch means 150 after the opening of primary switch means 140 may be used to direct the current in secondary winding 124, as reflected in primary winding 122, into stray capacitor 132 before first switch means 130 is closed. This reduces the amount of magnetizing current require to charge capacitor 132 and is useful at low duty-cycle conditions where the magnitude of the magnetizing current is small. As a result of conserving the magnetizing current at low duty-cycles, the range of duty-cycles over which a zero-voltage-switching condition for primary switch means 140 can occur is extended.

In the alternative, secondary switch means 150 may be opened before the opening of primary switch means 140, as shown at the dotted line 226 in graph 220. This opening may be used to reduce the current in secondary winding 124 and the corresponding reflected current in primary winding 122 before primary switch means 140 is opened. In such a case, only the magnetizing current component remains in primary winding 122 when primary switch means 140 is opened, thereby reducing the power dissipation and current stresses on primary switch means 140. The reduction of such stresses is important during high-load (i.e., high duty-cycle) conditions. Therefore, the opening of secondary switch means 150 in timing window 224 may be varied to minimize the power dissipation losses in primary switch means 140.

Also shown in timing diagram 200 is a first switching-event sequence 230 and a second switching-event sequence 240, which are used later with reference to FIGS. 6 and 7 in discussing the operation of converter 100. Sequences 230 and 240 each divides a single switching cycle into six continuous, non-overlapping segments: segments 1, 2, 3, 4, 5, and 6 for sequence 230 and segments 1, 2', 3', 4', 5 and 6 for sequence 240. The boundary of each segment is defined by a switching event in one of the switch means, 130, 140, and 150. Sequence 230 corresponds to the case where secondary switch means 150 is opened after primary switch means 140 is opened, as shown in window 224, and sequence 240 corresponds to the case where secondary switch means 150 is opened before primary switch means 140 is opened, as indicated by line 226.

Exemplary qualitative steady-state waveforms for the key voltages and currents of forward converter 100 under switching-event sequences 230 and 240 are shown in a timing diagram 300 in FIG. 6 and a timing diagram 400 in FIG. 7, respectively. For the purposes of this discussion and without loss of generality, it is assumed that each winding of transformer 120 has the same number of turns and has no parasitic resistance and transformer 120 is operated in the linear regime of its B-H characteristic. Additionally, rectifier 160 has a nominal voltage drop for forward conducting current, a near zero current conduction for reverse applied voltage and a nominal amount of reverse-recovery current. To simplify the discussion of forward converter 100 and without loss of generality, the output voltage across load 174 is taken to be constant at a value of approximately $V_0/3$ and the voltage on storage capacitor 134 is taken to be substantially constant at a value of approximately $V_0/2$. Without loss of generality, load 174 is taken to be resistive in nature and an exemplary duty-cycle of 33.3%, which is consistent with an output voltage $V_{OUT}$ of $V_0/3$, is used for primary switch means 140.

In FIG. 6, the operation of primary switch means 140 is shown in graph 301, the operation of first switch means 130 is shown in graph 302, and the operation of secondary switch means 150 is shown in graph 303. Graphs 301–303 are each in the form of a time line waveform which indicates that its corresponding switch means is closed when the waveform is high and that its corresponding switch means is open when the waveform is low. Sequence 230 of FIG. 5 is reproduced as sequence 304 in FIG. 6. Likewise, in FIG. 7, the operation of primary switch means 140 is shown in graph 401, the operation of first switch means 130 is shown in graph 402, and the operation of secondary switch means 150 is shown in graph 403. Graphs 401–403 are each in the form of a time line waveform which indicates that its corresponding switch means is closed when the waveform is high and its corresponding switch means is open when the waveform is low. Sequence 240 of FIG. 5 is reproduced as sequence 404 in FIG. 7. In order to more easily show the transitions of key voltages and current during segments 1, 3/3', 4/4' and 6, the time-scale during each of these segments is expanded by roughly an order of magnitude with respect to the time-scale used during segments 2/2', and 5 (i.e., the waveforms are "stretched out" during segments 1, 3/3', 4/4' and 6).

In FIG. 6, the winding voltages $V_P$ and $V_S$ and the voltage $V_1$ are shown in graph 310. For the primary circuit, the total primary current $I_P$ and the current $I_{CS}$ into capacitor $C_S$ are shown in graph 320, the magnetizing current $I_M$ in inductor 123 and the current $I_1$ in primary winding 122 are shown in graph 340 in FIG. 6. For the secondary circuit, the output voltage $V_{OUT}$ at load 174 and the voltage $V_2$ are shown in graph 350, the currents $I_{S2}$ and $I_{CR2}$ in secondary switch means 150 and rectifier 160 (CR2) are shown in graph 360, and the current $I_{LOUT}$ in choke inductor 170 and the current $I_{LOAD}$ in load 174 are shown in graph 370 in FIG. 6.

Likewise in FIG. 7, the winding voltages $V_P$ and $V_S$ and the voltage $V_1$ are shown in graph 410. For the primary circuit, the total primary current $I_P$ and the current $I_{CS}$ into capacitor $C_S$ are shown in graph 420, the magnetizing current $I_M$ in inductor 123 and the current $I_1$ in primary winding 122 are shown in graph 430, and the current $I_{CC}$ flowing into storage capacitor 134 is shown in graph 440 in FIG. 7. For the secondary circuit, the output voltage $V_{OUT}$ at load 174 and the voltage $V_2$ are shown in graph 450, the currents $I_{S2}$ and $I_{CR2}$ in secondary switch means 150 and rectifier 160 (CR2) are shown in graph 460, and the current $I_{LOUT}$ in choke inductor 170 and the current $I_{LOAD}$ in load 174 are shown in graph 470 in FIG. 7.

During segment 1 of sequences 230 (cf., FIG. 6) and 240 (cf., FIG. 7), primary switch means 140 is closed and both first switch means 130 and secondary switch means 150 are open. As discussed below, the voltage across primary switch means 140 has been driven to substantially zero volts in the preceding segment, segment 6, and a zero-voltage-switching condition exists across primary switch means 140 when it closes. The zero-voltage-switching condition is shown at 311 and 313 of graph 310 in FIG. 6 and at 411 and 413 of graph 410 in FIG. 7. During segment 1, a voltage of $V_0$ appears across primary winding 122, secondary winding 124, and magnetizing inductor 123. In this segment, only the magnetizing current $I_M$ flows in inductor 123 and primary switch means 140, since secondary switch means 150 is open. The magnetizing current increases at a constant rate and, as in converter 3000, increases from a negative value.

In a preferred embodiment of the present invention, primary switch means 140 comprises a transistor switching device and the duration of segment 1 is sufficiently long to allow the transistor switching device to reach a full conducting state (i.e., lowest conducting resistance) after being switched on at the beginning of segment 1. The conduction of current in secondary 124 is held off until segment 2/2′, at which time the transistor switching device of primary switch means 140 has lowered its ON-resistance to the point that the addition of the reflected secondary current will not substantially raise the voltage across the device's conducting terminals and, hence, will not increase the power dissipation in the device.

During segment 2 of sequence 230 (cf., FIG. 6) and segment 2′ of sequence 240 (cf., FIG. 7), secondary switch means 150 is closed. During segments 2 and 2′, the voltage of $V_0$ appearing across secondary winding 124 and the closing of switch means 150 causes a current to flow through secondary winding 124 and a corresponding current to flow in primary winding 122, due to transformer action. The magnetizing current in inductor 123 continues to increase at a constant rate due to the application of a constant voltage of $V_0$ across inductor 123 by voltage source 110. During this segment, power is transferred to the secondary circuit from the primary circuit.

In sequence 230 (cf., FIG. 6), the power transfer continues until primary switch means 140 is opened, when segment 3 begins. During segment 3, the magnetizing current $I_M$ flows into stray capacitor 132, shown in FIG. 4. This flow raises the voltage $V_1$ and, at the same time, lowers the voltage across primary winding 122 and secondary winding 124. The current in secondary winding 124 is governed by choke inductor 170 and continues to flow because the voltage across secondary winding 124, $V_S$, continues to be positive. The positive value for $V_S$ prevents rectifier 160 from conducting the current in choke inductor 170. As a result, the secondary current continues to be reflected in primary winding 122, which adds constructively with the magnetizing current $I_M$ to charge stray capacitor 132.

The voltage across stray capacitor 132 continues to rise during segment 3 (cf., FIG. 6) until it reaches a value of $V_0$ volts, at which time secondary switch means 150 is opened to start segment 4. If secondary switch means 150 is not opened when the voltage $V_1$ across stray capacitor 132 reaches $V_0$ volts, the voltage $V_S$ across secondary winding 124 would be clamped to substantially zero volts by rectifier 160. As a result, the voltage $V_1$ would be clamped to $V_0$ volts and the magnetizing current would be diverted to secondary winding 124. In segment 4, the magnetizing current $I_M$ continues to charge stray capacitor 132 until the voltage $V_1$ substantially reaches the voltage on the positive terminal of storage capacitor 134 at the end of segment 4. First switch means 130 may then be closed with zero volts across its conduction terminals, a zero-voltage-switching condition, to start segment 5. In FIG. 6, the zero-voltage-switching condition for switch means 130 is shown at 312 in graph 310, where voltage $V_1$ reaches the voltage on the positive terminal of storage capacitor 134. For an exemplary duty-cycle of 33.3%, the voltage on the positive terminal of storage capacitor 134 is equal to $3/2V_0$.

For sequence 240 (cf., FIG. 7), the power transfer continues during segment 2′ until secondary switch means 150 is opened. The opening ends segment 2′ and begins segment 3′. During segment 3′, the reflection of secondary current in primary winding 122 ends. The magnetizing current $I_M$, however, continues to flow and increases in value due to the continuing application of $V_0$ volts across magnetizing inductance 123. Nonetheless, the current in primary switch means 140 is significantly reduced so that primary switch means 140 may be opened with lower current stresses and lower power dissipation. This opening of primary switch means 140 ends segment 3′ and begins segment 4′.

During segment 4′ (cf., FIG. 7), the magnetizing current $I_M$ flows into stray capacitor 132, which raises the voltage $V_1$. Segment 4′ ends when the voltage $V_1$ substantially reaches the voltage on the positive terminal of storage capacitor 134. At the end of segment 4′, first switch means 130 may be closed with zero volts across its conduction terminals, a zero-voltage-switching condition, to start segment 5. In FIG. 7, the zero-voltage-switching condition is shown at 412 in graph 410, where voltage $V_1$ reaches the voltage on the positive terminal of storage capacitor 134. For an exemplary duty-cycle of 33.3%, the voltage on the positive terminal of storage capacitor 134 is equal to $3/2\ V_0$.

During segment 5 for both sequences 230 (cf., FIG. 6) and 240 (cf., FIG. 7), primary switch means 140 and secondary switch means 150 are opened and first switch means 130 is closed. The voltage across primary winding 122 and secondary winding 124 is set at a negative value equal to the voltage $V_C$ across storage capacitor 134, approximately $-V_0/2$. The magnetizing current $I_M$ is diverted away from charging stray capacitor 132 and flows into storage capacitor 134. In a preferred embodiment of the present invention and without loss of generality, the capacitance of storage capacitor 134 is large enough so that the voltage across storage capacitor 134 does not substantially change during segment 5. (The zero-voltage switching on primary switch means 140 and the other benefits of the present invention could be maintained with smaller capacitance values for storage capacitor 134, even though this would cause voltage variations across capacitor 134 during segment 5.) Since a constant negative voltage is being applied to inductor 123 during segment 5, the magnetizing current $I_M$ decreases at a constant rate, thereby acting to reset the transformer core. The duration of segment 5 is sufficiently long that the magnetizing current $I_M$ reverses direction and flows out of storage capacitor 134 into voltage source 110. The magnitude of the current flow $I_M$ out of storage capacitor 134 continues to grow until first switch means 130 opens, at which time segment 6 begins.

In the above-described way, capacitor 134 and first switch means 130 reverse the direction of the magnetizing current $I_M$ during segment 5. Additionally, and related thereto, capacitor 134 and switch means 130 reverse the value, or direction, of the magnetic flux in transformer 120. This is because they apply a negative voltage to transformer 120 (e.g., $-V_0/2$) during segment 5, which is opposite to the positive voltage (e.g., $V_0$) applied to transformer 120 during segment 2/2′. As is known in the transformer art, the change in the flux in transformer 120 is related to the voltage applied to the transformer windings, i.e., $V = d\Phi/dt$. During the ON-period (segments 1, 2/2', and 3'), the flux $\Phi$ increases and is at a positive value at the end of the ON-period (first quadrant of the B-H characteristic). Corresponding to this positive flux value, the magnetic flux has a first direction through the windings of transformer 120. During the application of the negative voltage during segment 5, the flux $\Phi$ decreases towards a negative value, or a second flux direction opposite to the first flux direction. In a preferred embodiment of the present invention, the flux $\Phi$ reaches a negative value at the end of segment 5, corresponding to the second flux direction (third quadrant of the B-H characteristic). In this way, capacitor 134 and first switch means 130 collective comprise flux reversal means for reversing, during segment 5 of the OFF-period, the direction of the magnetic flux in transformer 120 which was built up during the previous ON-period.

The reversal in the flux is related to the reversal in the magnetizing current. As is known in the art, the transformer's magnetizing current $I_M$ and magnetic flux are related to one another by the B-H characteristic, with the flux being related to the flux density B (y-axis) and the magnetizing current being related to the magnetic field H (x-axis). For a transformer having no significant hysteresis, the magnetizing current is positive when the flux is positive (first direction) and is negative when the flux is negative (second direction). Additionally, when the transformer is operated in the linear region of its B-H characteristic, the magnetizing current $I_M$ and magnetic flux are proportionally related. With core hysteresis, the B-H characteristic covers portions of the second and fourth quadrant and, as a result, the magnetizing current $I_M$ may reverse signs before the magnetic flux reverses signs.

In segment 6, which begins with the opening of first switch means 130, the magnetizing current $I_M$ is diverted away from storage capacitor 134 towards stray capacitor 132, where it discharges stray capacitor 132. As a result, the voltage $V_1$ is reduced in value towards zero volts. Unlike converter 3000, the secondary circuit in converter 100 is prevented from interfering with the discharging of stray capacitor 132 since secondary switch means 150 is opened during segment 6. At the end of segment 6, voltage $V_1$ is decreased to a value of zero volts and primary switch means 140 is closed with a zero-voltage-switching condition to start segment 1. Given the small capacitance value of stray capacitor 132 and the typically large magnitude value of the magnetizing current $I_M$ during segment 6, the magnitude of $I_M$ only decreases slightly during segment 6. In this way, first switch means 130, capacitor 134, and secondary switch means 150 operate to reduce the voltage across primary switch means 140 and preferably operate to create a zero-voltage switching condition on primary switch means 140 when it closes at the beginning of segment 1 to start the next ON period.

As in forward converter 3000, the time-integrated voltage across inductor 123 should be zero for each switching cycle during the steady-state operation of converter 100 to prevent the core of transformer 120 from saturating. In the steady-state operation of converter 100, the voltage $V_C$ across capacitor 134 is at a value which sets the time-integrated voltage across inductor 123 to zero during each switching cycle. This value is referred to as the required value for $V_C$ which prevents core saturation and is similar to the required value $V_{CSS}$ determined for forward converter 3000.

Given the additional segments present for converter 100, specifically segments 1, 3/3', 4/4' and 6, the calculation of the exact value for $V_{CSS}$ is more complex. In practice, however, the duration of segments 1, 3/3', 4/4' and 6 are extremely small compared to the duration of segments 2/2' and 5, and the above equation (2) for $V_{CSS}$ in converter 3000 serves as a good approximation for $V_{CSS}$ in converter 100.

To keep the voltage $V_C$ on storage capacitor 134 at the required value $V_{CSS}$ under the conditions of constant input voltage, constant output voltage, and constant output load current, the flow of charge into storage capacitor 134 during the first half of segment 5 must be equal to the flow of charge out of storage capacitor 134 during the second half of segment 5 so that no net accumulation or depletion of charge occurs on storage capacitor 134 during the OFF-period. As discussed above, this same requirement was found for converter 3000. As in converter 3000, the waveform for the magnetizing current $I_M$ in converter 100 under steady-state conditions is centered around a value of zero amperes in order to prevent a net charge accumulation or depletion on storage capacitor 134 during the OFF-period. Otherwise, the voltage $V_C$ would shift away from the required $V_{CSS}$ value.

As found in converter 3000, the voltage $V_C$ and the magnetizing current $I_M$ interact so as to center the $I_M$ waveform around a value of substantially zero amperes. Additionally, the voltage value $V_{CSS}$ for storage capacitor 134 is reached during power-up conditions by transient charging or discharging of storage capacitor 134 in the same manner found in converter 3000. Also, the energy transferred out of storage capacitor 134 during the latter part of segment 5 is recycled to voltage source 110. The reversal of current flow in the magnetizing current $I_M$ though inductor 123 serves to reset the magnetic flux in the transformer's core at a point inside the third quadrant of the transformer's B-H characteristic.

The following exemplary component parameters and operating conditions of converter 100 are provided as an aid in practicing the present invention. In an exemplary embodiment of the present invention, the input voltage ($V_0$) is set at 300 V to deliver a typical output current of 1.0 A at an output voltage ($V_{OUT}$) of approximately 100 V. A switching frequency of 400 kHz is used in this exemplary embodiment with a typical duty-cycle of approximately 45%. Primary switch means 140 comprises a field-effect transistor having a breakdown voltage of 800 V and an on-resistance of 3 ohms (part number IRFBE30 from International Rectifier Corporation), first switch means 130 comprises a field-effect transistor having a breakdown voltage of 800 V and an on-resistance of 6 ohms (part number IRFBE20 from International Rectifier Corporation), and secondary switch means 150 comprises a field-effect transistor having a breakdown of 600 V and an on-resistance of 2.2 ohms (part number IRFBC30 from International Rectifier Corporation). In this exemplary embodiment, storage capacitor 134 ($C_C$) has a capacitance of approximately 2200 pF, stray capacitor 132 ($C_S$) has a capacitance of approximately 140 pF, and transformer 120 has an effective magnetizing inductance ($L_M$ of inductor 123) of approximately 600 $\mu$H. With this value of magnetizing inductance and under the above operating conditions, the magnetizing current has a peak-to-peak value of approximately 0.6 A.

It may now be appreciated that the following modifications of forward converter 100 shown in FIG. 4 are equivalent to the specific topology shown in FIG. 4. First, it may be appreciated that the series combination of storage capacitor 134 and first switch mean 130 may be coupled to secondary winding 124, preferably in parallel, instead of primary winding 122. This equivalence is pointed out in U.S. patent application Ser. No. 07/688,587, filed Mar. 13, 1991 for Zero Voltage Switching Power Converter, now U.S. Pat. No. 5,173,846. In the present invention, the coupling of the series combination must be placed before secondary switch means 150. Second, it may be appreciated that the negative terminal of storage capacitor 134 may be coupled to any constant voltage reference, such as ground. In the case where the negative terminal is coupled to ground, the current flow through capacitor 134 returns back to transformer 120 by way of voltage source 110. In this sense, it may be said that the series combination is coupled in parallel with the primary winding. In a further embodiment to this, the series combination may be connected in parallel with primary switch means 140, which is shown at 100b in FIG. 4A. The reference number of each element of converter 100b comprises the reference number of the corresponding element of converter 100 plus an appended designation "b". Third, it may be appreciated that the positions of storage capacitor 134 and first switch means 130 in the series combination may be reversed. Fourth, it may be appreciated that rectifier 160, choke inductor 170, and output capacitor 172 are not essential in providing zero-voltage-switching conditions for primary switch means 140 and for first switch means 130.

It may be appreciated that switch control means 180 shown in FIG. 4 may comprise a digital microprocessor for generating the control signals for primary switch means 140, first switch means 130, and secondary switch means 150 according to the timing constraints detailed in timing diagram 200 shown in FIG. 5. Given the inductance $L_M$ of the magnetizing inductor 123 and capacitance $C_S$ of stray capacitor 132, the duration of the segments 1, 2/2', 3/3', 4/4', 5 and 6 required for providing zero-voltage switching can be calculated as a function of duty-cycle for the steady-state operation of converter 100. These values may be stored in a conventional memory accessible to the microprocessor and the microprocessor may select the appropriate value for each segment as dictated by the then current value of the duty-cycle.

In a further microprocessor-based embodiment of switch control means 180, it may be appreciated that active voltage sensors may be coupled to primary switch means 140 and first switch means 130 for detecting zero-voltage conditions across their respective switch means. The microprocessor of switch control means 180 may then use this information in setting the duration of segments 3/3', 4/4' and 6 rather than using predetermined stored values for such segments. The advantage of this more active approach is that the zero-voltage-switching conditions may be achieved in transient conditions as well as steady-state conditions. Additionally, the zero-voltage-switching conditions are no longer dependent on knowing the exact values for $L_M$ and $C_{CS}$. As a result, forward converter 100 may be constructed with components having wider parameter ranges and tolerances, leading to higher yields and lower unit costs in the manufacturing of forward converter 100.

Similar benefits may be achieved with the following embodiments of primary switch means 140 and first switch means 130 shown at 540 and 530, respectively, in FIG. 8. Embodiments 540 and 530 are shown in the context of a partial block diagram 500 of forward converter 100, which is shown in FIG. 4. Primary switch means 540 comprises a parallel combination of a rectifier 541 and a switch means 542. Primary switch means 540 is oriented in forward converter 100 such that rectifier 541 conducts a current directed from the negative terminal of voltage source 110 to the positive terminal of voltage source 110 (e.g., the cathode of rectifier 541 is coupled to voltage node $V_1$). Similarly, first switch means 530 comprises a parallel combination of a rectifier 531 and a switch means 532. First switch means 530 is oriented in forward converter 100 such that rectifier 531 conducts a current directed from voltage node $V_1$ to storage capacitor 134 (e.g., the anode of rectifier 531 is coupled to voltage node $V_1$).

With reference to timing diagrams 300 and 400 shown in FIGS. 6 and 7, respectively, the following properties of operation for rectifiers 541 and 531 in converter 100 are discussed below. Rectifier 541 conducts current from voltage source 110 to the node $V_1$ when the voltage between node $V_1$ and the negative terminal of voltage source 110 becomes zero or negative. In timing diagrams 300 and 400 shown in FIGS. 6 and 7, this condition occurs when voltage $V_1$ is driven to zero volts in segment 6, as shown at points 311 and 313. Thus, the current in primary switch means 540 may be conducted by rectifier 541 during the first part of segment 1 and, possibly, segment 2/2', if switch means 542 is not closed. If switch means 542 remains open, rectifier 541 will continue to conduct current during segments 1 and 6 as long as the primary current, shown at graph 320 in FIG. 6 and 420 in FIG. 7, remains negative. Thus, the incorporation of rectifier 541 with switch means 540 provides a relatively wide window in which switch means 542 may be closed with respect to the opening of first switch means 530.

Likewise, rectifier 531 conducts current from node $V_1$ to the positive terminal of storage capacitor 134 when the voltage at node $V_1$ is equal to or greater than the voltage at the positive terminal of capacitor 134. In timing diagrams 300 and 400 shown in FIGS. 6 and 7, this condition occurs when the voltage $V_1$ is being driven to a high positive voltage at the end of segments 4/4' by the magnetizing current $I_M$, as shown at 312 and 412, respectively. Thus, if switch means 532 is not closed, the current in first switch means 530 may be conducted by rectifier 531 during the first part of segment 5 since the direction of the magnetizing current is the same as the conducting direction of rectifier 531, as shown at graphs 330,340 and 430,440 in FIGS. 6 and 7. If switch means 532 remains open during segment 5, rectifier 531 will continue to conduct the current through first switch means 530 until the magnetizing current $I_M$ reverses direction half-way through segment 5, assuming steady-state operating conditions. The closing of switch means 532 may then be delayed until the midpoint of segment 5, assuming steady-state operating conditions. Thus, the incorporation of rectifier 531 with switch means 530 provides a relatively wide window in which switch means 532 may be closed with respect to the opening of primary switch means 540.

In a broader viewpoint, rectifier 531 comprises means for detecting a zero-voltage-switching condition across first switch means 530 and means for initially conducting current through switch means 530 upon the occurrence of a zero-voltage-switching condition across switch means 530. Likewise, rectifier 541 comprises means for detecting a zero-voltage-switching condition across primary switch means 540 and means for initially conducting current through switch means 540 upon the occurrence of a zero-voltage-switching condition across switch means 540. As such, in this embodiment the timing for the closing of switch means 532 and switch means 542 is not as critical. The detecting and conducting means provided by rectifiers 531 and 541 may be used in a number of ways, as described below.

First, first switch means 530 and primary switch means 540 may be controlled by the microprocessor-based implementation of switch control means 180 discussed above, which determines the length of each segment as a function of the duty-cycle. In this embodiment, switch means 542 of primary switch means 540 is operated as shown in graph 205 in FIG. 5 and switch means 532 of first switch means 530 is operated as shown in graph 210 in FIG. 5. This implementation would ensure zero-voltage-switching conditions for steady-state operating conditions and for some, but not all, transient conditions and parameter variations. More specifically, zero-voltage switching would occurs for those transient conditions and parameter variations which would normally lead to a negative-voltage-switching condition on primary switch means 140 and positive-voltage-switching condition on first switch means 130 since rectifiers 541 and 531 would conduct under these conditions. Zero-voltage switching would not occur for those transient conditions and parameter variations which would normally lead to a positive-voltage-switching condition on primary switch means 140 and a negative-voltage-switching condition on first switch means 130, since rectifiers 541 and 531 would not conduct under these conditions. In these latter cases, the magnetizing current is not large enough in magnitude to reduce the voltage across switch means 530 and 540 to zero volts in the time interval (segment) allowed.

Second, by extending the amount of time for the magnetizing current to reduce the voltage across first switch means 530 to zero volts during segments 3 and 4/4' and the voltage across primary switch means 540 during segment 6, zero-voltage-switching can occur for the above latter cases. This may be accomplished by increasing the delay in closing switch means 532 (first switch means 530) after the opening of primary switch means 540, which is normally equal to the sum of segments 3 and 4/4', and by increasing the delay in closing switch means 542 (primary switch means 540) after the opening of first switch means 530, which is normally equal to the duration of segment 6. Under steady-state conditions and with parameter values at their target values, the increase of the delay in closing switch means 532 causes rectifier 531 to conduct and to initiate segment 5. Likewise, the increase of the delay in closing primary switch means 542 causes rectifier 541 to conduct and initiate segment 1. In this way, zero-voltage switching can occur in switch means 530 and 540 over a greater range of transient conditions and parameter variations.

Given the above exemplary use of switch means 530 and 540, it may be appreciated that switch means 530 and 540 may be used with an embodiment of switch control means 180 which is less complex than the above referenced microprocessor-based embodiment.

In another embodiment of converter 100, the delay in closing switch means 542 (primary switch means 540) after the opening of switch means 532 (first switch means 530) is set to a predetermined, fixed value. Since a fixed delay value is used, the calculation facilities of a microprocessor are no longer needed and less complex circuitry may be used for this exemplary embodiment of switch control means 180. The fixed delay value is applicable to a predetermined range of duty-cycles and is set to the longest time duration for segment 6 in the given range of duty-cycles. Assuming a steady-state operation for converter 100, the longest duration for segment 6 occurs for the lowest duty-cycle in the given range. Operating at the lowest duty-cycle value in the range, rectifier 541 begins to conduct at the same point switch means 542 is closed. As the duty-cycle increases with respect to the lowest value, rectifier 541 conducts prior to the closing of switch means 542 and provides for zero-voltage switching for primary switch means 540.

Likewise, the delay in closing switch means 532 (first switch means 530) after the opening of switch means 542 (first switch means 540) may be set to a predetermined, fixed value for a predetermined range of duty-cycles. In the case of sequence 230, shown in FIG. 5, the fixed delay value is set to the longest time duration of the sum of segments 3 and 4 in the given range of duty-cycles. Assuming a steady-state operation for converter 100, the longest duration for the sum of segments 3 and 4 occurs for the lowest duty-cycle in the given range. In the case of sequence 240, shown in FIG. 5, the fixed delay value is set to the longest time duration of segment 4' in the given range of duty-cycles. Assuming a steady-state operation for converter 100, the longest duration for segment 4' also occurs for the lowest duty-cycle in the given range. Operating at the lowest duty-cycle value in the range, rectifier 531 begins to conduct at the same point switch means 532 is closed. As the duty-cycle increases with respect to the lowest value, rectifier 531 conducts prior to the closing of switch means 532 and provides for zero-voltage switching for primary switch means 530.

It may be appreciated that given timing diagram 200 shown in FIG. 5, a practitioner of ordinary skill would be able to construct an embodiment of switch control means 180 which provides such fixed delay periods as described above. Such a fixed-delay embodiment of switch control means 180 is described in greater detail in U.S. patent application Ser. No. 07/668,587, filed Mar. 13, 1991 for Zero Voltage Switching Power Converter, now U.S. Pat. No. 5,173,846. It may also be appreciated that an autonomous secondary-side control means as described in the above U.S. patent application Ser. No. 07/668,587 may be used to control secondary switch means 150.

The flux reversal means according to the present invention may be provided by other components and circuit configurations than the active clamp combination of first switch means 130 and storage capacitor 134. As indicated above, the function of the flux reversal means is to change the direction of magnetizing current and magnetic flux in transformer 120 during the converter's OFF period so that oppositely directed magnetizing current may be used to later discharge stray capacitor 132 to provide zero volts across primary switch means 140. In another embodiment of the present invention shown at 600 in FIG. 9, the flux is reversed during the OFF period by a third winding of transformer 120 which is selectively coupled to a reversing voltage by a switch means. The third winding is preferably a second primary winding of transformer 120. In other embodiments of the present invention, as shown in FIGS. 12 and 14 and described below, a reversing voltage is applied to primary winding 122 of transformer 120 rather than adding a second primary winding.

The following discussion relates to the zero-voltage-switching converter according to the present invention shown at 600 in FIG. 9. As with converter 100 shown in FIG. 4, converter 600 comprises transformer 120, including primary winding 122 and secondary winding 124, primary switch means 140 ($S_{PR}$) coupled in series with primary winding 122, capacitor 132 ($C_S$) coupled between the switched terminal of primary winding 122 and ground for representing combined stray (parasitic) capacitances, and secondary switch means 150 coupled in series with secondary winding 124, as described above. Primary switch means 140 and primary winding 122 are coupled to voltage source 110 such that a flux in one direction (e.g., positive flux) may be built up in transformer 120 when switch means 140 is closed. Additionally, converter 600 includes input port 101, output port 102, rectifier 160, choke inductor 170, and load capacitor 172 coupled to one another and between secondary switch means 150 and load 174 as described above. As with converter 100, inductor 123 is used to model the effects of the magnetizing energy of transformer 120 and is indicated in phantom in FIG. 9. Inductor 123 is coupled in parallel with primary winding 122. Voltage source 110 ($V_0$) provides electrical energy to converter 600 and is coupled to primary winding 122.

Converter 600 further comprises a flux reversal means 610 for reversing the direction of magnetic flux built up in transformer 120. Reversal means 610 includes a third winding 126 of transformer 120, a first switch means 630 coupled to one terminal of third winding 126, and a capacitor 632 ($C_{S2}$) coupled between the switched terminal of winding 126 and a fixed reference potential (i.e., ground). The series combination of first switch means 630 and third winding 126 is coupled between voltage source 110 and ground by way of input port 101. In a preferred embodiment of converter 600, third winding 126 is located on the primary side of transformer 120 as a second primary winding. Whereas primary switch means 140 and primary winding 122 are arranged to build up flux in one direction (e.g., positive flux) in transformer 120, third winding 126 and first switch means 630 are coupled to voltage source 110 such that a flux in the opposite direction (e.g., negative flux) may be built up in transformer 120 when switch means 630 is closed. This is done by applying a reversing voltage to third winding 126.

Capacitor 632 represents the combined stray (parasitic) capacitances of third winding 126 and first switch means 630. It may be appreciated that each of third winding 126 and first switch means 630 may include a parasitic capacitance, resulting from the non-ideal elements used in implementing each of these components. The parasitic capacitance of each of these components may, for example, be represented by a parasitic capacitor for each component terminal, each parasitic capacitor being coupled between its respective component terminal and ground. As these capacitances are parasitic in nature, their exact values are not always precisely known and may vary considerably in manufacturing. In a further embodiment of converter 600, capacitor 632 further comprises a fixed-value capacitor in addition to the parasitic capacitances so as to provide a more predictable capacitance value for capacitor 632, thereby increasing the manufacturing consistency of converter 600.

Converter 600 may be configured as a single-ended forward converter, such as converter 100, or may be configured as a push-pull converter, the latter of which is shown in FIG. 9. When configured in a push-pull topology, converter 600 further includes a fourth winding 128 of transformer 120 coupled in parallel with secondary winding 124 and, in a preferred embodiment, two rectifiers 161 and 162. Fourth winding 128 is preferably located on the secondary side of transformer 120 as a second secondary winding. Rectifier 161 is coupled between secondary winding 124 and secondary switch means 150 such that current may be directed to secondary switch means 150 when primary switch means 140 is closed (e.g., anode terminal coupled to the dotted terminal of winding 124). Rectifier 162 is coupled between fourth winding 128 and secondary switch means 150 such that current may be directed to secondary switch means 150 when first switch means 630 is closed (e.g., anode terminal coupled to the non-dotted terminal of winding 128). Rectifiers 161 and 162 are also oriented to prevent windings 124 and 128 from short-circuiting one another. When configured as a single-ended forward converter, fourth winding 128 and rectifier 162 are not needed and may be removed. Rectifier 161 may be retained or may be replaced by a conductive wire coupling secondary winding 124 directly to secondary switch means 150.

Converter 600 further comprises a switch control means 280 for generating signals to control the operation of primary switch means 140, first switch means 630, and secondary switch means 150. Switch control means 280 includes a port 281 coupled to primary switch means 140 for providing a control signal thereto, a port 282 coupled to first switch means 630 for providing a control signal thereto, and a port 283 coupled to secondary switch means 150 for providing a control signal thereto. When converter 600 is configured as single-ended converter, switch means 140, 630, and 150 may be operated according to the timing diagram 200 shown in FIG. 5, where first switch means 630 is operated in the manner that first switch means 130 is operated. As such, control means 280 may function in the same manner as control means 180 and control means 180 may be used in its place. However, in those cases where flux reversal means 610 applies a fixed reversing voltage, the duty cycle of converter 600 should be set to a value which causes equal amounts of negative and positive volt-seconds to be applied to the windings of transformer 120. In the embodiment shown in FIG. 9 where primary switch means 140 applies a positive $V_0$ to the windings when it is closed and first switch means 630 applies a negative $V_0$ when it is closed, the duty-cycle should be set close to 50% such that switch means 140 and 630 are closed for equal durations of time.

When converter 600 is configured in a push-pull topology, switch means 140, 630, and 150 may also be operated according to the timing diagram 200 shown in FIG. 5, where first switch means 630 is operated in the manner that first switch means 130 is operated. Flux reversal means 610 thereby operates to reverse the direction of the magnetizing current $I_M$ during the OFF-period (i.e., open state of primary switch means 140) and secondary switch means 150 is operated as described above to ensure zero-voltage switching on primary switch means 140 when it is next caused to close. As with converter 100, the magnetizing current $I_M$ discharges capacitor 132 just before primary switch means 140 closes to provide the zero-voltage switching condition. When operated according to timing diagram 200 (cf. FIG. 5), no power would be transferred to load 174 by fourth winding 128 because secondary switch means 150 would be open during segment 5. To enable fourth winding 128 to transfer power, secondary switch means 150 may be closed during segment 5, but should be opened during the latter portion of segment 6 to prevent the loading on windings 124 and 128 from diverting the magnetizing current $I_M$ of transformer 120 away from reducing the voltage across primary switch means 140.

As with first switch means 130, as described above with reference to FIG. 5, a zero voltage condition may also be generated across first switch means 630. It may be appreciated that since the primary circuit of converter 600 is symmetric, first switch means 630 may have its voltage reduced to zero in an analogous way as is done for primary switch means 140, i.e., by the magnetizing current $I_M$ discharging stray capacitor 632 to zero volts before switch means 630 is closed. However, as with primary switch means 140, the secondary circuit may divert the magnetizing current away from discharging capacitor 632 unless secondary switch means 150 is operated to isolate the secondary circuit at the appropriate time. This isolation time where secondary switch means 150 should be open occurs during the latter portion of segments 3 and 4 of switching sequence 230 and the latter portion of segment 4' of sequence 240.

A timing diagram showing a more rigorous timing relationship for the operation of switch means 140, 630 and 150 for zero-voltage switching on both of switch means 140 and 630 is shown at 650 in FIG. 10. Timing diagram 650 also shows the timing requirements for the operations of secondary switch means 150 with respect to the operation of primary switch means 140 and first switch means 630. The waveform of the voltage across primary winding 122 is shown in a graph 651. The opening and closing operations of primary switch means 140 is shown in graph 652 and the opening and closing operations of first switch means 630 is shown in graph 653. The high sections of graph 652 indicate the time durations when primary switch means 140 is closed and the low sections indicate the time durations when primary switch means 140 is open. The high sections of graph 653 indicate the time durations when first switch means 630 is closed and the low sections indicate the time durations when first switch means 630 is open.

As the magnitude of the voltage applied by each of switch means 140 and 630 is taken to be the same, e.g., $|V_0|$, switch means 140 and 630 are shown in timing diagram 650 as having substantially the same duty cycle. However this is not a necessary requirement, since the magnitude of the voltage applied by first switch means 630 could be different from that applied by switch means 140. This would require an adjustment of the duty cycle to ensure that the time-integrated volt-seconds applied to transformer 120 remains close to zero.

The operation and timing requirements for secondary switch means 150 is shown in graph 654 in FIG. 10. Shown in graph 654 are four timing windows 661–664 indicating the time in which switch control means 280 may change the state of secondary switch means 150 while ensuring zero-voltage switching on switch means 140 and 630. Each of timing windows 661–664 is illustrated using a series of parallel skew lines (/). Timing windows 662 and 664 indicate the time interval when secondary switch means 150 should be opened, and timing windows 661 and 663 indicate the time interval when secondary switch means 150 may be closed in order to prevent the diversion of magnetizing current to the secondary circuit, thereby ensuring zero voltage switching for switch means 140 and 630. The locations of windows 661–664 in relation to the switching of switch means 140 and 630, and in relation to the voltage $V_P$ across primary winding 124, are described below.

The switching cycle for primary switch means 140 and first switch means 630 is divided into six continuous, non-overlapping segments: segments A, B, C, D, E, and F. These segments are shown at 660 in FIG. 10. The boundary of each segment is defined by either a switching event in switch means 140, a switching event in switch means 630, or a zero-voltage crossing event in the primary winding voltage $V_P$ shown at graph 651. A negative-going zero-crossing in the primary voltage $V_P$ is shown at 658 and a positive-going zero-voltage crossing is shown at 659. Segment A begins with the closing of primary switch means 140 and ends with the opening of primary switch means 140. Segment B begins from the end of segment A and ends with negative-going zero-crossing 658 in voltage $V_P$. Segment C begins from the end of segment B and ends with the closing of first switch means 630. Segment D begins from the end of segment C and ends with the opening of first switch means 630. Segment E begins from the end of segment D and ends with positive-going zero-crossing 659. Segment F begins from the end of segment E and ends with the closing of primary switch means 140.

In segment A, primary switch means 140 has closed under a zero-voltage switching condition and power is being transferred to secondary winding 124 by way of primary winding 122. Previous to this, first switch means 630 was opened. Upon closing of switch means 140, secondary switch means 150 may be closed to enable power to be transferred to load 174 by way of secondary winding 124. Window 661 shows the time interval when secondary switch means 150 may be closed without interrupting zero-voltage switching. It begins with the start of segment A and ends at a point within segment A. Any delay in closing secondary switch means 150, as measured from the beginning of segment A, affects the amount of power transferred to the secondary circuit.

During Segment A, the magnetizing current $I_M$ in transformer 120 increases from a negative value at the beginning of segment A to a positive value at the end of segment A. In segments B and C, both switch means 140 and 630 are open and the magnetizing current completes its current path by way of both capacitors 132 and 632, charging capacitor 132 and discharging capacitor 632. Assuming secondary switch means 150 is open during this time and that capacitors 132 and 632 have substantially the same capacitance, half the magnetizing current $I_M$ flows into capacitor 132 and the other half flows into primary winding 122 in a direction opposite to the reference direction shown for $I_1$. This latter current is transformed over third winding 126, where it flows out of capacitor 632. The discharging of capacitor 632 creates a zero voltage switching condition on first switch means 630.

To ensure zero-voltage switching on first switch means 630, secondary switch means 150 is rendered in an open state during a time interval which precedes the closing of first switch means 630. The open-state time interval preferably includes segment C and may include the latter portion of segment B or all of segment B. At the beginning of segment C, the voltage across all of the transformer windings is zero volts and the voltage across rectifier 160 allows it to conduct current, which would clamp the voltage across all the transformer windings to zero if secondary switch means 150 is not opened to isolate the secondary circuit from transformer 120. This effect is the same as that described above for converter 100.

In the preceding segment B, secondary winding 124 is still applying a positive voltage across rectifier 160 and the clamping effect does not occur. Also because of the positive voltage, the magnetizing current continues to increase (although with a decreasing slope) and it is able to charge capacitor 132 and discharge capacitor 632. Additionally, any current conducted by secondary winding 124 is transformed to windings 122 and 126 to aid in charging capacitor 132 and discharging capacitor 632, respectively. As such, secondary switch means 150 may be kept in a closed state during segment B.

Thus, to ensure zero voltage switching on first switch means 630 under all loading conditions, secondary switch means 150 should be opened before the start of segment C. Timing window 662 shows the interval in which secondary switch means 150 may be opened. Window 662 begins at a point in segment A, after switch means 150 has closed, and ends with the beginning of segment C. Opening switch means 150 in the latter portion of segment A does not substantially affect the magnetizing current $I_M$ in transformer 120 but does affect the power delivered to the secondary circuit. It may be appreciated that the operation of secondary switch means 150 and primary switch means 140 in the above described way reduces the voltage across first switch means 630 and creates a zero-voltage switching condition on first switch means 630 when it is next caused to closed.

In segment D, first switch means 630 is closed under a zero-voltage switching condition and secondary switch means 150 may be closed to enable power to be transferred by way of fourth winding 128, as transformed from third winding 126. Window 663 shows the time interval when secondary switch means 150 may be closed without interrupting zero-voltage switching. It begins with the start of segment D and ends at a point within segment D. Any delay in closing secondary switch means 150, as measured from the beginning of segment D, does not affect the reversing of magnetizing current and flux but does affect the amount of power transferred to the secondary circuit.

During segment D, the magnetizing current $I_M$ in transformer 120 decreases from a positive value at the beginning of segment D to a negative value at the end of segment D. In segments E and F, both switch means 140 and 630 are again open and the magnetizing current completes its current path by way of both capacitors 132 and 632, this time discharging capacitor 132 and charging capacitor 632. Assuming secondary switch means 150 is open during this time and that capacitors 132 and 632 have substantially the same capacitance, half the magnetizing current $I_M$ flows out of capacitor 132 and the other half flows through primary winding 122 in the reference direction shown for $I_1$. This latter current is transformed over to third winding 126, where it flows into capacitor 632. The discharging of capacitor 132 reduces the voltage across primary switch means 140 and creates a zero voltage switching condition on primary switch means 140.

To ensure zero-voltage switching on primary switch means 140, secondary switch means 150 is rendered in an open state during a time interval which precedes the closing of primary switch means 140. The open-state time interval preferably includes segment F and may include the latter portion of segment E or all of segment E. At the beginning of segment F, the voltage across all of the transformer windings is again zero volts and the voltage across rectifier 160 allows it to conduct current, which would clamp the voltage across all the transformer windings to zero if secondary switch means 150 is not opened to isolate the secondary circuit from transformer 120. In segment E, fourth winding 128 is still applying a positive voltage across rectifier 160 and the clamping effect does not occur. Because of the negative voltage applied by third winding 126, the magnetizing current $I_M$ continues to become more negative (although its slope is changing towards a positive value) and it is able to discharge capacitor 132 and charge capacitor 632. Additionally, the current conducted by fourth winding 128 is transformed to windings 122 and 126 to aid in this process. As such, secondary switch means 150 may be kept in a closed state during segment E.

Thus, to ensure zero voltage switching on primary switch means 140 under all loading conditions, secondary switch means 150 should be opened before the start of segment F. Timing window 664 shows the interval in which secondary switch means 150 may be opened. Window 664 begins at a point in segment D, after switch means 150 has closed, and ends with the beginning of segment F. Opening switch means 150 in the latter portion of segment D does not substantially affect the magnetizing current $I_M$ in transformer 120 but does affect the power delivered to the secondary circuit.

Thus, to ensure zero-voltage switching conditions for switch means 140 and 630 under all load conditions, secondary switch means 150 should be opened during segments C and F. If switch means 150 is still closed at the beginning of either segments C or F, the primary voltage will be clamp to zero, assuming that the secondary-side load current, as transformed over to the primary circuit, is greater than the magnetizing current $I_M$. This clamping halts the process of transferring power to the secondary circuit and dissipates the magnetizing current $I_M$ since a negative voltage on the order of $-0.5$ V to $-1$ V is applied to inductor 123 and the transformer windings. If secondary-side switch means 150 is opened before all the magnetizing current is dissipated, the creation of a zero voltage switching condition may still occur.

Exemplary qualitative steady-state waveforms for the key voltages and currents for converter 600, as configured in a push-pull topology and as operated in accordance with timing diagram 650, are shown in a timing diagram 680 in FIG. 11. For these waveforms, secondary switch means 150 is rendered open (non-conductive) during the beginning of segment B, throughout the entirety of segment C, and during the initial portion of segment D for zero voltage switching on first switch means 630. Additionally, secondary switch means 150 is rendered open (non-conductive) during the beginning of segment E, throughout the entirety of segment F, and during the initial portion of segment D for zero voltage switching on primary switch means 140. Also, for the purposes of discussion and without loss of generality, it is assumed that each winding of transformer 120 has the same number of turns and has no parasitic resistance and transformer 120 is operated in the linear regime of its B-H characteristic. Additionally, each of rectifiers 160-162 has a nominal voltage drop for forward conducting current, a, near zero current conduction for reverse applied voltage and a nominal amount of reverse-recovery current. Also, without loss of generality, load 174 is taken to be resistive in nature.

In FIG. 11, the operation of primary switch means 140 is shown in a graph 681, the operation of first switch means 630 is shown in a graph 682, and the operation of secondary switch means 150 is shown in a graph 683. Graphs 681-683 are each in the form of a time line waveform which indicates that its corresponding switch means is closed when the waveform is high and that its corresponding switch means is open when the waveform is low. The voltage $V_p$ across primary winding 122 and the voltage across third winding 126, which is designated as $V_3$ in FIGS. 9 and 11, are shown at a graph 684. Segments A-F are shown at 690. The voltage across primary switch means 140 is designated as $V_{SW1}$ in FIGS. 9 and 11 and is shown at a graph 685. Likewise, the voltage across first switch means 630 is designated as $V_{SW2}$ and is also shown in graph 685.

The magnetizing current $I_M$ is shown at a graph 686, along with the currents into each of capacitors 132 and 632, which are designated at $I_{CS1}$ and $I_{CS2}$, respectively in FIGS. 9 and 11. As can be seen in graph 686, each of currents $I_{CS1}$ and $I_{CS2}$ comprises a sequence of current pulses occurring during segments B and C and segments E and F when the transitions in the transformer winding voltage occurs. During segments B and C, current $I_{CS1}$ is positive and current $I_{CS2}$ is negative. During segments E and F, current $I_{CS1}$ is negative and current $I_{CS2}$ is positive. With the assumption of equal capacitances for capacitor 132 and 632, the magnitude of the pulses is approximately equal to one-half the magnetizing current $I_M$ during these segments. The current through secondary winding 124 is designated as $I_{S1}$ in FIGS. 9 and 11 and is shown in a graph 687. The current through fourth winding 128 is designated as $I_{S2}$ and is also shown in graph 687, along with the current $I_{LOUT}$ through inductor 170. Current $I_{S1}$ comprises trapezoidal pulses, each occurring during a respective segment A, and current $I_{S2}$ comprises trapezoidal pulses, each occurring during a respective segment D. Current $I_{LOUT}$ follows these trapezoidal pulses and includes "ripple-down" portions during segments B-C and E-F. The ripple down current is supported by rectifier 160.

The current $I_1$ through primary winding 122 is shown at a graph 688 in FIG. 11. The current through third winding 126 is designated as $I_2$ in FIGS. 9 and 11, and is also shown in graph 688. The reference direction for current $I_2$ is directed into the negative terminal of winding 126. Currents $I_1$ and $I_2$ also comprise trapezoidal pulses during segments A and D, respectively, following the reflected current pulses of $I_{S1}$ and $I_{S2}$, respectively. During segment D, current $I_1$ follows the negative of the magnetizing current $I_M$ through inductor 123 since the magnetizing current is being transformed over to third winding 126. Current $I_2$ shows the reflected magnetizing current in its slope during segment D, which is steeper than the slope of current $I_1$ during segment A. Current $I_2$ is substantially zero during segment A since first switch means 630 is open. The asymmetry between the currents $I_1$ and $I_2$ is due to the magnetizing inductor 123 being coupled in parallel with primary winding 122 rather than with third winding 126. The total current drawn by converter 600 from supply 110 is designated as $I_P$ in FIGS. 9 and 11, and is shown in a graph 689. Current $I_P$ is equal to the sum of $I_1$, $I_2$, and $I_M$. The slopes of the trapezoidal pulses in $I_P$ during segments A and D are substantially identical, as would be required by a symmetric circuit. This is because the magnetizing current $I_M$ adds with $I_1$ during segment A, to provide a combined slope for $I_1$ equal to that for current $I_2$ during segment D, and cancels with $I_1$ during segment D.

As indicated above, the charging and discharging of capacitor 632 by the magnetizing current $I_M$ is accomplished, with this model of transformer 120, by transforming half the magnetizing current to third winding 126 by way of primary winding 122 during segments B-C and E-F. This may be seen in currents $I_1$ and $I_2$ during these segments.

A third embodiment of the zero-voltage-switching converter according to the present invention is shown at 700 in FIG. 12. With the exception of flux reversal means 610, first switch means 630, third winding 126, and stray capacitor 632, converter 700 comprises the same elements as converter 600. Additionally, in the embodiment shown in FIG. 12, these elements are coupled to one another in the above-described manner with the exception that the series combination of primary winding 122 and primary switch means 140 is not directly coupled to voltage source 110 but, as explained below, is indirectly coupled thereto by way of a flux reversal means coupled between voltage source 110 and primary winding 122. As with converters 100 and 600, inductor 123 is used to model the effects of the magnetizing energy of transformer 120 and is indicated in phantom in FIG. 12. Inductor 123 is coupled in parallel with primary winding 122. Converter 700 may be configured as a single-ended forward converter, such as converter 100, or may be configured as a half-bridge converter, the latter of which is shown in FIG. 12. The latter configuration is preferred as power is transferred to load 174 in a balanced, continuous manner. When configured in a half-bridge topology, converter 700 further includes fourth winding 128 of transformer 120 coupled in parallel with secondary winding 124 and rectifiers 161 and 162, as discussed above for converter 600. When configured as a single-ended forward converter, fourth winding 128 and rectifier 162 are not needed and may be removed. Rectifier 161 may be replaced by a conductive wire coupling secondary winding 124 directly to secondary switch means 150.

In converter 700, the flux in transformer 120 is reversed by applying a reversing voltage to primary winding 122 rather than to an auxiliary winding, such as third winding 126 of converter 600. For this purpose, converter 700 comprises a flux reversal means 710 coupled between voltage source 110 and the series circuit of primary winding 122 and primary switch means 140. Flux reversal means 710 includes a first switch means 730 and a second voltage source 720 (i.e., power source) having a voltage magnitude $V_{S2}$ which is less than the magnitude of $V_0$. First switch means 730 is coupled between voltage source 110 and node $V_1$, which couples primary switch means 140 to primary winding 122 at the negative terminal of winding 122. First switch means 730 is operated in a similar manner to the operation of first switch means 630 above, closing substantially when primary switch means 140 opens and opening substantially when primary switch means 140 closes.

Second voltage source 720 comprises a supply terminal 725 coupled to the positive terminal of primary winding 122.

When primary switch means 140 is closed (ON-period), second voltage source 720 and switch means 140 apply a positive voltage to primary winding 122. Power is transferred to load 174 by way of secondary winding 124. When first switch means 730 is closed (during the OFF-period), voltage source 110 and first switch means 730 apply a negative voltage to primary winding 122. Power may be transferred to load 174 by way of fourth winding 128. In the latter case, the current through voltage source 110, first switch means 730, and primary winding 122 completes its path through second voltage source 720. The voltage of source 720 is preferably related to the nominal duty cycle of primary switch means 140 such that the total integrated volt-seconds applied to primary winding 122 in each switching cycle during steady-state operation is substantially zero. In other words, under steady-state operations with input and output voltages at their respective nominal values, the product of voltage $V_{S2}$ and the time duration that primary switch means 140 is closed is substantially equal to the product of voltage difference $(V_0-V_{S2})$ and the time duration that first switch means 730 is closed. In a preferred half-bridge embodiment of converter 700, the nominal duty cycle is set to near 50%, with the voltage $V_{S2}$ of second voltage source 720 being set to substantially $V_0/2$. In this embodiment, both switch means 140 and 730 are closed for equal time durations during each switching cycle under steady state conditions.

In a preferred embodiment of converter 700, second voltage source 720 comprises a first capacitor 721 coupled between terminal 725 and ground, and a second capacitor 722 coupled between terminal 725 and voltage source 110 ($V_0$). Capacitors 721 and 722 collectively comprise a capacitive voltage divider which provides a voltage at terminal 725 which is less than the voltage $V_0$ of source 110 and related to the nominal duty cycle, as indicated above. Additionally, particularly for 50% duty-cycle operation, capacitors 721 and 722 preferably have substantially the same capacitance value. Upon initial power-up of converter 700, capacitors 721 and 722 are charged to produce the desired value of voltage $V_{S2}$ at terminal 725. In operation, current is discharged from capacitors 721 and 722 when primary switch means 140 is closed and current is provided to capacitors 721 and 722 from voltage source 110 when first switch means 730 is closed. In the above preferred half-bridge embodiment of converter 700 where the nominal duty cycle is near 50% and voltage $V_{S2}$ is substantially $V_0/2$, the amount of charge discharged from the capacitors is substantially equal to the amount provided to the capacitors by source 110. This maintains the voltage at $V_{S2}$. In the case where these amounts are not equal, as for example when switch means 140 and 730 are not closed for equal durations or when the secondary currents in windings 124 and 124 are not balanced, a voltage regulation means may be added to voltage $V_{S2}$.

It may be appreciated by those having skill in the power conversion art that two capacitors are not required in order to provide a voltage source of $V_{S2}$ at terminal 725. Instead, a single capacitor having one terminal coupled to terminal 725 and the other terminal coupled to a voltage reference, such as ground or voltage source 110, may be used. In this case, a separate charging or discharging means, or transient charging of the single capacitor under non-steady state conditions, may be used to set the voltage at terminal 725 to the value $V_{S2}$.

As with converters 100 and 600, zero-voltage switching on primary switch means 140 is achieved by using the magnetizing current $I_M$ of transformer 120 to discharge capacitor 132 before primary switch means 140 closes and by isolating the secondary circuit with secondary switch means 150. Additionally, zero-voltage switching on first switch means 730 may be achieved as well by charging capacitor 132 with the magnetizing current $I_M$ and by isolating the secondary circuit. As before, capacitor 132 ($C_S$) is coupled between the switched terminal of primary winding 122 and ground for representing combined stray (parasitic) capacitances of primary switch means 140 and primary winding 122. For converter 700, it also represents the stray capacitance of first switch means 730. Primary switch means 140 and second voltage source $V_{S2}$ are arranged to build up flux in one direction (e.g., positive flux) in transformer 120, and first switch means and voltage source 110 are coupled to voltage source 110 such that a flux in the opposite direction (e.g., negative flux) may be built up in transformer 120 when switch means 730 is closed.

As with converter 600, converter 700 comprises switch control means 280 for generating signals to control the operation of primary switch means 140, first switch means 730, and secondary switch means 150. Switch control means 280 includes a port 281 coupled to primary switch means 140 for providing a control signal thereto, a port 282 coupled to first switch means 730 for providing a control signal thereto, and a port 283 coupled to secondary switch means 150 for providing a control signal thereto.

When converter 700 is configured as single-ended converter, switch means 140, 630, and 150 may be operated according to the timing diagram 200 shown in FIG. 5, where first switch means 730 is operated in the manner that first switch means 130 is operated. Zero-voltage switching occurs on primary switch means 140 and, optionally, first switch means 730, as described above with reference to FIGS. 5-7. As such, control means 280 may function in the same manner as control means 180 and control means 180 may be used in its place. The duty cycle of converter 600 should be set to a value which causes equal amounts of negative and positive volt-seconds to be applied to the windings of transformer 120 under steady-state conditions. Additionally, when capacitors 721 and 722 are used to provide second voltage $V_{S2}$ at terminal 725, unbalanced charging of the capacitors may occur due to the single-ended operation. For example, in the case where fourth winding 128 is not used, the current conducted by secondary winding 124 is reflected to primary winding 122, thereby draining charge from capacitors 721 and 722. This current is not replaced when first switch means 730 is closed. Thus, an additional charging and regulation means known in the art would be needed.

When converter 700 is configured in a half-bridge topology, switch means 140, 730, and 150 may be operated according to timing diagram 680 shown in FIG. 10, where first switch means 730 is operated in the manner that first switch means 630 is operated. As with converters 100 and 600, the secondary circuit may divert the magnetizing current away from charging and discharging capacitor 132 unless secondary switch means 150 is operated to isolate the secondary circuit at the appropriate times. The switching cycle for converter 700 in the half-bridge topology may also be divided in segments A-F as is done for converter 600 in the push-pull topology. Additionally, to ensure zero-voltage switching conditions for switch means 140 and 730 under all load conditions, secondary switch means 150 should be opened during segments C and F, as discussed above.

For completeness, an exemplary operation of converter 700 in relation to segments A-F is described. In segment A, primary switch means 140 has closed under a zero-voltage switching condition and power is being transferred to secondary winding 124 by way of primary winding 122. Previous to this, first switch means 730 was opened. Upon closing of switch means 140, secondary switch means 150 may be closed to enable power to be transferred by way of secondary winding 124, as indicated by window 661 in FIG. 10. Any delay in closing secondary switch means 150, as measured from the beginning of segment A, does not substantially affect the magnetizing current $I_M$ but does affect the amount of power transferred to the secondary circuit.

During segment A, the magnetizing current $I_M$ in transformer 120 increases from a negative value at the beginning of segment A to a positive value at the end of segment A. In segments B and C, both switch means 140 and 730 are open and the magnetizing current $I_M$ completes its current path by way of charging capacitor 132. The charging of capacitor 132 raises the voltage at node $V_1$ and creates a zero voltage switching condition on first switch means 730.

To ensure zero-voltage switching on first switch means 730 by the end of segment C, secondary switch means 150 is rendered in an open state during a time interval which precedes the closing of first switch means 730. The open-state time interval preferably includes segment C and may include the latter portion or all of segment B. At the beginning of segment C, the voltage across all of the transformer windings is zero volts and the voltage across rectifier 160 allows rectifier 160 to conduct current, which would clamp the voltage across all the transformer windings to zero if secondary switch means 150 is not opened to isolate the secondary circuit from transformer 120. This potential problem is the same as that described above in converters 100 and 600. In the preceding segment B, secondary winding 124 is still applying a positive voltage across rectifier 160 and the clamping effect does not occur. Also because of the positive voltage, the magnetizing current continues to increase (although with a decreasing slope) and it is able to charge capacitor 132. Additionally, any current conducted by secondary winding 124 is transformed to winding 122 to aid in charging capacitor 132. As such, secondary switch means 150 may be kept in a closed state during segment B.

Thus, to ensure zero voltage switching on first switch means 730 under all loading conditions, secondary switch means 150 should be opened before the start of segment C. Timing window 662 in FIG. 10 shows the interval in which secondary switch means 150 may be opened. Opening switch means 150 in the latter portion of segment A does not substantially affect the magnetizing current $I_M$ in transformer 120 but does affect the power delivered to the secondary circuit. It may be appreciated that the operation of secondary switch means 150 and primary switch means 140 in the above described way creates a zero-voltage switching condition on first switch means 730 when it is next caused to closed.

In segment D, first switch means 730 is closed under a zero-voltage switching condition and secondary switch means 150 may be closed as indicated by window 663 to enable power to be transferred by way of fourth winding 128, as transformed from primary winding 122. Any delay in closing secondary switch means 150, as measured from the beginning of segment D, affects the amount of power transferred to the secondary circuit. During segment D, the magnetizing current $I_M$ in transformer 120 decreases from a positive value at the beginning of segment D to a negative value at the end of segment D. In segments E and F, both switch means 140 and 730 are again open and the magnetizing current completes its current path by way of discharging capacitor 132. The discharging of capacitor 132 creates a zero voltage switching condition on primary switch means 140.

To ensure zero-voltage switching on primary switch means 140 by the end of segment F, secondary switch means 150 is rendered in an open state during a time interval which precedes the closing of primary switch means 140. The open-state time interval preferably includes segment F and may include the latter portion or all of segment E. At the beginning of segment F, the voltage across all of the transformer windings is again zero volts and the voltage across rectifier 160 allows rectifier 160 to conduct current, which would clamp the voltage across all the transformer windings to zero if secondary switch means 150 is not opened to isolate the secondary circuit from transformer 120. In segment E, fourth winding 128 is still applying a positive voltage across rectifier 160 and the clamping effect does not occur. Because of the negative voltage applied to winding 122 and inductor 123, the magnetizing current $I_M$ continues to become more negative (although its slope is changing towards a positive value) and it is able to discharge capacitor 132. Additionally, any current conducted by fourth winding 128 is transformed to winding 122 to aid in this process. As such, secondary switch means 150 may be kept in a closed state during segment E.

Thus, to ensure zero voltage switching on primary switch means 140 under all loading conditions, secondary switch means 150 should be opened before the start of segment F, as indicated by timing window 664 in FIG. 10. Window 664 begins at a point in segment D, after switch means 150 has closed, and ends with the beginning of segment F. Opening switch means 150 in the latter portion of segment D does not substantially affect the magnetizing current $I_M$ in transformer 120 but does affect the power delivered to the secondary circuit.

Thus, to ensure zero-voltage switching conditions for switch means 140 and 730 under all load conditions, secondary switch means 150 should be opened during segments C and F. As with converter 600, if switch means 150 is still closed at the beginning of either segments C or F, the primary voltage will be clamped to zero, assuming that the secondary-side load current, as transformed over to the primary circuit, is greater than the magnetizing current $I_M$. This clamping halts the process of transferring power to the secondary circuit and dissipates the magnetizing current $I_M$ since a negative voltage on the order of $-0.5$ V to $-1$ V is applied to inductor 123 and the transformer windings. If the secondary-side switch means is opened before all the magnetizing current is dissipated, the creation of a zero voltage switching condition may still occur.

Exemplary qualitative steady-state waveforms for the key voltages and currents for converter 700, as configured in a half-bridge topology and as operated in accordance with timing diagram 650, are shown in a timing diagram 780 in FIG. 13. For these waveforms, secondary switch means 150 is rendered open (non-conductive) during the beginning of segment B, throughout the entirety of segment C, and during the initial portion of segment D for zero voltage switching on first switch means 730. Additionally, secondary switch means 150 is rendered open (non-conductive) during the beginning of segment E, throughout the entirety of segment F, and during the initial portion of segment D for zero voltage switching on primary switch means 140. Also, for the purposes of discussion and without loss of generality, it is assumed that each winding of transformer 120 has the same number of turns and has no parasitic resistance and transformer 120 is operated in the linear regime of its B-H characteristic. Additionally, each of rectifiers 160-162 has a nominal voltage drop for forward conducting current, a near zero current conduction for reverse applied voltage and a nominal amount of reverse-recovery current. Also, without loss of generality, load 174 is taken to be resistive in nature.

In FIG. 13, the operation of primary switch means 140 is shown in a graph 781, the operation of first switch means 730 is shown in a graph 782, and the operation of secondary switch means 150 is shown in a graph 783. Graphs 781-783 are each in the form of a time line waveform which indicates that its corresponding switch means is closed when the waveform is high and that its corresponding switch means is open when the waveform is low. The voltage across primary winding 122, $V_P$ is shown at a graph 784. Segments A-F are shown at 790. The voltage across primary switch means 140 is designated as $V_{SW_1}$ in FIGS. 12 and is shown at a graph 785 in FIG. 13. Likewise, the voltage across first switch means 730 is designated as $V_{SW_2}$ and is also shown in graph 785.

The magnetizing current $I_M$ is shown at a graph 786, along with the current into capacitor 132, which are designated at $I_{CS1}$ FIGS. 12 and 13. Current $I_{CS1}$ comprises a sequence of current pulses occurring during segments B and C and segments E and F when the transitions in the transformer winding voltage occur. The current through secondary winding 124 is designated as $I_{S1}$ in FIG. 12 and is shown in a graph 787 in FIG. 11. The current through fourth winding 128 is designated as $I_{S2}$ and is also shown in graph 787, along with the current $I_{LOUT}$ through inductor 170. As with converter 600, current $I_{S1}$ comprises trapezoidal pulses, each occurring during a respective segment A, and current $I_{S2}$ comprises trapezoidal pulses, each occurring during a respective segment D. Current $I_{LOUT}$ follows these trapezoidal pulses and includes "ripple-down" portions during segments B-C and E-F. The ripple-down current is supported by rectifier 160.

The current $I_1$ through primary winding 122 is shown at a graph 788 in FIG. 13. Current $I_1$ also comprises trapezoidal pulses during segments A and D, respectively, following the reflected current pulses of $I_{S1}$ and $I_{S2}$, respectively. $I_1$ is positive during segment A and is negative during segment D. The current drawn by converter 700 from second voltage source 720 is designated as $I_P$ in FIG. 12 and is shown in a graph 789 in FIG. 13. Current $I_P$ is substantially equal to the sum of $I_1$ and $I_M$. The current drawn from first voltage source 110 is designated at $I_{IN}$ in FIG. 12 and is shown in a graph 789 in FIG. 13. Current $I_{IN}$ is substantially zero during segments A-C and E-F, when first switch means 730 is open. During segment D, $I_{IN}$ is equal to the negative sum of the $I_1$ and $I_M$.

It may be appreciated that the coupling of flux reversal means 710 and primary switch means 140 to primary winding 122 comprises the primary-side topology of the well known half-bridge converter. It may be further appreciated that the primary-side topology of the well known full-bridge topology may also be used to provide similar results in the present invention. Accordingly, a fourth embodiment of the zero-voltage-switching converter according to the present invention is shown at 800 in FIG. 14. In place of primary switch means 140, converter 800 comprises a primary switch means 140' which includes a first primary switch 840 and a second primary switch 841, each of which are coupled in series with primary winding 122 at opposite terminals thereof. In the embodiment of converter 800 shown in FIG. 14, first primary switch 840 is coupled between the negative terminal of winding 122 (at node $V_1$) and one terminal of source 110 and second primary switch 841 is coupled between the positive terminal of winding 122 and the other terminal of source 110. Primary switches 840 and 841 close substantially at the same time and open substantially at the same time to couple power and energy to primary winding 122 from source 110.

Converter 800 comprises a flux reversal means 810 which, when coupled to primary winding 122 and primary switches 840 and 841, comprises the primary-side topology of a full-bridge converter. With the exception of primary switch 840, primary switch 841, and flux reversal means 710 and its components, converter 800 comprises the same elements as converter 700. Additionally, in the embodiment shown in FIG. 14, these elements are coupled to one another in the above-described manner. As with converters 100, 600, and 700, inductor 123 is used to model the effects of the magnetizing energy of transformer 120 and is indicated in phantom in FIG. 14. Inductor 123 is coupled in parallel with primary winding 122.

Converter 800 may be configured as a single-ended forward converter, such as converter 100, or may be configured as a full-bridge converter, the latter of which is shown in FIG. 14. The latter configuration is preferred as power is transferred to load 174 in a balanced, continuous manner. When configured in a full-bridge topology, converter 800 further includes fourth winding 128 of transformer 120 coupled in parallel with secondary winding 124 and rectifiers 161 and 162, as discussed above for converters 600 and 700. When configured at a single-ended forward converter, fourth winding 128 and rectifier 162 are not needed and may be removed. Rectifier 161 may also be replaced by a conductive wire coupling secondary winding 124 directly to secondary switch means 150.

Flux reversal means 810 includes a first switch means 830 ($S_1$), a second switch means 835 ($S_1'$), and a capacitor 832. First switch means 830 is coupled between the positive terminal of voltage source 110 and node $V_1$ at the negative terminal of primary winding 122, and is operated substantially the same as first switch means 730 of converter 700. Second switch means 835 is coupled between the negative terminal of voltage source 110 and the positive terminal of primary winding 122, and is operated substantially the same as first switch means 830. In one embodiment of converter 800, the control terminals of each of switch means 830 and 835 are coupled to control port 282 of control means 280. Switch means 830 and 835 open substantially at the same time and close substantially at the same time to apply a negative voltage of $-V_0$ to primary winding 122. This is the flux reversing voltage which reverses the direction of flux built up in transformer 120 during the previous closed time of primary switch means 140. Capacitor 832 is coupled between the positive terminal of primary winding 122 and ground, and represents the combined stray (parasitic) capacitances of switch means 835, primary switch 841, and primary winding 122. Likewise, capacitor 132 ($C_S$) is coupled between the negative terminal of primary winding 122 and ground and is for representing the combined stray (parasitic) capacitances of first primary switch 840, second primary switch 841, and primary winding 122.

In one embodiment of converter 800, as shown in FIG. 14, the control terminals of each of primary switches 840 and 841 are coupled to control port 281 of control means 280. As such, primary switches 840 and 841 open substantially at the same time and close substantially at the same time to apply a positive voltage of $V_0$ to primary winding 122.

Converters 700 and 800 operate the same in that an alternating voltage is applied to primary winding 122. In the case of converter 800, the magnitude of this voltage is greater than that in converter 700 since the second voltage $V_{S2}$ is not used in converter 800. As an additional difference, the primary switches 840 and 841 and switch means 830 and 835 are preferably operated with substantially equal duty cycles (near 50%) since the magnitude of the reversing voltage is substantially the same as the forward voltage ($V_0$) and since the integrated volt-seconds on transformer 120 should be zero over time.

It may be appreciated that primary switch 840 is coupled to primary winding 122 and source 110 in the same manner as primary switch means 140 of converters 100, 600, and 700. Accordingly, zero-voltage switching on primary switch 840 is achieved by using the magnetizing current $I_M$ of transformer 120 to discharge capacitor 132 before primary switch 840 closes and by isolating the secondary circuit with secondary switch means 150, as was described above for primary switch means 140 in converters 100, 600, and 700. Also, zero-voltage switching on first switch means 830 may be achieved as well by charging capacitor 132 with the magnetizing current $I_M$ and by isolating the secondary circuit with secondary switch means 150. Additionally, zero voltage switching on switch means 835 and primary switch 841 may be achieved by using the magnetizing current $I_M$ to charge and discharge capacitor 832 before switching and by isolating the secondary circuit. This may be accomplished by operating the switch means of converter 800 according to timing diagram 650 shown in FIG. 10 and discussed above. Primary switches 840 and 841 are operated according to graph 652 (cf. FIG. 10) and in a manner similar to primary switch means 140, switch means 830 and 835 are operated according to graph 653, and second switch means 150 is operated according to graph 654 and timing windows 661–664.

For completeness, the following exemplary operation of converter 800 is described. During segments B and C, each of primary switches 840 and 841, and switch means 830 and 835 are substantially open. The magnetizing current $I_M$ completes its path through capacitors 132 and 832, charging 132 to raise its voltage and discharging 832 to lower its voltage. With proper isolation of the secondary circuit by secondary switch means 150, zero-voltage switching may then occur on first switch means 830 and second switch means 835. During segments E and F, neither of primary switches 840 and 841, and switch means 830 and 835 are closed. The magnetizing current $I_M$ completes its path through capacitors 132 and 832, this time discharging capacitor 132 to lower its voltage and charging capacitor 832 to raise its voltage. With proper isolation of the secondary circuit by secondary switch means 150, zero-voltage switching may then occur on primary switches 840 and 841.

When converter 800 is configured as a single-ended converter, switch means 140' (i.e., switches 840 and 841), 830, 835, and 150 may be operated according to the timing diagram 200 shown in FIG. 5, where first switch means 830 and second switch means 835 are each operated in the manner that first switch means 130 is operated. As such, control means 280 may function in the same manner as control means 180 and control means 180 may be used in its place.

The currents and voltages in converter 800 are substantially similar to the corresponding currents and voltages shown in FIG. 13 for the half-bridge embodiment of converter 700. Therefore, a further detailed discussion of the voltages and currents of converter 800 is not needed to understand the converter 800 and enable one of ordinary skill in the art to make and use the same.

An exemplary embodiment for secondary switch means 150 is shown at 850 in FIG. 15A. Second switch means 850 is shown in the context of the secondary-side circuit shown for converters 600, 700, and 800 in FIGS. 9, 12, and 14, respectively. Secondary switch means 850 comprises a transistor 852, which comprises an n-channel enhancement-type MOS field-effect transistor device in one embodiment of means 850. Transistor 852 includes a control terminal 853, e.g., gate, and two conduction terminals 854 and 855, e.g., source and drain, respectively. Drain terminal 855 is coupled to windings 124 and 128 by rectifiers 161 and 162, respectively. Source terminal 854 is coupled to rectifier 160 and to inductor 170 and node $V_2$. Gate control terminal 853 and source conduction terminal 854 are provided to a port 858, where a control signal from control means 280 is provided for controlling transistor 852. It may be appreciated that transistor 862 may alternatively comprise other transistor devices, such as bipolar-junction transistors (BJTs).

Transistor 852 may further include a parasitic substrate diode 851. The inclusion of parasitic substrate diode 851 depends upon the particular transistor component used for transistor 852. If parasitic substrate diode 851 exists as part of field effect transistor 852, an undesired current could be conducted from source terminal 854 to drain terminal 855, and into the secondary winding 124 and fourth winding 128, when a negative drain-to-source voltage is applied across transistor 852. However, as seen in FIG. 15A rectifiers 161 and 162 block this undesired current.

As indicated above for switch means 150, fourth winding 128 and rectifiers 161 and 162 may be removed when the converter according to the present invention is configured in a single-ended topology. With switch means 850, however, rectifier 161 should be maintained if transistor 852 includes parasitic diode 851 for the reason indicated above. In the case where diode 851 is not included and fourth winding 128 and rectifier 162 are not used, rectifier 161 may be removed provided that sufficient OFF voltage (e.g., negative voltage for an NMOS device) is applied between the gate and source terminals of transistor 852 during the non-conducting periods of second switch means 850. Such voltage is needed in order to maintain transistor 852 in a non-conducting state. This is because, during the non-conducting state (e.g., the converter's OFF-period), a negative voltage appears at the drain terminal of transistor 852 when rectifier 161 is not present, which could cause transistor 852 to inadvertently conduct if the gate voltage is not sufficiently negative with respect to the negative voltage at the drain. Such a control signal may be generated to provide such a negative voltage by circuits well known in the transistor drive art and a detailed explanation thereof is not needed for one of ordinary skill in the art to understand this aspect of the present invention and to make and use the same.

An exemplary embodiment for each of switch means 140, 630, 730, 830, 835, and 840 and for each of primary switches 840 and 841 is shown at 860 in FIG. 15B. Switch means 860 comprises a transistor 862, which comprises an n-channel enhancement-type MOS field-effect transistor device in one embodiment of means 860. Transistor 862 includes a control terminal 863, e.g., gate, and two conduction terminals 864 and 865, e.g., source and drain, respectively. When used for primary switch means 140 (cf. FIGS. 4, 9, and 12), for primary switch 840 (cf. FIG. 14), for first switch means 630 (cf. FIG. 9), or second switch means 835 (cf. FIG. 14), source terminal 864 is coupled to ground and drain terminal 865 is coupled to the corresponding primary-side winding. When used for first switch means 730 (cf. FIG. 12) and 830 (cf. FIG. 14), source terminal 864 is coupled to node V₁ and drain terminal 865 is coupled to the positive terminal of source 110. Finally, when used for primary switch 841 (cf. FIG. 14), source terminal 864 is coupled to the positive terminal of primary winding 122 and drain terminal 865 is coupled to the positive terminal of source 110. Control terminal 863 and source conduction terminal 864 are provided to a port 868, where a control signal from control means 280 is provided for controlling transistor 862. It may be appreciated that transistor 862 may alternatively comprise other transistor devices, such as bipolar-junction transistors (BJTs).

Transistor 862 may further include a parasitic substrate diode 861 having an anode terminal coupled to source terminal 864 and a cathode terminal coupled to drain terminal 865. The inclusion of parasitic substrate diode 861 depends upon the particular transistor component used for transistor 862. Rectifier 861 is similar to rectifiers 531 and 541 described above with reference to FIG. 8 in that it comprises means for detecting a zero-voltage-switching condition across switch means 860 and means for initially conducting current through switch means 860 upon the occurrence of a zero-voltage-switching condition across switch means 860. As such, the timing of the control signals for the closing of switch means 860, as used by switch means 140, 630, 730, 830, 835, and 840, and by primary switches 840 and 841, is not as critical. In particular, the control signals to the transistor (862) of primary switch means 140 and to the transistor (862) of first switch means 630 in converter 600 may be generated with fixed delays between their closed states. Likewise, similar fixed delays may be used for converters 700 and 800 using switch means 860 for the primary-side switches. An embodiment of control means 280 where the control signals to the primary switches are generated with fixed delay between closed states is given below.

An exemplary control means 280 for use by converters 600 and 700 is shown at 900 in FIG. 16. With certain modifications explained below, control means 900 may also be used by converter 800. Control means 900 comprises a clock generator 910 for generating a clocking signal having a substantially 50% duty cycle and a switch controller 930. Clock generator 910 comprises a conventional crystal oscillator for generating a base clock signal, and two D-type flip-flops 920 and 924, each configured as a toggle flip-flop. The crystal oscillator includes a crystal 916, a first inverter 914, and a second inverter 919. Crystal 916 is preferably a 1.0 MHz crystal and is coupled between the input and output of first inverter 914, which is preferably a Schmitt-trigger CMOS inverter. A 1 M-ohm resistor 915 is also coupled between the input and output of inverter 914 and is for biasing inverter 914 near the middle of its gain curve characteristic. Additionally, a capacitor 917 of approximately 33 pF is coupled to the input of inverter 914 and a second capacitor 918 of approximately 33 pF is coupled to the output of oscillator 914. With this configuration, a substantially square wave is produced at the output of inverter 914. Second inverter 919 serves to isolate the crystal oscillator from the remaining circuitry of clock generator 910. The input of second inverter 919 is coupled to the output of first inverter 914.

Each of flip-flop 920 and 924 includes a clock port "CK", a data input port "D", an output "Q", and a complementary output "Qc" coupled back to the D input. The clock port of flip-flop 920 is coupled to the output of second inverter 919, and the clock port of flip-flop 924 is coupled to the "Q" output of flip-flop 920. The "Q" output of flip-flop 924 is coupled to an output port 911 of clock generator 910. Due to the toggle operation of flip-flop 920, the signal at the "Q" output of flip-flop 920 has a frequency half that of the signal provided to its clock port and has a duty-cycle of substantially 50%. The same may be said of the "Q" output of flip-flop 924. Thus, the signal at port 911 has a frequency of 250 kHz and a duty-cycle of 50%. Additionally, the signal has a pulsed state of 5 V to 10 V and a resting state of around zero volts.

From the signal at port 911, switch controller 930 generates the control signals for the switch means of either converter 600 or converter 700. Switch controller 930 comprises an input port 935 for receiving the 50% duty-cycle signal, an output port 931 corresponding to output port 281 of control means 280, an output port 932 corresponding to output port 282, and an output port 933 corresponding to output port 283. Switch controller 930 comprises a first transistor drive circuit 940 for driving primary switch means 140, a second transistor drive circuit 950 for driving either of first switch means 630 or 730, and a third transistor drive circuit 960 for driving second switch means 150.

First drive circuit 940 comprises a buffer amplifier 942 having an input and an output, an isolation transformer 944 having a primary winding coupled to the output of amplifier 942 and a secondary winding coupled to port 931, a first coupling capacitor 943 coupled between the output of amplifier 972 and the primary winding of transformer 944, and a second coupling capacitor 945 coupled between the secondary winding of transformer 944 and port 931. Buffer amplifier 942 is responsive to the signal at port 911 and provides the necessary power for driving primary switch means 140, transformer 944 provides isolation between the different ground references used by control means 900 and primary switch means 140, and coupling capacitors 943 and 945 prevent transformer 944 from becoming saturated. The first drive circuit further comprises a rectifier 946 coupled across port 931 for clamping the negative voltage at port 931 and for establishing a "ground" reference potential for port 931. In operation, amplifier 942 provides an output of approximately 10 V when the signal at port 911 is in its pulse state and an output of approximately 0 V when the signal is in its resting state. Transformer 944 and capacitors 943 and 945 couple the output of amplifier 942 to port 931.

First drive circuit 940 further comprises a delay unit coupled between port 935 and the input of amplifier 942. The delay unit includes a resistor 947 and a rectifier 948, each of which are coupled between port 935 and the input of amplifier 942 (cathode of rectifier 948 coupled port 935), and a capacitor 949 coupled between the input of amplifier 942 and ground. This delay unit, along with a similar delay unit in the second transistor drive circuit described below, comprises means for ensuring that the control signals at ports 931 and 932 are not pulsed at the same time, thereby preventing both the first switch means (630,730) and the primary switch means (140) from conducting at the same time. In response to the leading edge transition of the pulse state for signal at port 935, resistor 947 and capacitor 949 function as an RC delay means which delays the propagation of the leading edge of the signal to the input of amplifier 942. This causes a delay between the leading edge of the signal at port 935 and the corresponding leading edge of the control signal at port 931. In response to the falling edge transition of the signal at port 935, rectifier 948 discharges capacitor 949 with little delay. As such, relatively little delay occurs between the falling edge of the signal at port 935 and the corresponding falling edge of the control signal at port 931.

With the exception of two elements, each element of second drive circuit 950 is the same as a corresponding element of transistor drive circuit 940. Consequently, the number designation for each element of second drive circuit 950 is set to be equal to the number designation of the corresponding element in first drive circuit 940 plus a value of ten. The elements of second drive circuit 950 are coupled to one another as the corresponding elements of first drive circuit 940. In place of buffer 942, however, second drive circuit 950 comprises an inverting buffer amplifier 952, which is responsive to the signal at port 935 and provides the necessary power for driving the first switch means (630 or 730). It provides an output of approximately 0 V when the signal at port 935 is in its pulse state and an output of approximately 10 V when the signal at port 935 is in its resting state. Thus, the signals at ports 931 and 932 are pulsed opposite to one another (180° phase difference).

As a second difference, rectifier 958 has an opposite orientation than that of rectifier 948. In response to the rising edge transition in the signal at port 935, rectifier 958 charges up capacitor 959 relatively quickly. As such, relatively little delay occurs between the rising edge of the signal at port 935 and the corresponding falling edge of the control signal at port 932. In response to the falling edge transition of the signal at port 935, rectifier 958 is non-conducting and resistor 957 and capacitor 959 function as an RC delay means which delays the propagation of the falling edge of the signal at port 935 to the input of inverting amplifier 952. This causes a delay between the falling edge of the signal at port 935 and the corresponding leading edge of the control signal at port 932.

This delay unit, along with the delay unit in first transistor drive circuit 940, comprises means for ensuring that the control signals at ports 931 and 932 are not pulsed at the same time, thereby preventing both switch means 630 (or 730) and 140 from conducting at the same time. With the leading edge transition at port 935, there is a measurable delay in the leading edge transition at port 931 but little delay (i.e., less delay) in the falling edge transition at port 932. Thus, the signals at port 931 and 932 are not overlapping at the rising edge transition at port 935. With the falling edge transition at port 935, there is a little delay in the falling edge transition at port 931 but a measurable delay (i.e., larger delay) in the rising edge transition at port 932. Thus, the signals at port 931 and 932 are not overlapping at the falling edge transition at port 935.

Each element of third drive circuit 960 is the same as a corresponding element of first drive circuit 940. Consequently, the number designation for each element of third drive circuit 960 is set to be equal to the number designation of the corresponding element in first drive circuit 940 plus a value of twenty. The elements of third drive circuit 960 are coupled to one another as the corresponding elements of first drive circuit 940. In addition to these elements, third drive circuit 960 includes a two-input OR-gate 999. One input is coupled to the output of buffer amplifier 942 and the other input is coupled to the output of buffer amplifier 952. The output of OR-gate 999 is coupled to the input of buffer amplifier 962. As such, the signal at port 933 enters a pulsed state when either of the signals at ports 931 and 932 enters a pulsed state. This causes secondary switch means 150 to open and close substantially with primary switch means 140 and to open and close substantially with first switch means 630 (or 730). The delay unit formed by resistor 967, capacitor 969, and rectifier 968 causes secondary switch means 150 to close a short delay after the closing of either switch means 140 or 630 (or 730), and to open substantially with the opening of these switch means. This follows the switching sequence shown in timing diagrams 680 (FIG. 11) and 780 (FIG. 13).

As indicated, control means 900 may be used to control converter 800 with certain modifications. Specifically, port 931 is coupled to first primary switch 840, and ports 932 and 933 are coupled to switch means 830 and 150, respectively. For driving second primary switch means 841 substantially with first primary switch 840, a second secondary winding may be added to transformer 944 along with a corresponding capacitor 945 and rectifier 946. For driving second switch means 835 substantially with first switch means 830, a second secondary winding may be added to transformer 954 along with a corresponding capacitor 955 and rectifier 956.

An alternate embodiment of the secondary-side circuit for converters 600, 700, and 800 is shown at 1000 in FIG. 17A. Secondary circuit 1000 comprises rectifiers 160-162, secondary switch means 150, inductor 170, capacitor 172, and output port 102 as described above for the secondary-side circuit shown in FIGS. 9, 12, and 14. With the exception of rectifier 162, these components are coupled to one another and to secondary winding 124 as described above. Rectifier 162, however, is not coupled to secondary switch means 150, but rather to a second secondary switch means 150'. The series combination of rectifier 161 and secondary switch means 150' is coupled between fourth winding 128 and node $V_2$. Accordingly, windings 124 and 128 are switched through their respective secondary switch means 150 and 150'. As such, rectifiers 161 and 162 may be removed. In circuit 1000, secondary switch means 150 is switched substantially with the pulsed state of primary switch means 140 and secondary switch means 150' is switched substantially with the pulsed state of the first switch means (630, 730, or 830). This is in contrast with the operation of secondary switch means 150 in the previous secondary-side circuit in which switch means 150 is switched substantially with the pulsed states of both primary switch means 140 and the first switch means (630, 730, and 830).

An implementation of secondary-side circuit 1000 employing embodiment 850 of secondary switch means 150 is shown at 1050 in FIG. 17B. Switch means 850 and 850' are used for switch means 150 and 150', respectively. Rectifiers 161 and 162 may be removed from circuit 1050 provided that switch means 850 and 850' do not include parasitic body diodes 851 and 851', and that sufficient negative voltage is applied to the gates of transistors 852 and 852' during their respective OFF states. For controlling switches 850 and 850', switch controller 930 of control means 900 may be modified according to the embodiment shown at 930' shown in FIG. 18. Switch controller 930' comprises the same elements as switch controller 930, with the exception that OR-gate 999 is not included in third transistor drive circuit 960. Rather, third drive circuit 960 is directly driven by the output of buffer amplifier 942. Switch controller 930' further comprises a fourth transistor drive circuit 960' for controlling secondary switch means 150'. Fourth drive circuit 960' comprises the same elements as third drive circuit 960 and is substantially identical thereto. Drive circuit 960' is responsive to the output of buffer amplifier 952 and provides its output at a port 934. With this coupling, switch means 150 is switched substantially with the pulsed state of primary switch means 140 and secondary switch means 150' is switched substantially with the pulsed state of the first switch means (630, 730, or 830).

While the invention has been described in connection with what is presently considered to be the most practical and preferred embodiments, it is to be understood that the present invention is not limited to the disclosed embodiments but, on the contrary is intended to cover various modifications and equivalent arrangements included within the scope of the appended claims.

What is claimed is:

1. In a power converter having an input port for receiving a source of power, a transformer including a primary winding and a secondary winding, said primary winding being capable of coupling energy from said power source and the secondary winding coupled to an output port for providing output power to a load, and having a primary switch means coupled in series with said primary winding, said primary switch means when closed causing a first portion of energy from said power source to be coupled through said transformer to said output port by means of said secondary winding and causing a second portion of said energy to be stored in said transformer in the form of magnetic flux having a first direction through the windings of said transformer, said energy stored in said transformer being released from said transformer when said primary switch means is thereafter opened, circuitry for utilizing the energy stored in said transformer to minimize the voltage stress on said primary switch means when said primary switch means closes, said circuitry comprising:
   flux reversal means for reversing the direction of said magnetic flux built up in said transformer when said primary switch means is opened;
   a secondary switch means coupled in series with said secondary winding of said transformer; and
   a switch control means for operating said secondary switch means in relation to the operation of said primary switch means and said flux reversal means, said switch control means opening said secondary switch means substantially when said primary switch means opens and closing said secondary switch means substantially when said primary switch means closes, said secondary switch means being operated such that substantially no current is conducted by said secondary winding during a predetermined interval prior to when said primary switch means is closed, said secondary switch means and said flux reversal means operating to substantially reduce the voltage across said primary switch means when said primary switch means next is caused to close.

2. The circuitry of claim 1 wherein said secondary switch means and said flux reversal means create a zero-voltage switching condition on said primary switch means when said primary switch means next is caused to close.

3. The circuitry of claim 1 wherein the voltage across said primary switch means is reduced to substantially zero volts when said primary switch means next is caused to close.

4. The circuitry of claim 1 wherein said predetermined time interval includes the time from when the voltage across the transformer windings reaches zero just prior to when said primary switch means is next caused to close to when said primary switch means next closes.

5. The circuitry of claim 1 wherein said flux reversal means causes at least a predetermined amount of flux in the reverse direction to be stored in said transformer at the time when said primary switch means is closed.

6. The circuitry of claim 1 wherein said switch control means opens said secondary switch means before said primary switch means opens, such that the current in said primary winding is reduced before said primary switch means opens.

7. The circuitry of claim 1 wherein said switch control means closes said secondary switch means after said primary switch means closes such that said primary switch means becomes completely conductive before said primary switch means conducts the current of said secondary winding which is reflected to said primary winding by the transformer action of said transformer.

8. The circuitry of claim 1 wherein said primary switch means comprises:
   a switch connected in series between said primary winding and said input port, said switch responsive to said switch control means; and
   means coupled in parallel with said switch for detecting a zero voltage switching condition across said primary switch means and for conducting current upon the detection of said zero voltage switching condition across said primary switch means.

9. The circuitry of claim 8 wherein said input port includes a positive voltage terminal and a negative voltage terminal and wherein said means for detecting a zero voltage switching condition across said primary switch means comprises a rectifier having an anode terminal and a cathode terminal, said rectifier connected in parallel with said primary switch means such that said rectifier conducts current directed toward said positive terminal of said input port.

10. The circuitry of claim 1 wherein said flux reversal means includes a first switch means for selectively coupling a reversing voltage to said transformer windings when said primary switch is opened, said reversing voltage being opposite in sign to the voltage applied to said windings when said primary switch means is closed.

11. The circuitry of claim 10 wherein said switch control means comprises: means for receiving a duty cycle signal; and means responsive to said duty cycle signal for generating a first control signal for controlling the operation of said primary switch means and a second control signal for controlling the operation of said first switch means, each of said first control signal and said second control signal having a first state for directing its respective switch means to close and a second state for directing its respective switch means to open, said first and second control signals generated such that only one of said first and second control signals is in its respective said first state at any given time.

12. The circuitry of claim 11 further comprising means for generating a third control signal for controlling the operation of said secondary switch means, said third control signal having a first state for directing said secondary switch means to close and a second state for directing said secondary switch means to open, said third control signal entering said first state a predetermined time duration after said first control signal enters its said first state, said third control signal entering said second state a predetermined time duration after said first control signal enters its said second state.

13. The circuitry of claim 1 wherein said power converter further comprises:
   a choke inductor coupled in series with said output port, the series combination of said choke inductor and said output port being coupled in parallel with the series combination of said secondary switch means and said secondary winding;
   a rectifier coupled in parallel with said series combination of said choke inductor and said output port, said rectifier for coupling current from said choke inductor to said output port when said secondary switch means is open; and
   an output capacitor coupled in parallel with said output port.

14. The circuitry of claim 1 wherein said flux reversal means comprises:
   a storage capacitor and a first switch means coupled in series with said storage capacitor, the series combination of said storage capacitor and said first switch means being coupled to one of said transformer windings; and
   switch control means for closing said first switch means substantially when said primary switch means opens and opening said first switch means prior to when said primary switch means closes, said storage capacitor and first switch means coupling a reversing voltage to said transformer windings when said first switch means is closed, said reversing voltage being opposite in sign to the voltage applied to said windings when said primary switch means is closed and operating to reverse the direction of the flux through said transformer built up during the preceding closed time of said primary switch means.

15. The circuitry of claim 14 wherein said series combination of said storage capacitor and said first switch means is coupled to said primary winding and coupled in parallel with said primary switch means.

16. The circuitry of claim 1 wherein said transformer includes a third winding and wherein said flux reversal means comprises a first switch means coupled in series with said third winding, the series combination of said first switch means and said third winding being coupled to a source of voltage such that said series combination may apply a reversing voltage to the transformer windings when said first switch means is closed, said reversing voltage being opposite in sign to the voltage applied to said windings when said primary switch means is closed, said first switch means being caused to close substantially when the primary switch means opens to apply said reversing voltage and being caused to open substantially when the primary switch means closes, said reversing voltage operating to reverse the direction of the flux through said transformer built up during the preceding closed time of said primary switch means.

17. The circuitry of claim 16 wherein said transformer includes a fourth winding coupled to said secondary switch means such that energy may be coupled to said output port from said fourth winding when said first switch means is closed.

18. The circuitry of claim 17 further comprising a first rectifier coupled in series with said secondary winding and a second rectifier coupled in series with said fourth winding, the series combination of said first rectifier and said secondary winding being coupled to said secondary switch means, the series combination of said second rectifier and said fourth winding being coupled to said secondary switch means, said first and second rectifiers being oriented such that said secondary winding and said fourth winding do not short circuit one another.

19. The circuitry of claim 18 wherein said first switch means is further caused to close after said primary switch means opens such that a first time interval is created in which both said primary switch means and said first switch means are open, wherein said first switch means is further caused to open before said primary switch means closes such that a second time interval is created in which both said primary switch means and said first switch means are open, and wherein said secondary switch means is further caused to open substantially when said first switch means opens and to close substantially when said first switch means closes, said secondary switch means being operated such that substantially no current is conducted by said fourth winding during a time interval prior to when said first switch means is closed, said secondary switch means and said primary switch means operating to substantially reduce the voltage across said first switch means when said first switch means next is caused to close.

20. The circuitry of claim 17 wherein said circuitry further comprises a second secondary switch means coupled in series with said fourth winding,
   wherein said first switch means is further caused to close after said primary switch means opens such that a first time interval is created in which both said primary switch means and said first switch means are open, wherein said first switch means is further caused to open before said primary switch means closes such that a second time interval is created in which both said primary switch means and said first switch means are open, wherein said switch control means is further for operating said second secondary switch means, causing it to open substantially when said first switch means opens and to close substantially when said first switch means closes, said second secondary switch means being operated such that substantially no current is conducted by said fourth winding during a time interval prior to when said first switch means is closed, said second secondary switch means and said primary switch means operating to substantially reduce the voltage across said first switch means when said first switch means next is caused to close.

21. The power converter of claim 16 wherein the series combination of said first switch means and said third winding is coupled to said input port and wherein said source of voltage for said flux reversal means is provided by the power source received by said input port.

22. The circuitry of claim 1 wherein said primary winding comprises a first terminal and a second terminal, wherein said primary switch means comprises a first primary switch coupled to said first terminal of said primary winding and a second primary switch coupled to said second terminal of said primary winding, said first and second primary switches closing substantially at the same time and opening substantially at the same time, said first and second primary switches when closed causing a first portion of energy from said power source to be coupled through said transformer to said output port by means of said secondary winding and causing a second portion of said energy to be stored in said transformer in the form of magnetic flux having a first direction through the windings of said transformer, and wherein said flux reversal means comprises:

a first switch means coupled to said first terminal of said primary winding and a second switch means coupled to said second terminal of said primary winding, said first and second switch means further coupled to said input port such that a reversing voltage from said input port may be coupled to said primary winding when said first and second switch means are closed, said reversing voltage being opposite in sign to the voltage applied to said windings when said first and second primary switches are closed and operating to reverse the direction of the flux through said transformer built up during the preceding closed time of said first and second primary switches; and switch control means for closing each of said first and second switch means substantially when said first and second primary switches open and opening each of said first and second switch means prior to when said first and second primary switches close, said first and second switch means coupling a reversing voltage to said transformer windings to reverse the direction of the flux through said transformer built up during the preceding closed time of said first and second primary switches.

23. The circuitry of claim 22 wherein said transformer includes a third winding coupled to said secondary switch means such that energy may be coupled to said output port from said third winding when said first and second switch means are closed.

24. The circuitry of claim 23 wherein said circuitry further comprises a second secondary switch means coupled in series with said third winding, wherein said first and second switch means are further caused to close after said primary switches open such that a first time interval is created in which each of said primary switches, said first switch means, and said second switch means are open, wherein said first and second switch means are further caused to open before said primary switches close such that a second time interval is created in which each of said primary switches, said first switch means, and said second switch means are open, wherein said switch control means is further for operating said second secondary switch means, causing it to open substantially when said first and second switch means open and to close substantially when said first and second switch means close, said second secondary switch means being operated such that substantially no current is conducted by said fourth winding during a time interval prior to when said first and second switch means are closed, said second secondary switch means and said primary switches operating to substantially reduce the voltage across said first and second switch means when said first and second switch means next are caused to close.

25. The circuitry of claim 23 further comprising a first rectifier coupled in series with said secondary winding and a second rectifier coupled in series with said third winding, the series combination of said first rectifier and said secondary winding being coupled to said secondary switch means, the series combination of said second rectifier and said third winding being coupled to said secondary switch means, said first and second rectifiers being oriented such that said secondary winding and said third winding do not short circuit one another.

26. The circuitry of claim 25 wherein said first and second switch means are further caused to close after said first and second primary switches open such that a first time interval is created in which each of said primary switches, said first switch means, and said second switch means are open, wherein said first switch means and said second switch means are further caused to open before said primary switches close such that a second time interval is created in which each of said primary switches, said first switch means, and said second switch means are open, and wherein said secondary switch means is further caused to open substantially when said first and second switch means open and to close substantially when said first and second switch means close, said secondary switch means being operated such that substantially no current is conducted by said third winding during a time interval prior to when said first and second switch means are closed, said secondary switch means and said primary switches operating to substantially reduce the voltage across said first and second switch means when said first and second switch means next are caused to close.

27. The circuitry of claim 1 wherein said input port of said converter is for receiving a first source of power, wherein said primary winding includes a first terminal coupled to said primary switch means and a second terminal, and wherein said flux reversal means comprises circuitry coupled between said input port and said primary winding, said circuitry comprising:

- a first switch means coupled between said input port and the first terminal of said primary winding;
- a second source of power coupled to said second terminal of said primary winding, said second power source receiving energy from said first power source when said first switch means is closed, said second power source coupling energy to said transformer when said primary switch means is closed; and
- switch control means for closing said first switch means substantially when said primary switch means opens and opening said first switch means prior to when said primary switch means closes, said first switch means coupling a reversing voltage to said transformer windings when said first switch means is closed, said reversing voltage being opposite in sign to the voltage applied to said windings when said primary switch means is closed and operating to reverse the direction of the flux through said transformer built up during the preceding closed time of said primary switch means.

28. The circuitry of claim 27 wherein said transformer includes a third winding coupled to said secondary switch means such that energy may be coupled to said output port from said third winding when said first switch means is closed.

29. The circuitry of claim 28 further comprising a first rectifier coupled in series with said secondary winding and a second rectifier coupled in series with said third winding, the series combination of said first rectifier and said secondary winding being coupled to said secondary switch means, the series combination of said second rectifier and said third winding being coupled to said secondary switch means, said first and second rectifiers being oriented such that said secondary winding and said third winding do not short circuit one another.

30. The circuitry of claim 29 wherein said first switch means is further caused to close after said primary switch means opens such that a first time interval is created in which both said primary switch means and said first switch means are open, wherein said first switch means is further caused to open before said primary switch means closes such that a second time interval is created in which both said primary switch means and said first switch means are open, and wherein said secondary switch means is further caused to open substantially when said first switch means opens and to close substantially when said first switch means closes, said secondary switch means being operated such that substantially no current is conducted by said third winding during a time interval prior to when said first switch means is closed, said secondary switch means and said primary switch means operating to substantially reduce the voltage across said first switch means when said first switch means next is caused to close.

31. The circuitry of claim 28 wherein said circuitry further comprises a second secondary switch means coupled in series with said third winding, wherein said first switch means is further caused to close after said primary switch means opens such that a first time interval is created in which both said primary switch means and said first switch means are open, wherein said first switch means is further caused to open before said primary switch means closes such that a second time interval is created in which both said primary switch means and said first switch means are open, wherein said switch control means is further for operating said second secondary switch means, causing it to open substantially when said first switch means opens and to close substantially when said first switch means closes, said second secondary switch means being operated such that substantially no current is conducted by said third winding during a time interval prior to when said first switch means is closed, said second secondary switch means and said primary switch means operating to substantially reduce the voltage across said first switch means when said first switch means next is caused to close.

32. The circuitry of claim 27 wherein said first power source has a first voltage and wherein said second power source has a second voltage less than the said first voltage.

33. The circuitry of claim 27 wherein said second power source of said flux reversal means comprises a first capacitor.

34. The circuitry of claim 33 wherein said first capacitor is coupled between the second terminal of said primary winding and ground and wherein said second power source further comprises a second capacitor having a first terminal coupled to the second terminal of said primary winding and a second terminal coupled to said input port.

35. A power converter comprising:

- a transformer including a primary winding, a secondary winding, and a third winding, the primary winding coupled to an input port for receiving a source of power and the secondary winding coupled to an output port for providing output power to a load;
- a primary switch means coupled in series with said primary winding, said primary switch means when closed causing a first portion of energy from said power source to be coupled through said transformer to said output load port by means of said secondary winding and causing a second portion of said energy to be stored in the transformer in the form of magnetic flux having a first direction through the windings of said transformer;
- a flux reversal means for reversing the direction of said magnetic flux built up in said transformer when said primary switch means is opened, said flux reversal means comprising a series combination of a first switch means coupled in series with said third winding, said series combination coupled to a source of voltage such that a reversing voltage may be applied to said transformer windings when said first switch means is closed, said reversing voltage being opposite in sign to the voltage applied to said windings when said primary switch means is closed, said first switch means being caused to close substantially when the primary switch means opens to apply said reversing voltage and being caused to open substantially when the primary switch means closes, said reversing voltage operating to reverse the direction of the flux through said transformer built up during the preceding closed time of said primary switch means;

a secondary switch means coupled in series with said secondary winding of said transformer; and a switch control means for operating said secondary switch means in relation to the operation of said primary switch means and said flux reversal means, said switch control means opening said secondary switch means substantially when said primary switch means opens and closing said secondary switch means substantially when said primary switch means closes such that substantially no current is conducted by said secondary winding during a predetermined interval prior to when said primary switch means is closed, said secondary switch means and said flux reversal means operating to substantially reduce the voltage across said primary switch means when said primary switch means next is caused to close.

36. The power converter of claim 35 wherein said transformer includes a fourth winding coupled to said secondary switch means such that energy may be coupled to said output port from said fourth winding when said first switch means is closed;

wherein said circuitry further comprises a first rectifier coupled in series with said secondary winding and a second rectifier coupled in series with said fourth winding, the series combination of said first rectifier and said secondary winding being coupled to said secondary switch means, the series combination of said second rectifier and said fourth winding being coupled to said secondary switch means, said first and second rectifiers being oriented such that said secondary winding and said fourth winding do not short circuit one another;

wherein said first switch means is further caused to close after said primary switch means opens such that a first time interval is created in which both said primary switch means and said first switch means are open, wherein said first switch means is further caused to open before said primary switch means closes such that a second time interval is created in which both said primary switch means and said first switch means are open; and wherein said secondary switch means is further caused to open substantially when said first switch means opens and to close substantially when said first switch means closes, said secondary switch means being operated such that substantially no current is conducted by said fourth winding during a time interval prior to when said first switch means is closed, said secondary switch means and said primary switch means operating to substantially reduce the voltage across said first switch means when said first switch means next is caused to close.

37. A power converter comprising:
an input port for receiving a first source of power;
a second source of power;
a transformer including a primary winding and a secondary winding, said primary winding including a first terminal and a second terminal, said second terminal being coupled to said second source of power, said secondary winding being coupled to an output port for providing output power to a load;
a primary switch means coupled to said first terminal of said primary winding, said primary switch means when closed causing a first portion of energy from said second power source to be coupled through said transformer to said output port by means of said secondary winding and causing a second portion of said energy to be stored in the transformer in the form of magnetic flux having a first direction through the windings of said transformer;

a flux reversal means for reversing the direction of said magnetic flux built up in the transformer when said primary switch means is opened, said flux reversal means comprising a first switch means having a first terminal coupled to said input port and a second terminal coupled to said first terminal of said primary winding, said first switch means applying a reversing voltage to said transformer windings when said first switch means is closed, said reversing voltage being opposite in sign to the voltage applied to said windings when said primary switch means is closed, said first switch means being caused to close substantially when the primary switch means opens to apply said reversing voltage and being caused to open substantially when the primary switch means closes, said reversing voltage operating to reverse the direction of the flux through said transformer built up during the preceding closed time of said primary switch means;

a secondary switch means coupled in series with said secondary winding of said transformer; and a switch control means for operating said secondary switch means in relation to the operation of said primary switch means and said flux reversal means, said switch control means opening said secondary switch means substantially when said primary switch means opens and closing said secondary switch means substantially when said primary switch means closes such that substantially no current is conducted by said secondary winding during a predetermined interval prior to when said primary switch means is closed, said secondary switch means and said flux reversal means operating to substantially reduce the voltage across said primary switch means when said primary switch means next is caused to close.

38. The power converter of claim 37 wherein said transformer includes a third winding coupled to said secondary switch means such that energy may be coupled to said output port from said third winding when said first switch means is closed;

wherein said converter further comprises a first rectifier coupled in series with said secondary winding and a second rectifier coupled in series with said third winding, the series combination of said first rectifier and said secondary winding being coupled to said secondary switch means, the series combination of said second rectifier and said third winding being coupled to said secondary switch means, said first and second rectifiers being oriented such that said secondary winding and said third winding do not short circuit one another;

wherein said first switch means is further caused to close after said primary switch means opens such that a first time interval is created in which both said primary switch means and said first switch means are open, wherein said first switch means is further caused to open before said primary switch means closes such that a second time interval is created in which both said primary switch means and said first switch means are open; and wherein said secondary switch means is further caused to open substantially when said first switch means opens and to close substantially when said first switch means closes, said secondary switch means being operated such that substantially no current is conducted by said third winding during a time interval prior to when said first switch means is closed, said secondary switch means and said primary switch means operating to substantially reduce the voltage across said first switch means when said first switch means next is caused to close.

39. A power converter comprising:

an input port for receiving a source of power;

a transformer including a primary winding and a secondary winding, said primary winding including a first terminal and a second terminal, said secondary winding being coupled to an output port for providing output power to a load;

a first primary switch, a second primary switch, a first switch means, and a second switch means, said first primary switch being coupled to said first terminal of said primary winding and said second primary switch being coupled to said second terminal of said primary winding, said first and second primary switch being coupled to said input port such that when closed said first and second primary switches cause a first portion of energy from said power source to be coupled through said transformer to said output load port by means of said secondary winding and cause a second portion of said energy to be stored in the transformer in the form of magnetic flux having a first direction through the windings of said transformer, said first switch means being coupled to said first terminal of said primary winding and said second switch means being coupled to said second terminal of said primary winding, said first and second switch means coupled to said input port such that said first and second switch means apply a reversing voltage to said transformer windings when said first and second switch means are closed, said reversing voltage being opposite in sign to the voltage applied to said windings when said first and second primary switches are closed;

a secondary switch means coupled in series with said secondary winding of said transformer;

means for closing each of said first and second switch means substantially when said first and second primary switches open and opening each of said first and second switch means prior to when said first and second primary switches close, said first and second switch means coupling a reversing voltage to said transformer windings to reverse the direction of the flux through said transformer built up during the preceding closed time of said first and second primary switches;

means for operating said secondary switch means in relation to the operation of said first primary switch, said second primary switch, said first switch means, and said second switch means, said means opening said secondary switch means substantially when said first and second primary switches open and closing said secondary switch means substantially when said first and second primary switches close such that substantially no current is conducted by said secondary winding during a predetermined interval prior to when said first and second primary switches are closed, said secondary switch means, said first switch means, and said second switch means operating to substantially reduce the voltage across said first and second primary switches when said first and second primary switches next are caused to close.

* * * * *

UNITED STATES PATENT AND TRADEMARK OFFICE
CERTIFICATE OF CORRECTION

PATENT NO. : 5,331,533
DATED : July 19, 1994
INVENTOR(S) : David A. Smith

It is certified that error appears in the above-indentified patent and that said Letters Patent is hereby corrected as shown below:

Column 11, line 31, after "time" insert -- - --.

Column 13, line 59, after "graph" and prior to "4005" insert --4004, and the current $I_{cc}$ flowing into storage capacitor 3034 is shown in graph--.

Column 21, line 11, delete "require" and insert therefor --required--.

Column 34, line 61, after "over" insert --to--.

Column 48, line 31, delete "$Q_c$" and insert therefor --Q\--.

Column 12, line 21, after "steady" insert -- - --.

Column 12, line 67, delete "It" and insert therefor --it--.

Column 14, line 33, delete second occurrence of "capacitance" and insert therefor --capacitor--.

UNITED STATES PATENT AND TRADEMARK OFFICE
CERTIFICATE OF CORRECTION

PATENT NO. : 5,331,533
DATED : July 19, 1994
INVENTOR(S) : David A. Smith

It is certified that error appears in the above-indentified patent and that said Letters Patent is hereby corrected as shown below:

Column 27, line 3, delete "mean" and insert therefor --means--.

Column 29, line 23, delete "occurs" and insert therefor --occur--.

Column 36, line 1, delete "zero voltage switching" and insert therefor --zero-voltage-switching--.

Column 36, line 52, delete "zero voltage switching" and insert therefor --zero-voltage-switching--.

Column 37, line 37, delete "capacitor" and insert therefor --capacitors--.

Column 39, line 59, delete the second occurring "124" and insert therefor --128--.

Column 43, line 36, delete "FIGS. 12" and insert therefor --FIG. 12--.

Column 49, line 19, after "coupled" insert --to--.

Signed and Sealed this

Eleventh Day of July, 1995

Attest:

BRUCE LEHMAN

Attesting Officer     Commissioner of Patents and Trademarks